United States Patent [19]

Grinage

[11] 4,084,462
[45] Apr. 18, 1978

[54] CLAMPING MEANS FOR A TOOL BLOCK IN A VERTICAL BORING MACHINE OR THE LIKE

[75] Inventor: Claude M. Grinage, Stratford, Conn.

[73] Assignee: The Bullard Company, Bridgeport, Conn.

[21] Appl. No.: 609,429

[22] Filed: Sep. 2, 1975

Related U.S. Application Data

[63] Continuation-in-part of Ser. No. 506,584, Sep. 16, 1974.

[51] Int. Cl.² .................... B23B 29/00; B23B 29/14; B23Q 3/155
[52] U.S. Cl. .................................... 82/36 R; 90/11 D
[58] Field of Search ............ 82/36 R, 36 A; 29/26 A, 29/568; 90/11 D

[56] References Cited

U.S. PATENT DOCUMENTS

| | | | |
|---|---|---|---|
| 3,726,001 | 4/1973 | Anderson et al. | 29/568 |
| 3,821,844 | 7/1974 | Harman et al. | 29/568 |
| 3,858,286 | 1/1975 | Nohejl | 29/26 A |
| 3,889,944 | 8/1975 | Frechtling | 82/36 R |

FOREIGN PATENT DOCUMENTS 2,356,799   5/1975   Germany .................... 29/568

Primary Examiner—Z. R. Bilinsky
Attorney, Agent, or Firm—Mandeville and Schweitzer

[57] ABSTRACT

In a tool change system for a vertical lathe or the like, a new and improved arrangement for clamping a tool block in a tool supporting ram. The new clamping means provides a firm support for the tool block and further includes means for equalizing the clamping forces applied to the tool block and for properly positioning and orienting the tool block in the ram. In accordance with a specific feature of the present invention, the tool block is provided with clamp engaging means on opposite sides thereof and the clamping means comprises a pair of spaced clamping bars engageable with the respective clamping means on the tool block. A common actuating means is operative to move the clamping bars into a tight clamping relation with the clamping means of the tool block. Means are provided for effectively distributing the clamping force applied by the actuating means which comprise a first connecting means for yieldably interconnecting the actuating means to one of the clamping bars and a second connecting means for non-yieldably interconnecting the actuating means to the other of the clamping bars. The non-yieldable second connecting means is arranged on the side of the tool block from which the work approaches.

7 Claims, 88 Drawing Figures

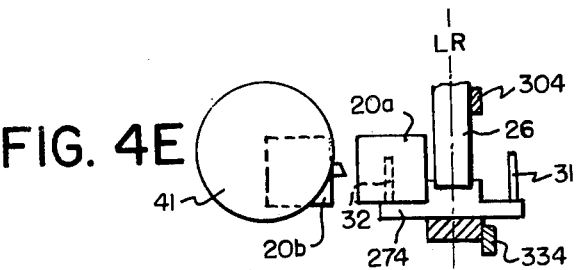
FIG. 4E
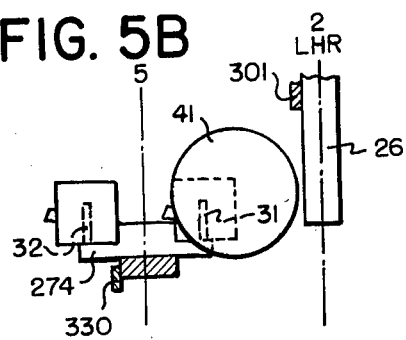
FIG. 5B
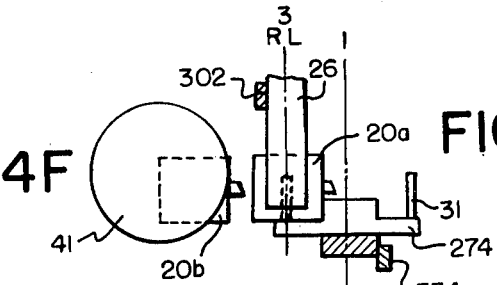
FIG. 4F
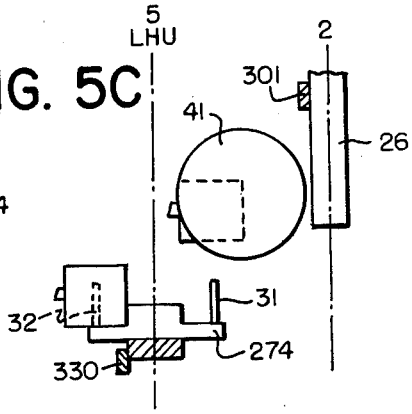
FIG. 5C
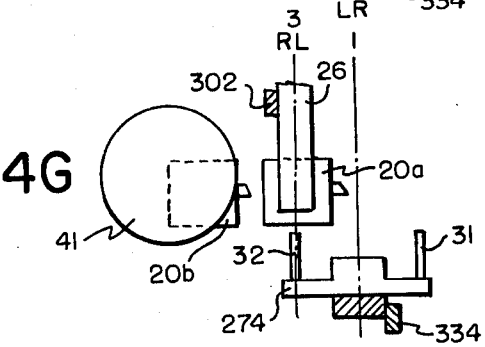
FIG. 4G
FIG. 5D
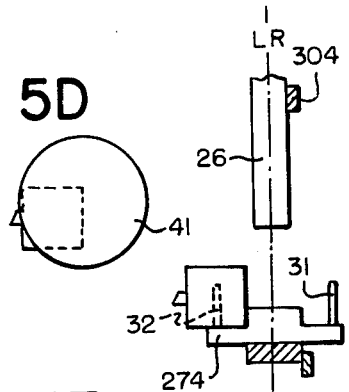
FIG. 4H
FIG. 5E
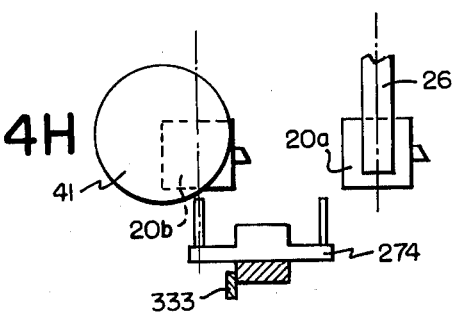
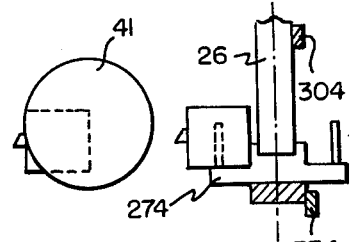
FIG. 5A
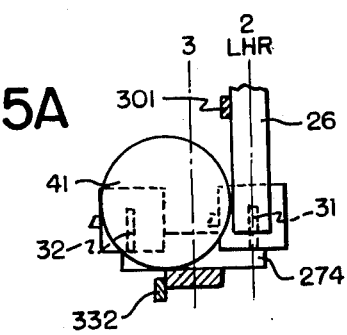
FIG. 5F
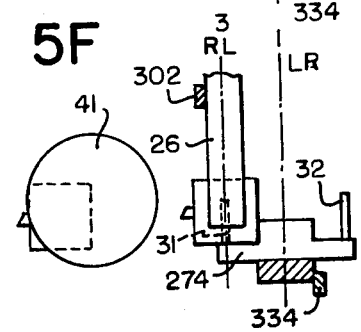

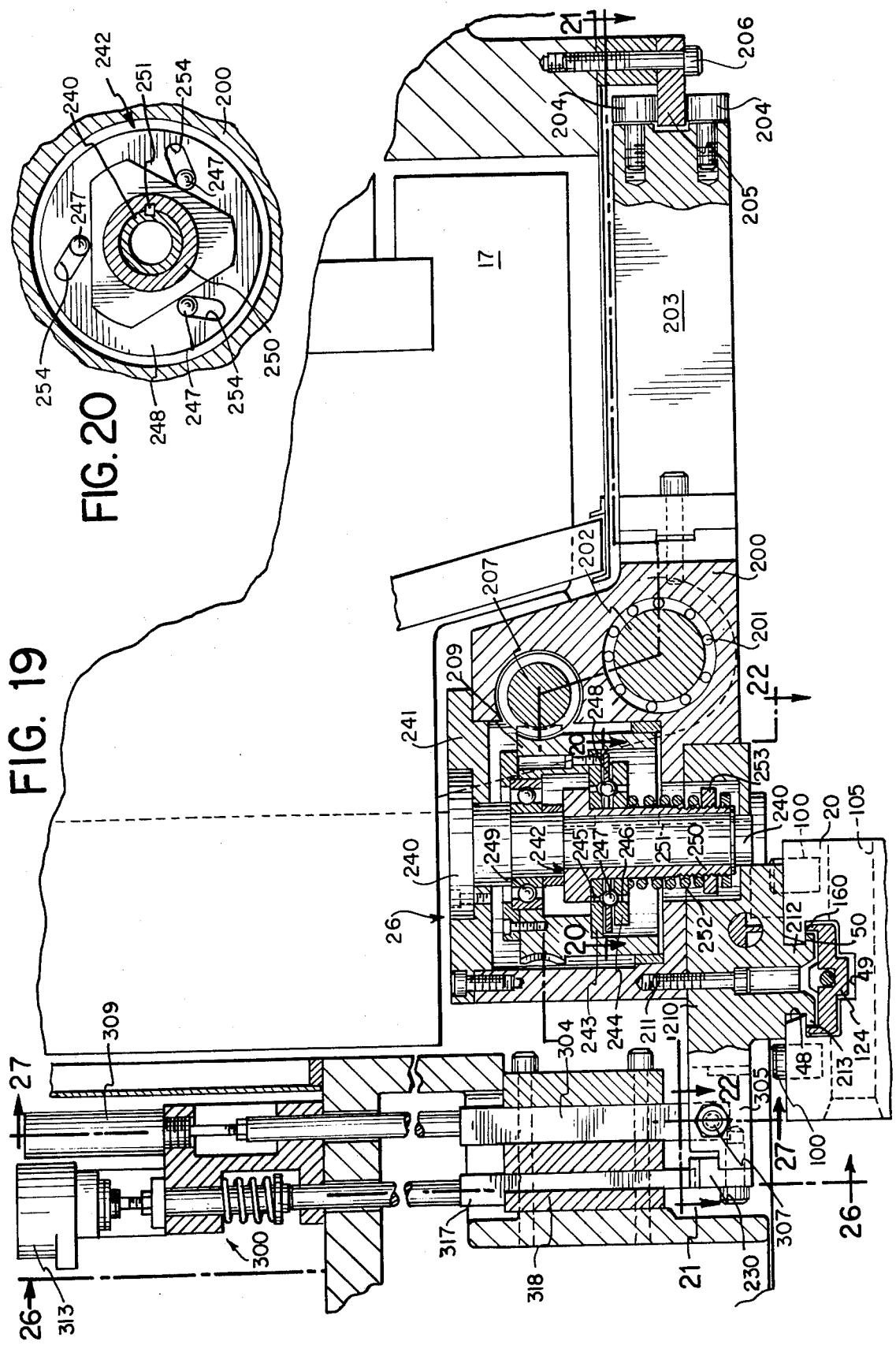

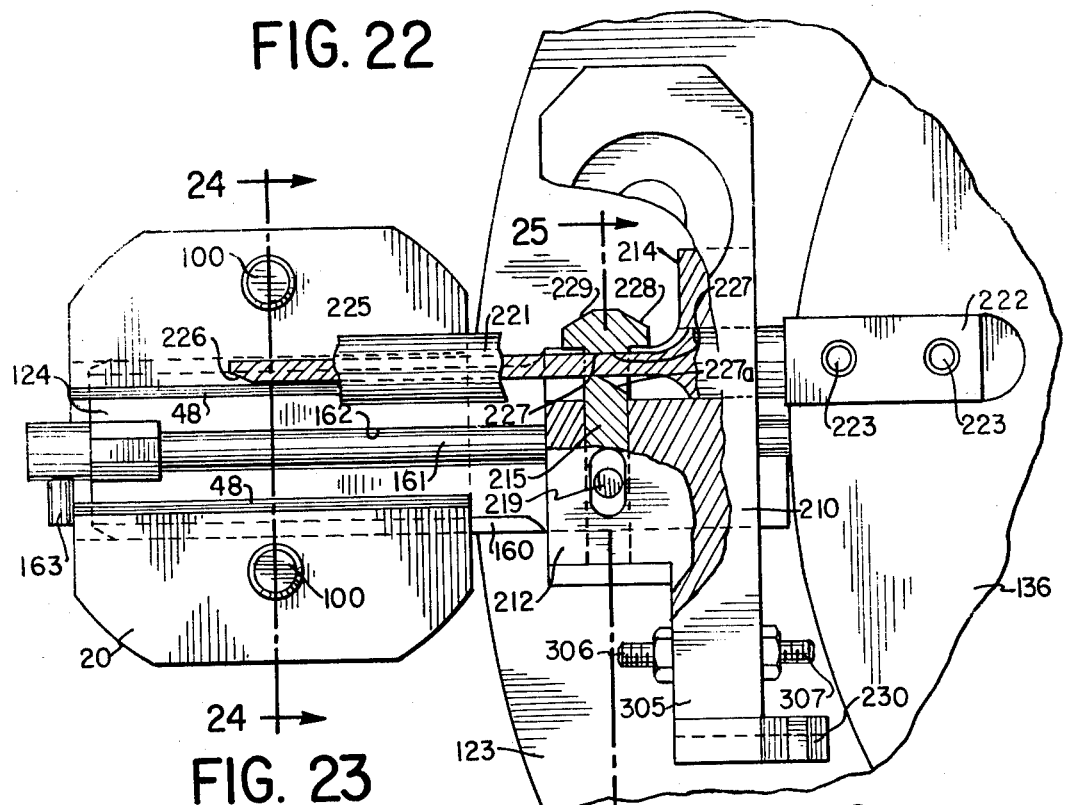
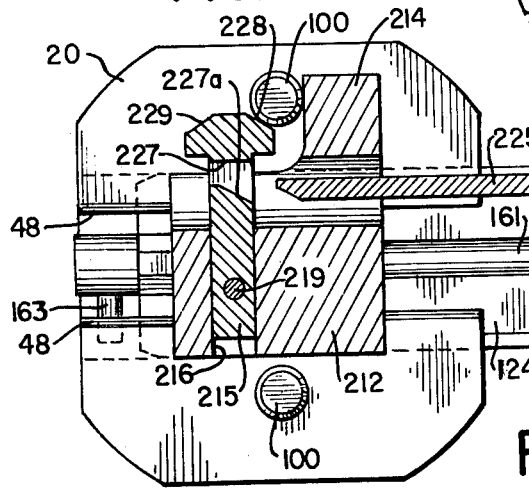
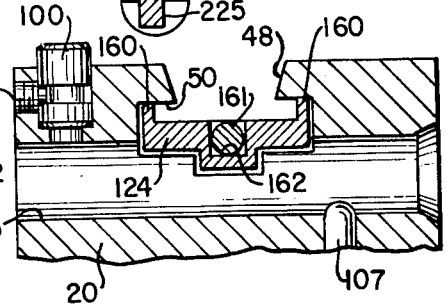
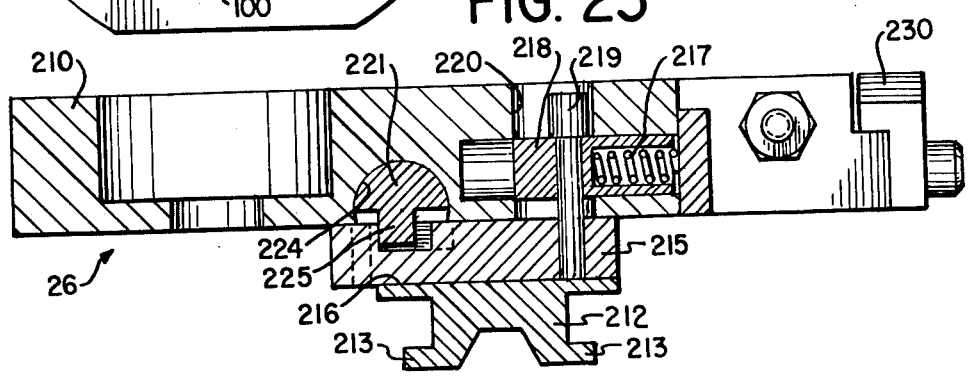

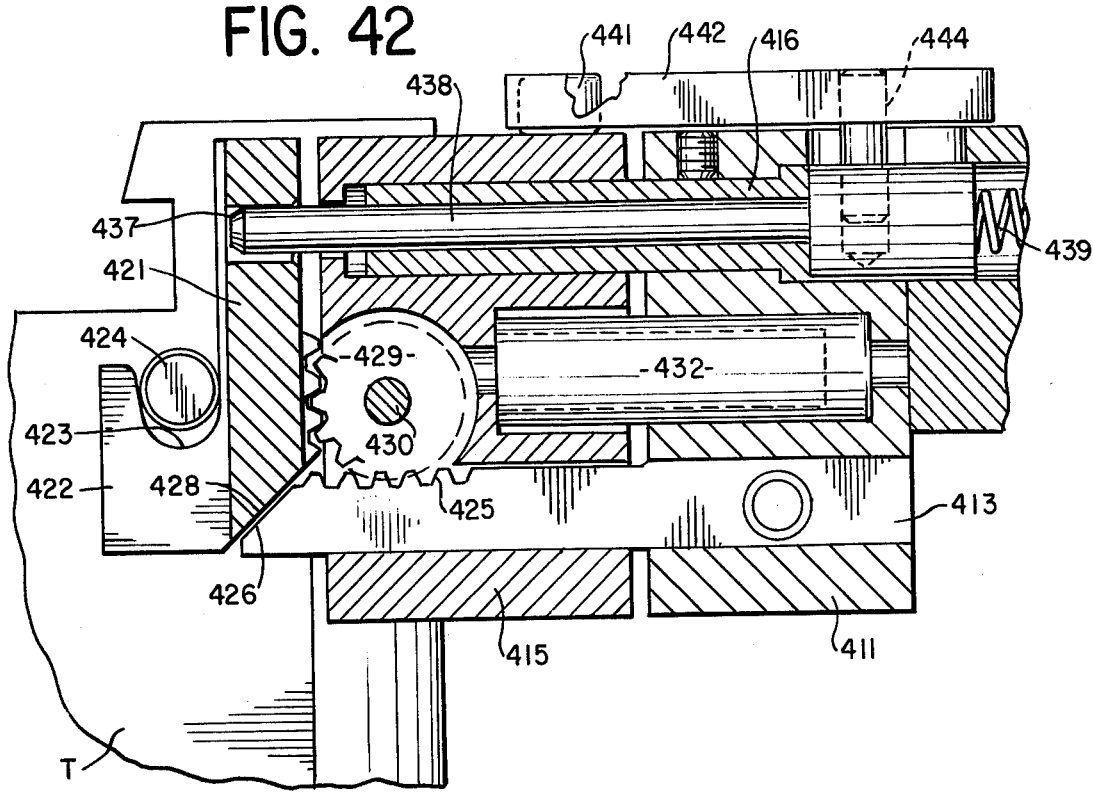
FIG. 42
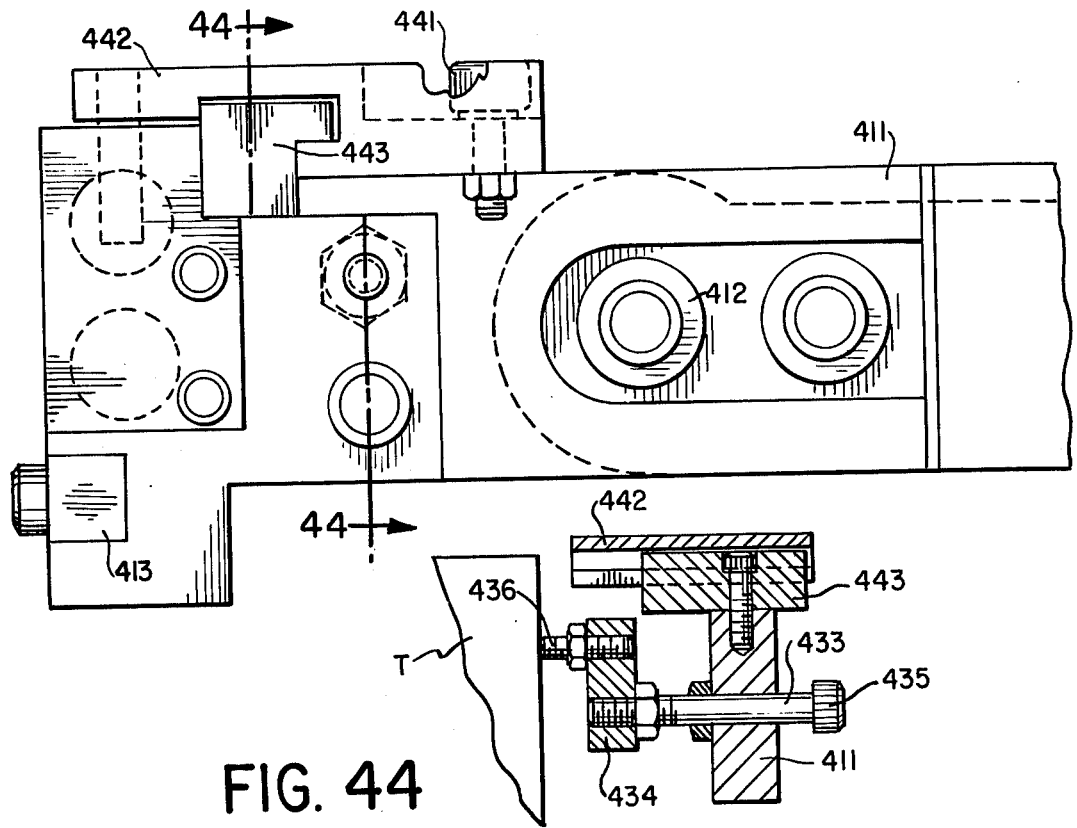
FIG. 43
FIG. 44

CLAMPING MEANS FOR A TOOL BLOCK IN A VERTICAL BORING MACHINE OR THE LIKE

RELATED APPLICATIONS

This application is a continuation-in-part of my copending application Ser. No. 506,584, filed Sept. 16, 1974.

BACKGROUND AND SUMMARY OF THE INVENTION

The present invention is directed to a vertical lathe apparatus, although certain features of the invention may have applicability in other areas, as may be evident to persons skilled in the art. In a verticle lathe, the work to be machined is mounted upon a turntable, which is rotatable about a vertical axis. The machine is provided with one (usually) or a plurality (occasionally) of rams adapted interchangeably to receive and support cutting tools appropriate to the required machining operations. The rams are mounted for controlled vertical movement in ram support housings, and these in turn are mounted for controlled horizontal movement on a cross slide carried by the machine frame. In some cases, provision may be made for a vertical adjustment of the cross slide itself, in addition to providing for vertical movement of the rams, in order to provide for optimum initial positioning of the rams with respect to a given work piece.

In the machining of a work piece on a vertical lathe apparatus, as generally described above, the work piece is fixed upon and rotated by the turntable and machining operations are performed by cutting tools carried by the rams. The desired cutting operations are performed by manipulating the position of the cutting tools, through vertical motions of the rams and horizontal movements of the ram supports. In a typical machining operation, carried out on vertical lathe equipment, a wide variety of cutting tools may be necessary or desirable for effecting various types of machining operations. Frequently, this has been accomplished in the past through the use of turrets mounted on the machine rams and selectively indexable to bring any one of several cutting tools into operative position. The turret arrangements are limited, however, by their tool holding capability in relation to size. Thus, as a practial matter, not more than four or five tools can be conveniently carried on a single turret, necessitating changing of entire turrets where (as is frequently the case) the typical production requirements of the machine involve the use of a greater number of tools. In addition, the use of tool-mounting turrets carried by the machine ram presents certain problems with respect to the accuracy of machining, because the geometry of the turret necessitates a mounting of the cutting tools somewhat more eccentrically, relative to the ram axis, than is desired. The use of the turrets also tends to limit, to a somewhat greater degree than desired, the minimum size of opening that the turret-carrying ram may enter to carry out internal machining.

An overall objective of the invention is to provide a vertical lathe machine of the type described with a novel and advantageous form of automatic tool change system, providing for a high speed, versatile changing of individual tools. Of course, the provision of automatic tool change facilities in machine tools of all kinds is well known, in the general sense, and the present invention does not purport to be directed broadly to the concept of automatic tool change. Rather, it is directed to the provision of an automatic tool change system, adapted particularly for vertical lathe equipment, which incorporates a number of novel and highly advantageous features providing for a high degree of efficiency and versatility in effecting and changing of tools in the course of production operations.

In accordance with one feature of the invention, a novel tool transport arrangement is provided for conveying a new cutting tool from a stationary tool matrix or "library" over to a ready-to-load position adjacent the ram, during the course of a machining operation with the previous tool. Thus, when the time comes for effecting a change of tools, it is merely necessary to retract the ram vertically from its extended machining position to a predetermined loading position and effect a rapid loading of the waiting new tool into the ram, in exchange for the previously used tool. In addition, a novel arrangement is provided for effecting a simultaneous exchange of tools in the ram with a linear "flow through" movement of tool blocks, minimizing the time required to effect the exchange of tools from the "ready" position.

In accordance with another feature of the invention, provision is made in the ram and in the tool library for receiving "right hand" and "left hand" tool blocks, for use in performing internal or external machining operations as may be required. In this respect, a "left-hand" tool block desirably is mounted eccentrically to the left on the ram, while the "right hand" tool is mounted eccentrically to the right. To accommodate these possibilities, the tool transport system and the tool loading system incorporate selectively operable, automatic positioning means accommodating the various "left hand" and "right hand" tool blocks in their several (four) possible combinations. This arrangment permits the use of an advantageous highly simplified form of loading device having a pair of spaced tool engaging elements arranged simultaneously to engage the tool in use and the "ready" tool and with a controlled lateral movement slide the original tool out of position and the new tool into position with the proper right-side or left-side eccentricity. The apparatus of the invention also includes an improved carrousel-type system constituting a tool matrix or tool library for storing a plurality of tool blocks for eventual use. The general function of the carrousel is, of course, to bring the new tool blocks successively into position for transfer to the ram. In this respect, the equipment of the invention incorporates improved control facilities for reliably positioning the carrousel and for reliably retaining and releasing the various tool blocks as they are called for.

RELATED PRIOR ART

The following prior patents are illustrative of various forms of tool changing mechanisms which have been employed or suggested heretofore: Conradson U.S. Pat. No. 2,323,010; Anthony U.S. Pat. No. 3,128,645; Anthony U.S. Pat. No. 3,161,951; Lehmkuhl U.S. Pat. No. 3,200,492; Lipp U.S. Pat. No. 3,509,619; Burroughs U.S. Pat. No. 3,590,463; Brainard et al U.S. Pat. No. Re. -Re. 25,737; Morgan U.S. Pat. No. Re. 25,812; Flannery et al U.S. Pat. No. 3,242,568; Gleisner U.S. Pat. No. 3,163,291; Spuhler U.S. Pat. No. b 3,584,374; Burroughs et al U.S. Pat. No. 3,443,310. The foregoing prior art patents do not, of course, reflect the entire spectrum of tool changing systems, but are representative of some of the systems which have achieved some commercial significance or are otherwise considered to be of interest.

For a full understanding of the invention, reference should be made to the following detailed description and to the accompanying drawing.

DESCRIPTION OF THE DRAWING

FIGS. 4A–4H are simplified, schematic illustrations of the tool loading and unloading sequence reflected in FIGS. 3A–3H.

FIGS. 5A–5H are simplified, schematic, sequential views, similar to those of FIGS. 4A–4H, illustrating the exchange of a new left hand tool block for an existing left hand tool block.

FIG. 19 is a cross sectional view as taken generally on line 19—19 of FIG. 18.

FIGS. 20–22 are enlarged, fragmentary cross sectional views taken generally on lines 20—20, 21—21, and 22—22, respectively, of FIG. 19.

FIG. 23 is a view, similar to FIG. 22, illustrating the parts in a different position, in which a tool block is lockingly engaged to the tool transport mechanism.

FIGS. 24 and 25 are enlarged, fragmentary cross sectional views taken generally on lines 24—24 and 25—25, respectively, of FIG. 22.

FIG. 42 is a cross sectional view, similar to FIG. 41, illustrating the tool block retaining mechanism in locked relationship with a tool block carried by the loader.

FIG. 43 is a front elevational view of the tool block retaining mechanism of FIG. 40.

FIG. 44 is a fragmentary cross sectional view taken generally on line 44—44 of FIG. 43.

DESCRIPTION OF A PREFERRED EMBODIMENT OF THE INVENTION

Figure 1:
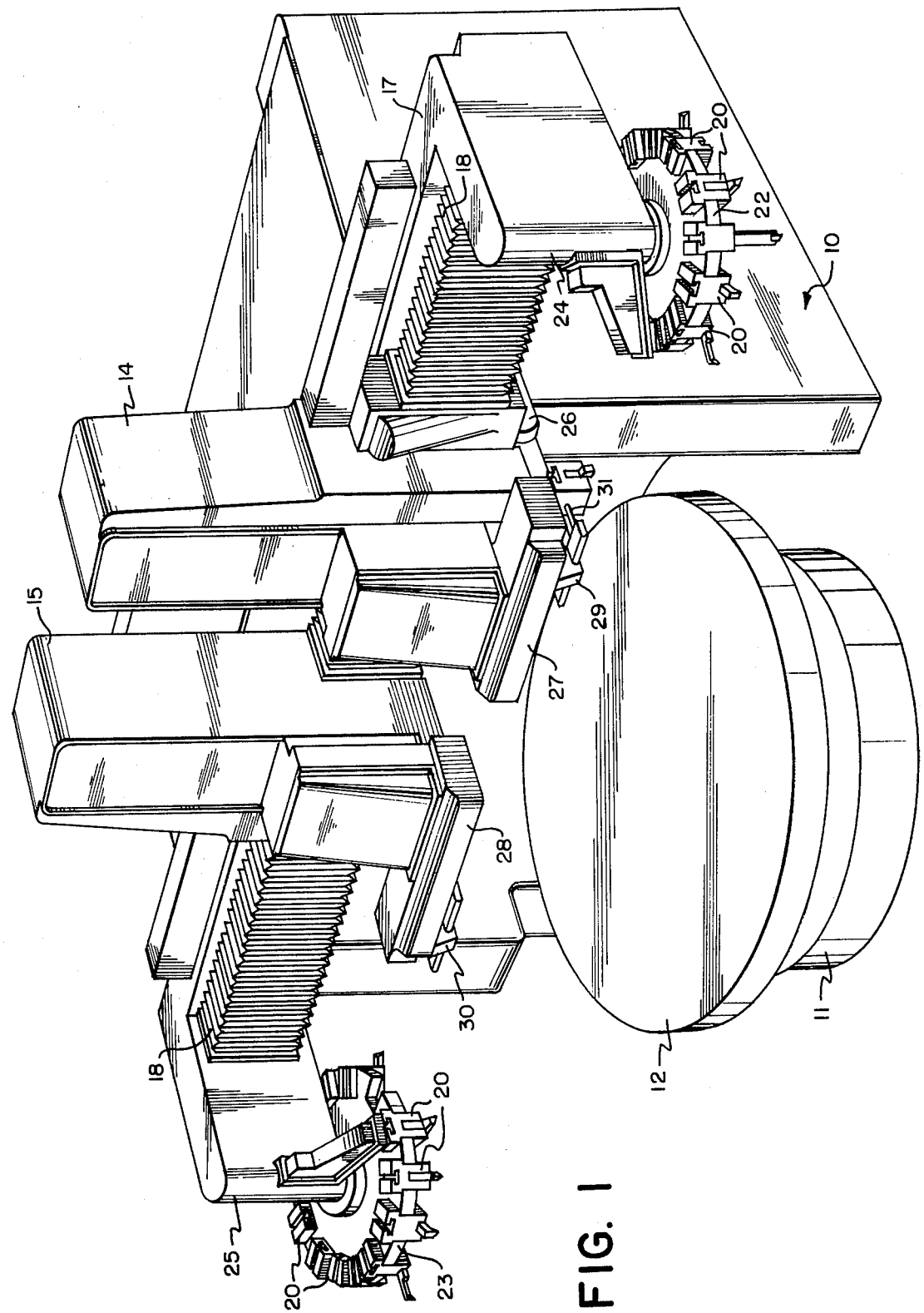
FIG. 1 is a perspective view of a large, double ram vertical lathe machine incorporating the features of the invention.
Figure 2:
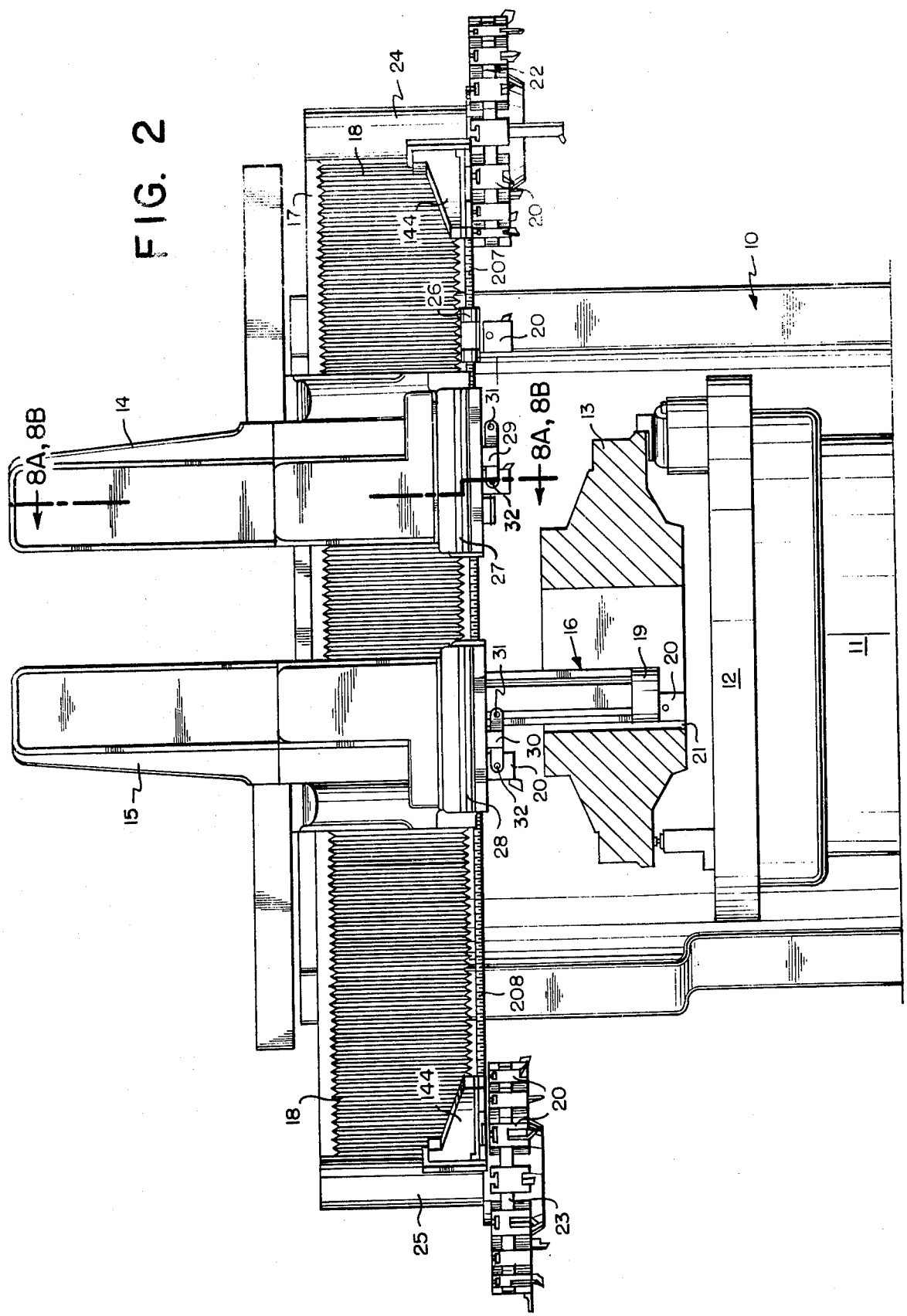
FIG. 2 is a front elevational view of the apparatus of FIG. 1.

Referring now to the drawings, and initially to FIGS. 1 and 2 thereof, the reference numeral 10 designates generally a basic machine frame structure, which includes a work table pedestal or base 11. The base 11 rotatably supports a work table 12, arranged to mount and controllably rotate a workpiece 13.

The illustrated vertical lathe includes a pair of ram housings 14–15, each retaining and guiding for controlled vertical movement a tool retaining ram of which the ram 16 is visible in FIG. 2. The ram housings 14–15 are mounted on a cross slide 17 and, through suitable guide means and positioning screws which, in the illustrated equipment, are covered by the bellows 18, are arranged to be controllably moved transversely, toward and away from the center axis of the rotatable table 12. Typically, the cross rail 17 itself may be mounted for adjustable vertical positioning, so that the ram housings 14–15 may be most effectively positioned relative to the work piece 13, for carrying out the necessary machining operations.

As reflected in FIG. 2, the work piece 13 typically may require machining operations to be carried out both internally and externally. Thus, the visible ram 16 is shown in a position for accomplishing internal machining and, for this purpose, mounts at its lower end 19 a tool block 20. For purposes of this description, the tool block 20 will be referred to as a "left ahdn" tool block in that a cutting tool 21 projects to the left from the block 20 in which it is mounted and in that the tool block 20 itself desirably is secured by the ram 16 in a position eccentrically to the left of the ram central aixs, in order to present the cutting tool 21 properly to the surface to be machined. For external machining operations, the ram 16 typically will mount so-called "right hand" tool blocks, which are mounted eccenrically to the right on the ram and from which the cutting tools project to the right.

The advantage, carrousel-type tool libraries 22–23 are carried by the outboard ends 24, 25 of the cross rail 17, desirably with the vertical rotating axes of the carrousels aligned with the vertical axes of the tool block supporting ram. The respective carrousels 22, 23, to be described in greater detail, contain radially outwardly opening slots for the reception of tool blocks 20. The tool blocks themselves are of more or less uniform configuration, at least in their upper portions, and are arranged to mount cutting tools of a wide variety, as required in the sequence of machining operations. As will be described further hereinafter, the individual tool blocks contain coding information for use in conjunction with a programmed input, such that, when the machining program calls for a selected tool, the carrousel will rotate to seek out the tool called for and present it in an appropriate position for eventual transfer to the ram.

As reflected in FIG. 2, the carrousels 22, 23 are associated individually with the respective ram heads 14, 15, such that the carrousel 22 supplies tools to the ram housing 14, while the carrousel 23 supplies tools to the ram housing 15. In accordance with the invention, and as will be described more fully hereinafter, a tool transporter carriage is associated with each carrousel, although only one of the transporter carriages, (No. 26) is visible in FIG. 2. These transporter carriages are mounted for guided movement between the carrousel and ram housing, so as to transport selected tool blocks between these points. In this respect, it would be understood that the ram housings are laterally moveable relative to the carrousels, and may be in lateral motion during machining operations. To this end, a novel and advantageous form of drive means, also to be hereinafter described, is provided for the transporter carriages, enabling the carriages to be driven, with the next-called-for tool block to a position of adjacency to the associated ram housing, with the ability to retain a predetermined association with the ram housing during the lateral movements thereof involved in the machining operations. Thereafter, when the ram is retracted to the tool-loading position, the transporter carriage is already in position, with its tool block ready to be loaded into the now-retracted ram.

At the lower end of each of the ram housings 14, 15, is a loader housing 27, 28, moveably supporting a loading device 29, 30. As reflected in FIG. 3A, for example, the loading device 29 includes a pair of tool block engaging fingers 31, 32 arranged, upon rearward movement of the loading device to simultaneously enter finger-receiving openings 33 in adjacent tool blocks 20, one of which is secured in the ram and the other of which is supported by the transport carriage 26. In accordance with the invention, after unclamping of the ram-supported tool block, the loading device 29 is moved laterally in a direction to bring the next tool block into desired position on the ram while simultaneously sliding the just-used tool block off the ram on the other side. In this respect, the lateral motions of the loading device 29 are precisely controlled so that both the tool block pickup movements and the loading movements take into account the left-side, right-side relationships of both the incoming and outgoing tool blocks.

Overall, the arrangement generally described provides for highly expeditious changing of tool blocks in a vertical lathe, using rugged, reliable, and yet relatively simplified mechanisms.

RAM CONSTRUCTION

Referring now to FIGS. 8A, 8B, 9A, 9B, 10 and 11, there are shown construction details of the ram assemblies 16 incorporated in the apparatus of FIGS. 1 and 2. Each of the rams 16 comprises an elongated, rigid quill 40 which is arranged to be slideably guided in the ram housing 14 or 15 for vertical movement throughout a desired range. At its lower end, reflected in FIGS. 8B, 9B, the ram quill 40 mounts a tool block clamping assembly 41, comprising a housing block 42 suitably secured to the lower end of the quill by bolts (not shown) and positioning dowels 43. A guide integral rib 44 is formed on the bottom surface of the housing block 42, and extends laterally from side to side of the housing block. The guide rib includes a pair of opposed, tapered guide surfaces 46 (FIG. 8B) projecting somewhat below the principal bottom surface 47 of the housing block 42 and arranged for cooperative interaction with upwardly facing, tapered guide surfaces 48 of a tool block 20. Thus, as will become more fully apparent, when the tool block 20 is drawn up tightly against the bottom surface 47 of the clamping housing 42, the block is accurately aligned in the forward-rearward direction and along the lateral axis, by the tight-fitting relationship of the tapered guide rib 44 within the tapered recess of the tool block 20.

A plurality of flange plates 44' are secured by bolts 45 to the bottom of the guide rib 44 and extend outwardly of the tapered guide surfaces 46.

Figure 8A:
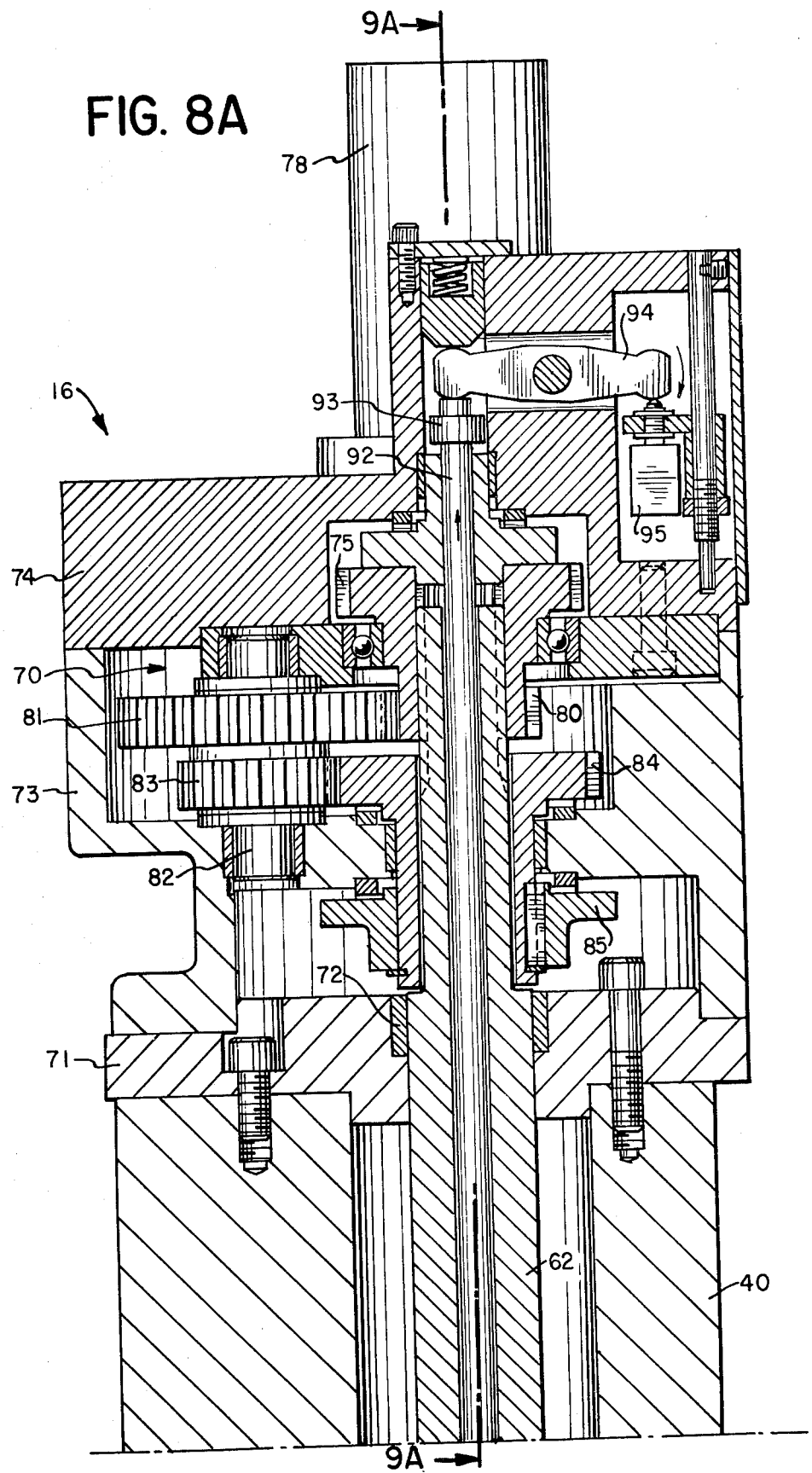
FIGS. 8A and 8B are axial cross sectional views of the upper and lower sections respectively of the tool supporting ram of the apparatus of FIGS. 1 and 2, as taken generally along lines 8A—8A and 8B—8B, respectively, of FIG. 2.
Figure 8B:
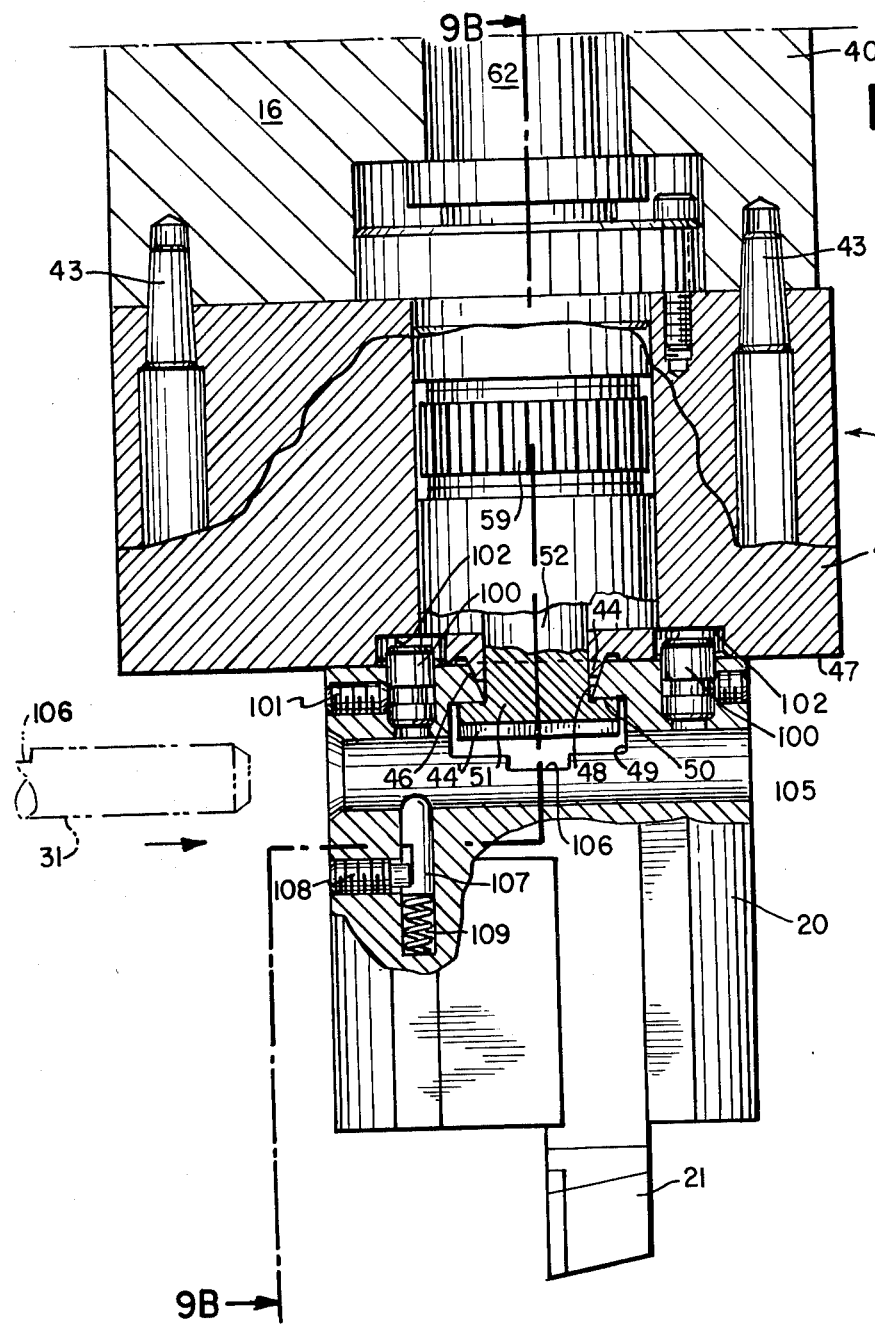

As reflected in FIG. 8B, the tool blocks 20 are provided with a clamping slot 49, of inverted tee-shaped configuration, including clamping shoulders 50 defined in part by the upwardly facing tapered guide surfaces 48. The slots 49 are adapted slideably to receive the flange plates 44' and also the rectangular head 51 and cylindrical stem 52 of clamping bolts 53, 54 (see FIG. 9B). In accordance with one aspect of the invention, the lateral width of the clamp housing 42 of the ram is greater than the length dimension of the tool block 20 in the direction of the guide slot 49, permitting the tool blocks 20 to be secured to the ram with either a right-side (as illustrated in FIG. 9B) or left-side eccentricity, as required for performing interior or exterior machining operations. To this end, the ram includes separate tool block clamping means, for the right side and left side respectively. These are actuated in clamping or releasing directions simultaneously, with one of the clamping means being actuated through idle motions while the other is in service.

For actuating the clamping bolts 53, 54, the clamp housing 42 is formed with recesses 55 receiving bearings 56, 57 supporting and guiding threaded nuts 58 engaging the respective clamping bolts. The threaded nuts 58 are provided with integral gears 59 meshing with a drive gear 60 connected through splines 61 to a clamp actuating shaft 62 extending upward through the hollow quill 40.

Figure 9A:
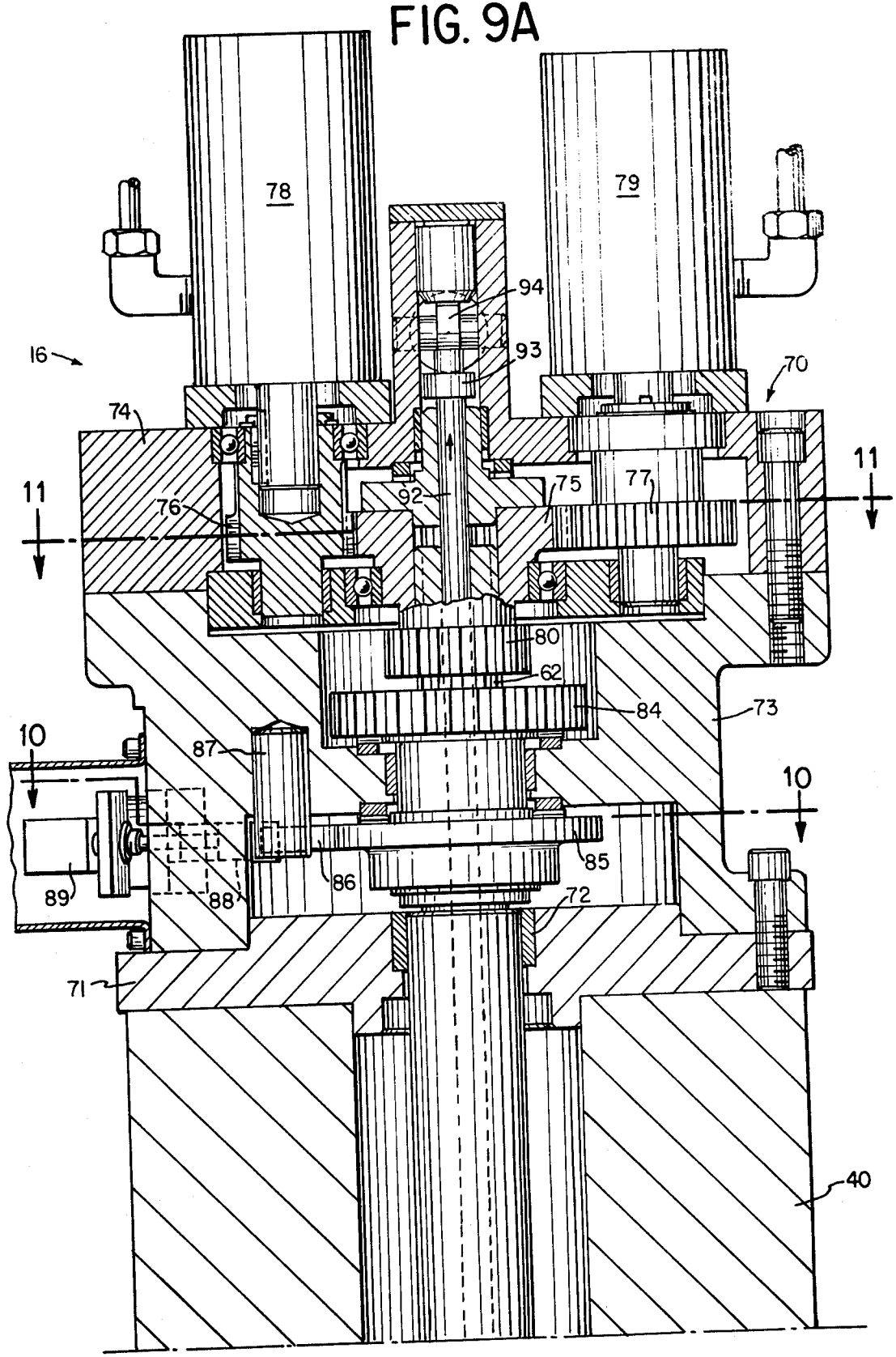
FIG. 9A is a cross sectional view as taken generally along lines 9A—9A of FIG. 8A.
Figure 9B:
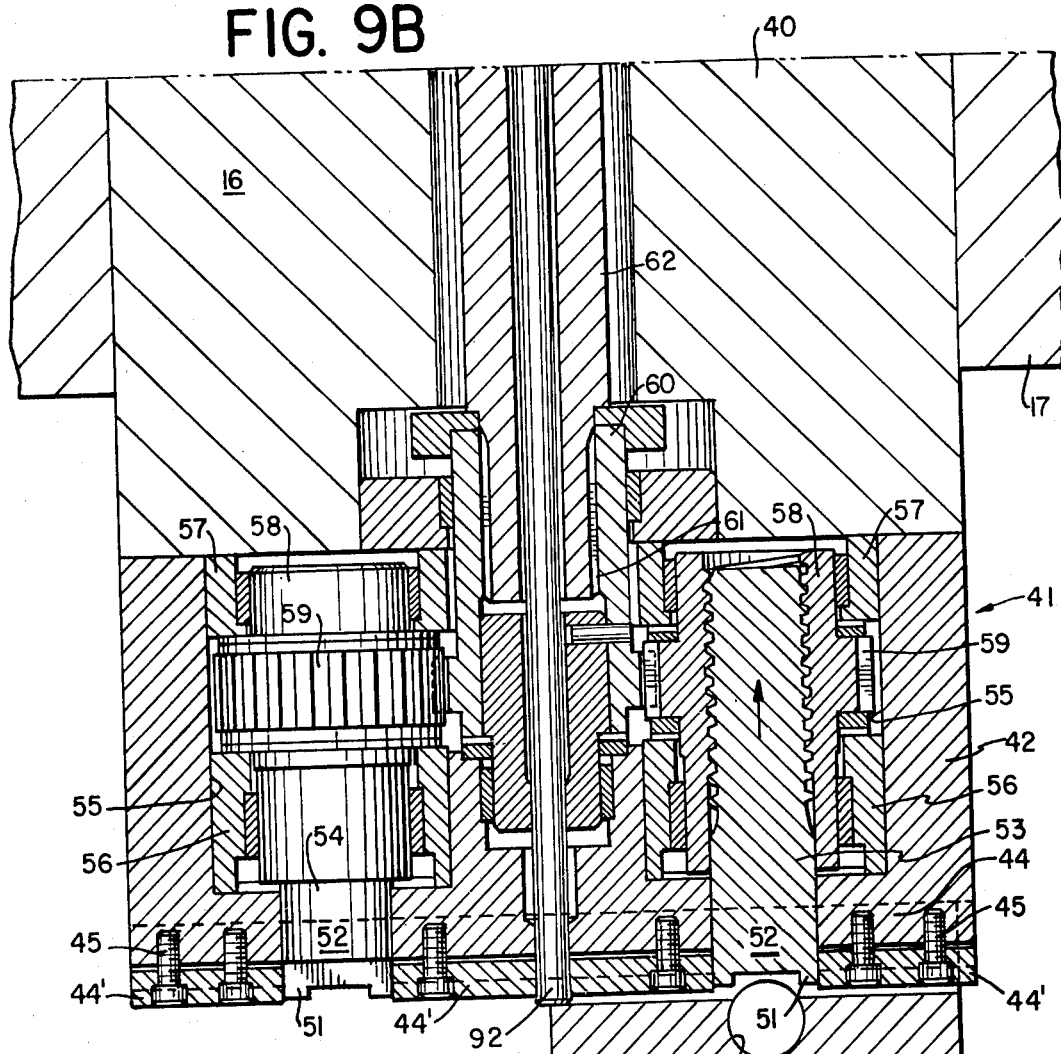
FIG. 9B is a fragmentary cross sectional view as taken generally along line 9B—9B of FIG. 8B.

As reflected in FIGS. 8A, 9A, the upper end of the ram quill 40 mounts a clamp actuating mechanism, generally designated by the reference numeral 70. This includes a quill cap 71 bolted to the upper end of the quill and providing bearing means 72 for the upper portion of the clamping shaft. A housing 73 is bolted to the quill cap and is, in turn, enclosed by a bolted-on housing cap 74.

The upper extremity of the clamping shaft 62 is splined for driving engagement with a gear 75, hereinafter referred to as the clamping gear. This gear meshes with pinions 76, 77 carried respectively by hydraulic motors 78, 79 mounted on the housing cap 74. In the illustrated arrangement, the hydraulic motor 78 is a high torque motor, which drives the clamping gear 75 through a relatively small diameter pinion 76, while the hydraulic motor 79 is designed for higher speed and drives the clamping gear 75 through a larger diameter pinion 77.

In the contemplated operation of the mechanism, the higher speed motor 79 is actuated to drive the clamping gear 75 in a "clamping" direction, to tighten the clamping bolts 53, 54 and secure a tool block in place at the lower end of the ram. The high torque, lower speed motor 78 is actuated subsequently to drive the clamping shaft 62 in a "releasing" direction, at least at the outset of the tool block releasing operation. In this respect, substantially greater forces are required to initiate movement of the clamping elements in a releasing direction than are required to bring about the clamping in the first instance. This is a function of the effects of inertia at the end of the clamping operation, which tends to enhance the clamping action, and also the significant effects of static friction at the commencement of the releasing action.

Figure 10:
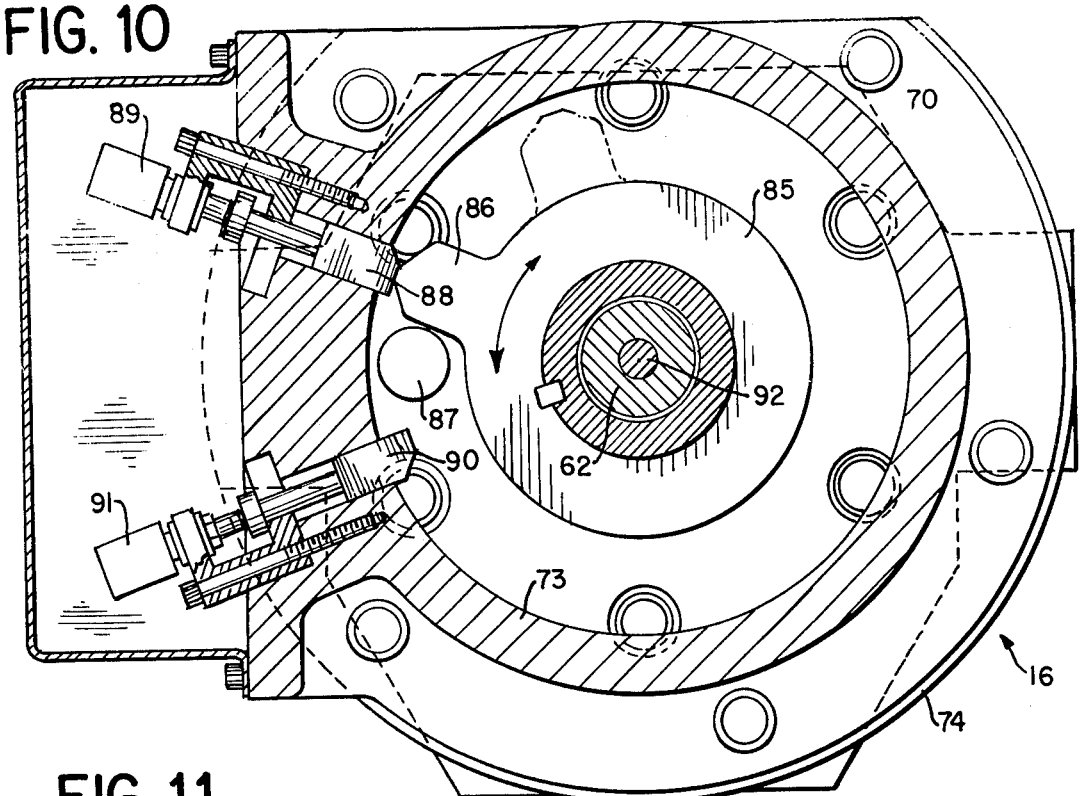
FIGS. 10 and 11 are cross sectional views as taken generally along lines 10—10 and 11—11, respectively, of FIG. 9A.
Figure 11:
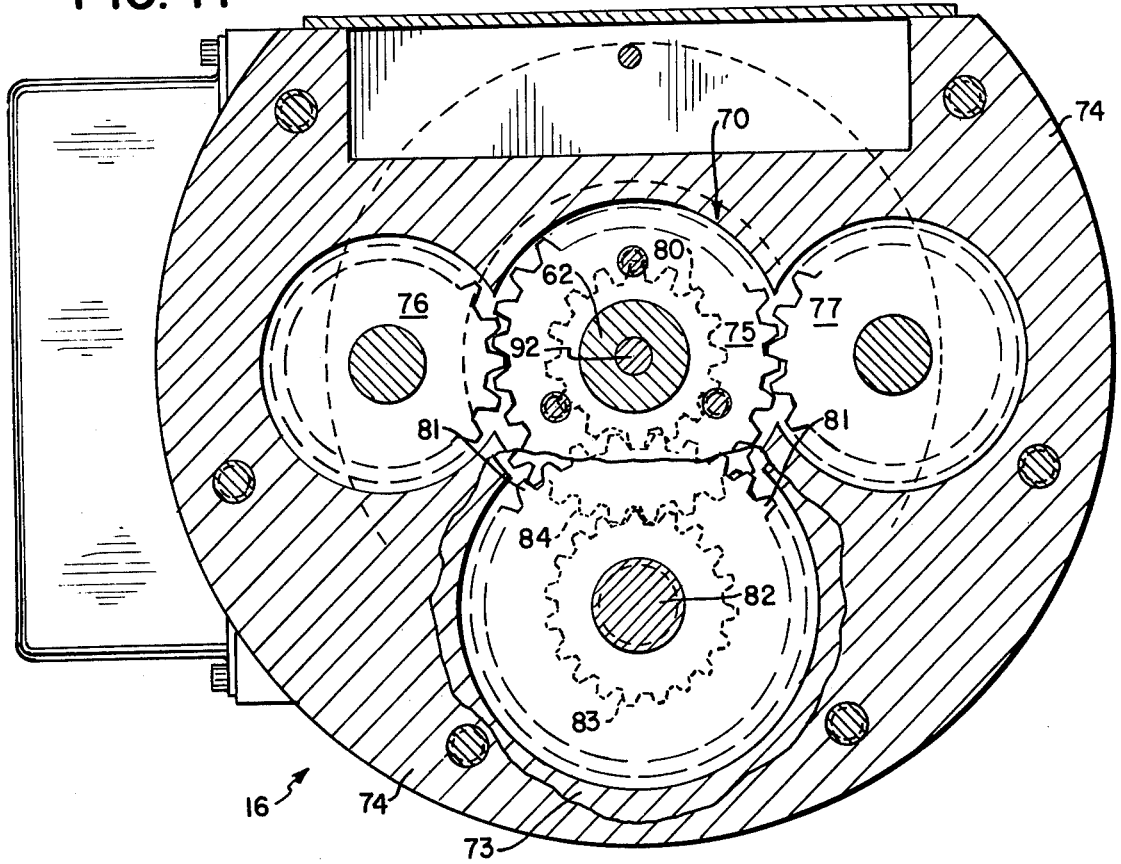

In conjunction with the clamping and unclamping means just described, provisions advantageously are made for providing an output signal from the quill, indicating either a clamped or an unclamped condition, as the case may be. Such signals are, of course, not necessary to the clamping operation itself, but are necessary or at least highly desirable in connection with automatic programming of the machine and the tool change operations associated with its utilization. In the illustrated mechanism, the clamping gear 75 includes an integral pinion 80 driving an idler gear 81 mounted rotatably on a shaft 82 alongside the main clamping shaft 62. A pinion 83 is integral with the gear 81 and drives an indicator gear 84 which, for convenience, is arranged concentrically with respect to the clamping shaft 62. Keyed or otherwise secured to the indicator gear 84 is a collar 85 mounting an actuator arm 86 (FIG. 10). In the illustrated arrangement, clamping of a tool block is effected by counter-clockwise rotation of the clamping shaft 62, as viewed from above the shaft. Such counter-clockwise rotation of the clamping shaft will result in similar clockwise rotation of the collar 85 and actuating arm 86, although at a reduced rate of rotation because of the geared down relationships provided by the gears 80, 81 and 83, 84.

To provide a control signal, reflecting the fact that a tool block 20 has been properly clamped in the ram, a detecting rod 92 is arranged to extend vertically throughout the length of the ram quill 40, being received coaxially within the hollow interior of the clamping shaft 62. The detecting rod 92 has a limiting collar 93 adjacent its upper end, which permits the lower end extremity of the rod to project a short distance below the bottom surface of the clamp housing 42, appropriate to permit a newly loaded tool block to be slid into position underneath the detecting rod. In this respect, as reflected in FIG. 9B, the positioning of the rod 92 in the center of the ram is such that it is engaged by a properly loaded tool block 20 in either a left-hand or a right-hand position.

After preliminary location of the tool block in position to be clamped, the subsequent upward motion of the block while it is being tightly clamped to the housing 42 causes the detecting rod 92 to be lifted a short distance. At the upper end of the ram assembly, a rocker arm 94, pivotally mounted in the housing cap 74, is actuated by the rod 92 to depress the plunger of a switch 95. This enables a signal to be impoarted to the program system, indicating that a tool block has in fact been clamped in position. When the shaft 62 is rotated in the unclamping direction, to release the tool block 20, the actuating arm 86 will travel in a clockwise direction (as viewed in FIG. 10) into contact with a stop pin 87 at the extreme of its rotation. In this position, the arm 86 will displace a plunger 90, actuating a switch 91 to indicate the unclamped condition. If no tool block is in loaded position when the clamping motor 79 is energized, the arm 86 will rotate counter-clockwise past its typical "clamping" position, indicated by phantom lines in FIG. 10, and into contact with the stop pin 87 at the other extreme of rotation. In that position, the arm 86 will displace a plunger 88, actuating a switch 89 to signify the "no tool block loaded" condition.

TOOL BLOCK CONSTRUCTION

The construction of the tool block 20 is reflected in FIGS. 8B, 9B, 18 and 35. In FIG. 8B the tool block is shown to include one or more locating pins 100, which are secured in a tool block by set screws 101 and project upward a short distance from the generally flat upper surface of the block. These pins are slightly bevelled or chamfered at their upper ends and are arranged to be closely received in guide recesses 102 formed in the bottom of the clamp housing 42. The guide recesses 102 are also slightly chamfered at their open ends and are arranged to closely receive and confine the locating pins 100 in the lateral direction, that is, in the direction of unloading and loading of the tool block. In the forward-rearward direction, the guide recesses are somewhat elongated, permitting final forward-rearward positioning of the tool block to be accomplished by means of the cooperating tapered surfaces 46, 48 on the guide rib 44 and clamping slot 49 as previously described. The projecting height of the locating pins is less than the extent of upward movement of the block provided for during the clamping operation so that, during loading and unloading operations, the tool blocks can be moved laterally underneath the clamp housing 42 without interference from the locating pins.

Figure 18:
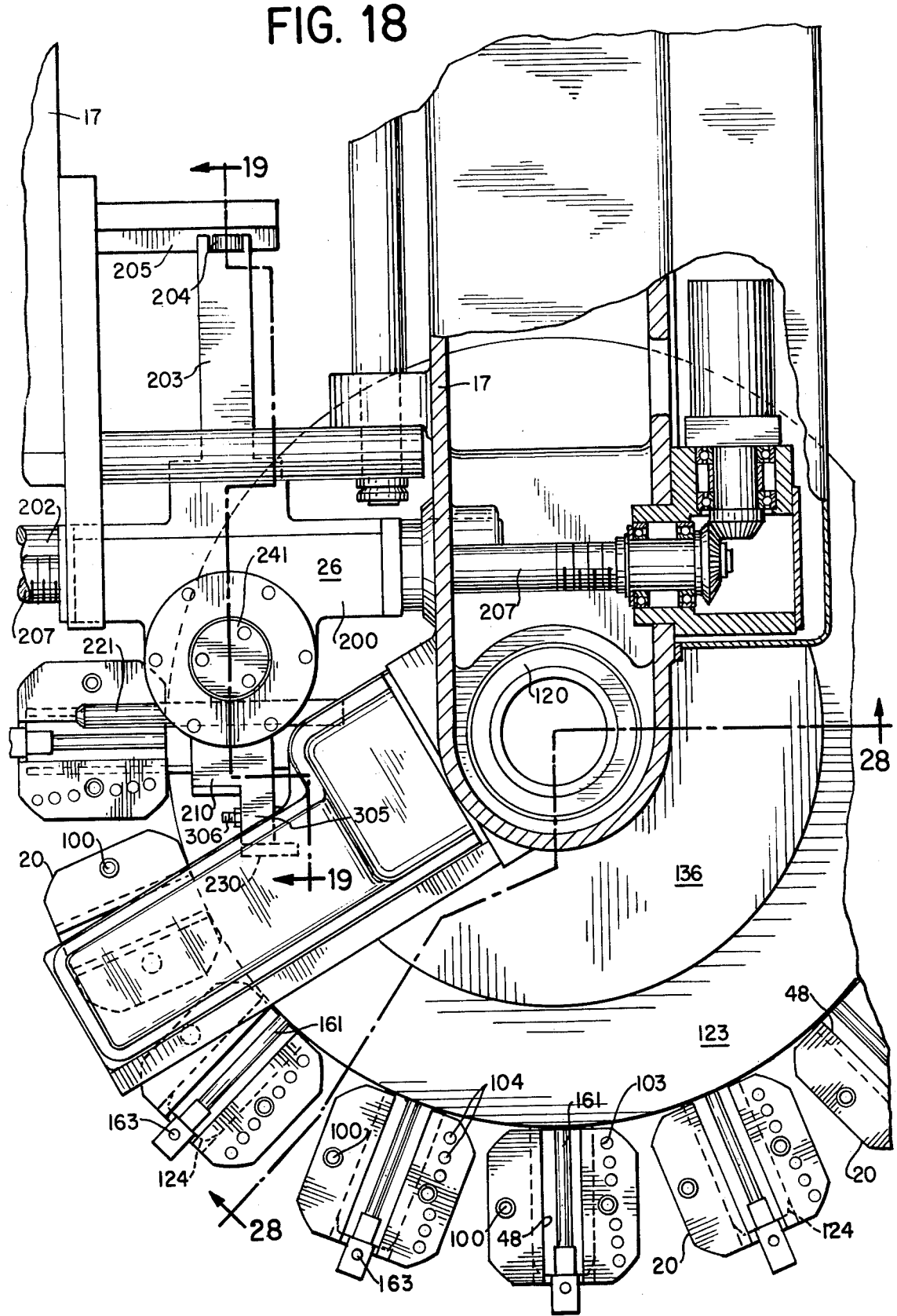
FIG. 18 is a fragmentary top plan view, with parts broken away, illustrating the carrousel-type tool library mechanism incorporated in the apparatus of FIGS. 1 and 2.
Figure 35:
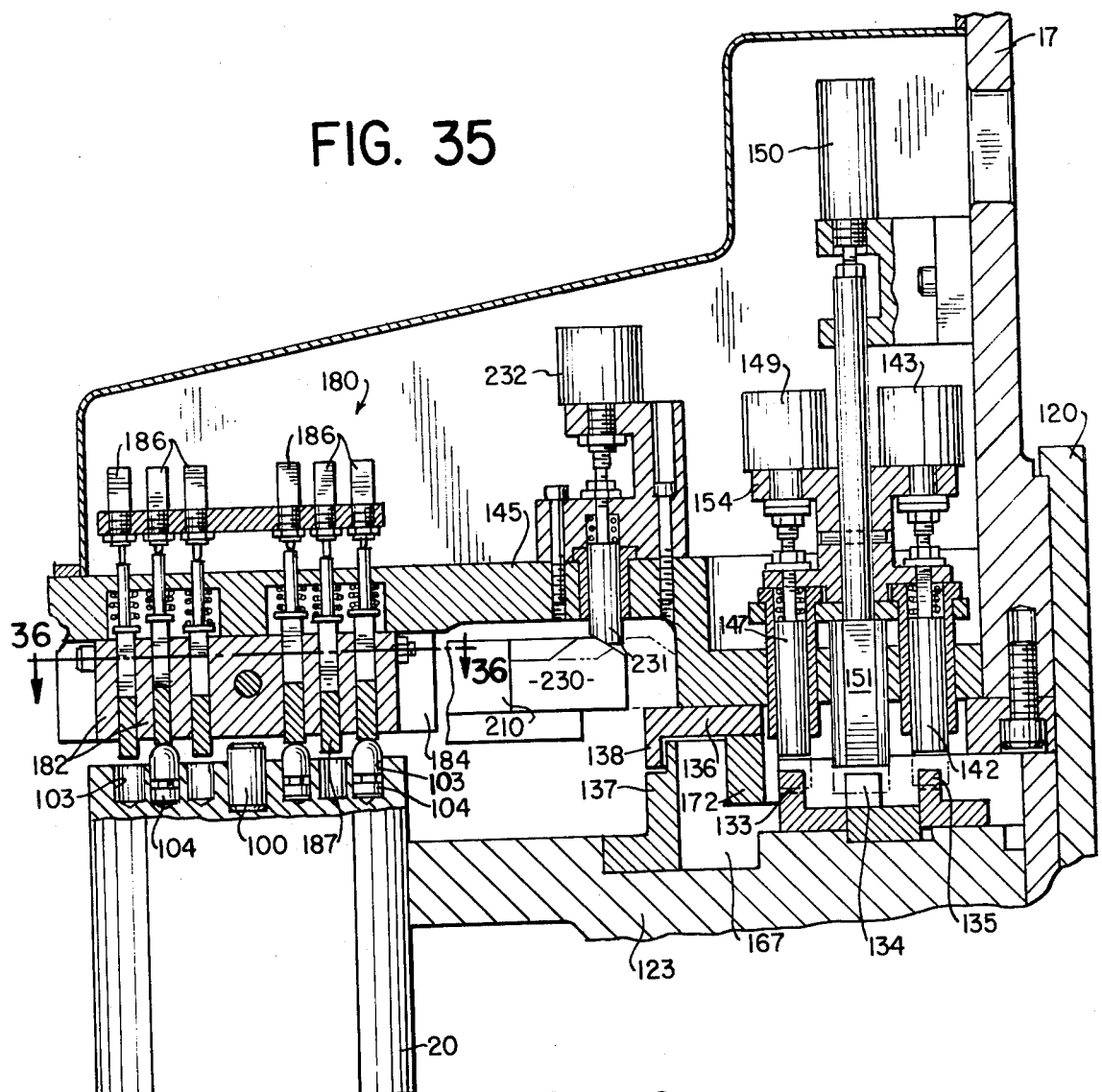
Figure 36:
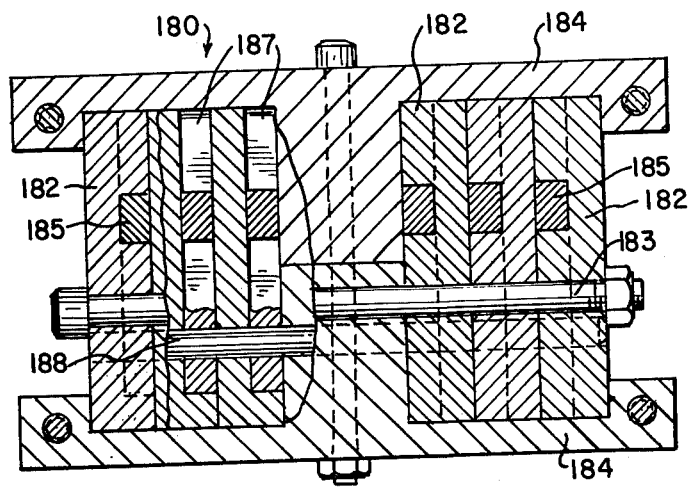
FIG. 36 is an enlarged, fragmentary cross sectional view taken generally on line 36—36 of FIG. 35.
Figure 37:
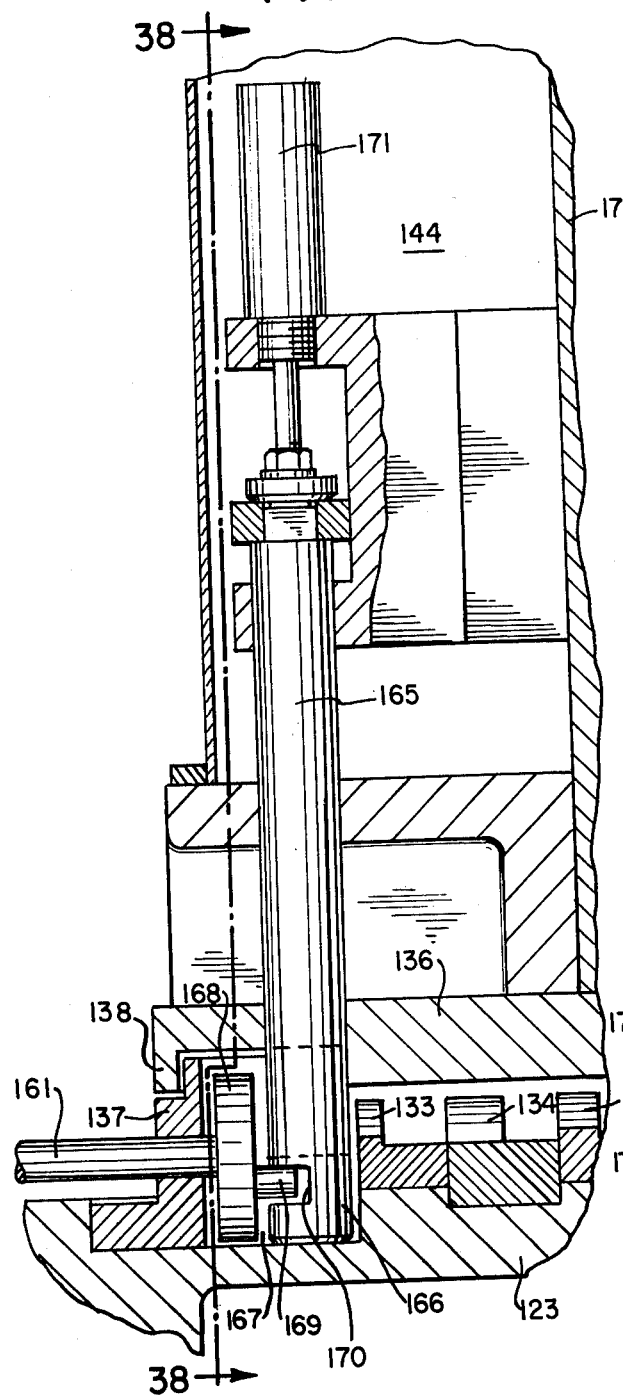
FIG. 37 is an enlarged, fragmentary cross sectional view taken generally on line 37—37 of FIG. 33.
Figure 38:
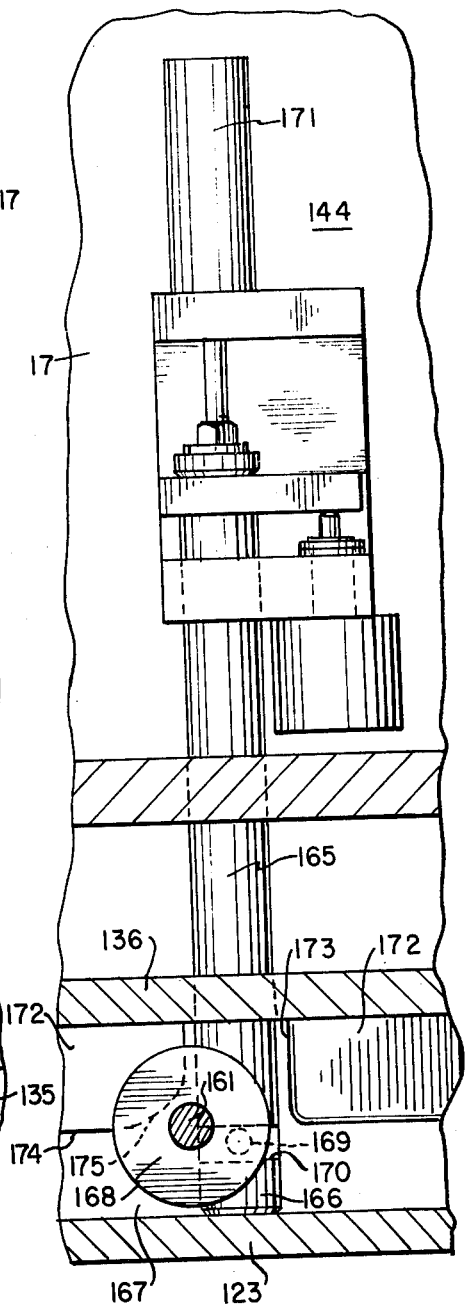
FIG. 38 is a cross sectional view taken generally on line 38—38 of FIG. 37.

As reflected in FIGS. 18 and 35, the upper portions of the tool blocks 20 are provided with a plurality of identification recesses 103 arranged to receive, in selected combinations, short, upwardly projecting identification pins 104. By appropriately varying the number and location of the identification pins 104, a specific code designation is provided to each tool block in the library, enabling it to be searched out and selected when called for by the machining program, as will be hereinafter described. The identification pins 104 like the locating pins 100 project upward a short distance enabling them to be cleared underneath the clamp housing 42 during lateral loading and unloading movements. When the tool blocks 20 are drawn upwardly into tightly clamped relation to the clamp housing 42, the identification pins 104 enter appropriately located recesses (not specifically illustrated) in the bottom of the clamp housing.

As shown best in FIGS. 8B, 9B, each tool block 20 is provided with a cylindrical passage 105 extending in the forward-rearward direction and adapted to receive the rod-like finger 31 or 32 of a loading device to be described. Desirably, the end extremity of the loading finger 31 (33) and the forward extremity of the passage 105 are bevelled or chamfered to facilitate entry of the loading finger. In addition, the passage 105 desirably is located as high as practicable in the tool block, so that the lateral forces applied by the loading fingers 31, 33 are located as close as practicable to the level of lateral resistance. Thus, in the arrangement illustrated in FIGS. 8B, 9B, the passage 105 actually intersects with the clamping slot 49, in which case it may be necessary to notch out the upper portion of the loading fingers 31, 33, as reflected at 106, to clear underneath the clamping bolts 53, 54.

Figure 14:
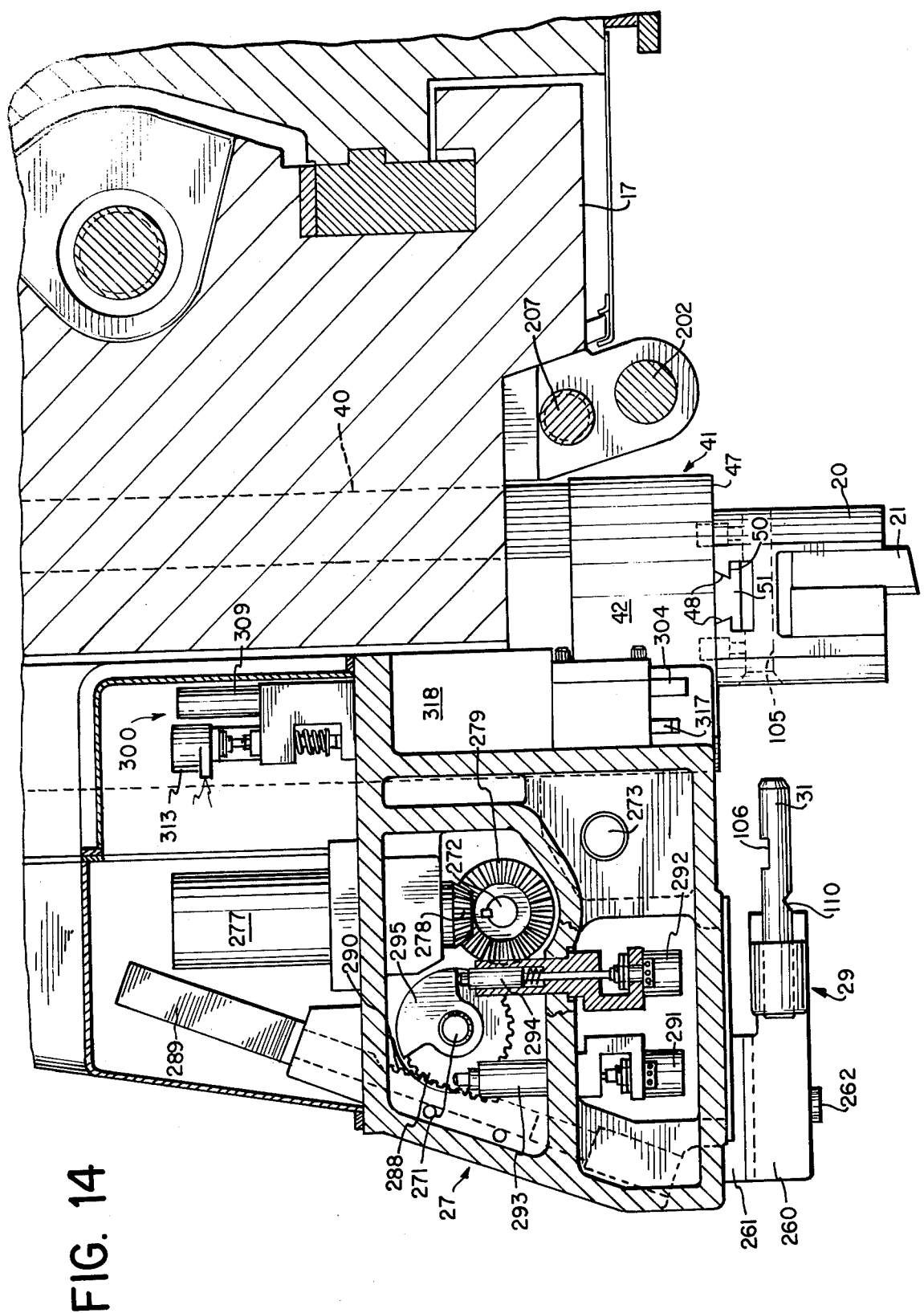
FIGS. 14 and 15 are cross sectional views as taken generally along lines 14—14 and 15—15, respectively, of FIG. 12.

To assist in the proper retention of the tool blocks 20 on the loading fingers 31, 33 during loading and unloading operations, the tool block advantageously is provided with a spring urged detent 107, held for limited sliding movement by a set screw 108 and urged in an upward direction by a spring 109. The detent 107 is arranged to be received in a suitable notch 110 (see FIGS. 14, 15) when the loading fingers are fully inserted into the tool blocks. This arrangement effectively resists displacement of the tool blocks relative to the loading fingers, except when the tool blocks are properly secured against forward-rearward motion by the clamping means or by the tool transport means.

It will be understood, of course, that each tool block carries appropriate means, not shown but fully within the competence of one skilled in the art to provide for rigidly securing an appropriate cutting tool 21.

TOOL BLOCK CARROUSEL

In the equipment of FIGS. 1 and 2, the supply or library of tool blocks is retained in rotary carrousel assemblies 22, 23. The construction of these carrousels is shown in detail in FIGS. 22–25, 28–38. In this respect, the illustrations of the carrousels 22, 23 in FIGS. 1 and 2 are highly schematic, for purposes of illustration, and are not technically accurate, and reference should be made to the more detailed views of FIGS. 22–25, 28–38 for the actual structural features.

Figure 28:
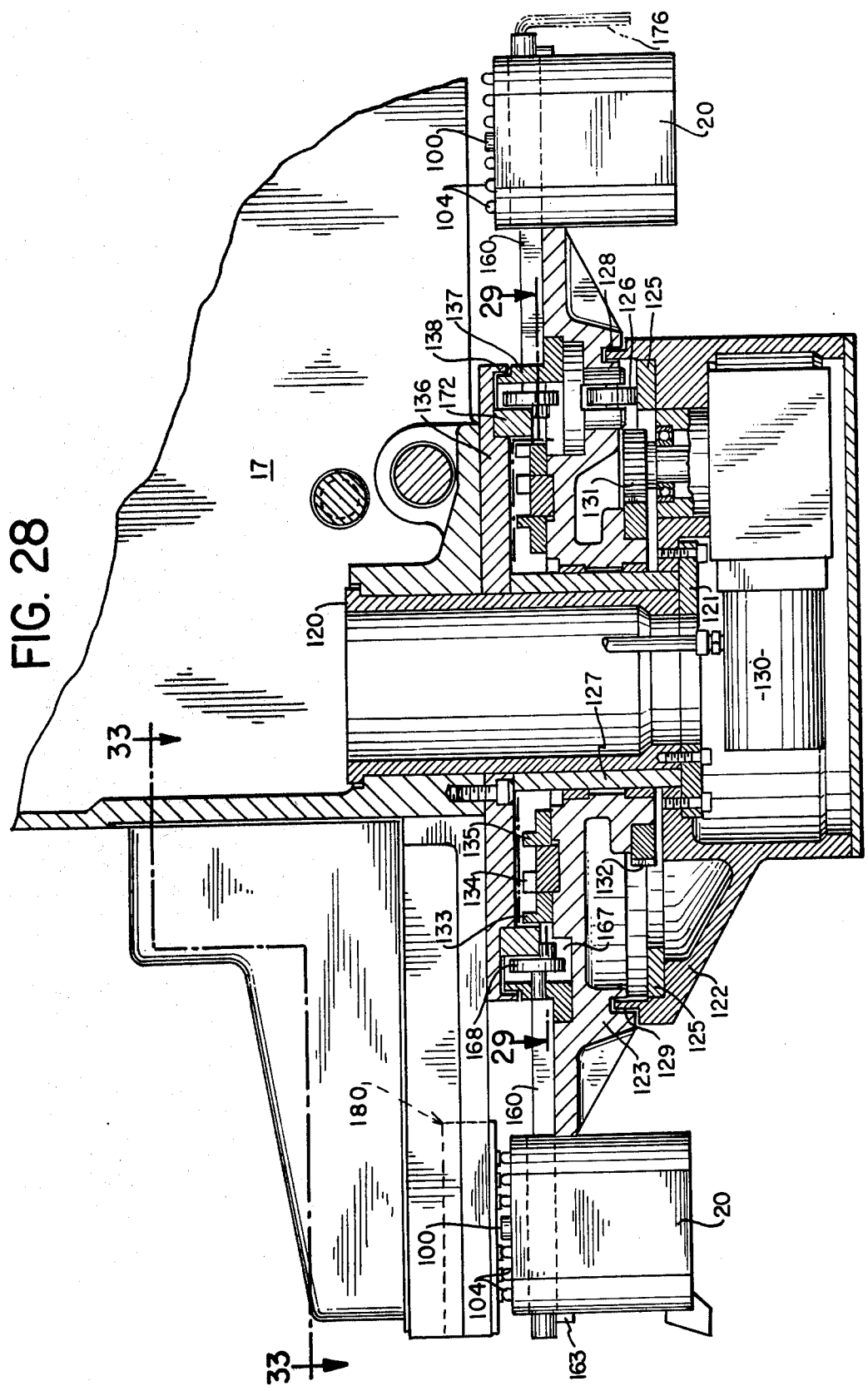
FIG. 28 is a cross sectional view taken generally on line 28—28 of FIG. 18.
Figure 29:
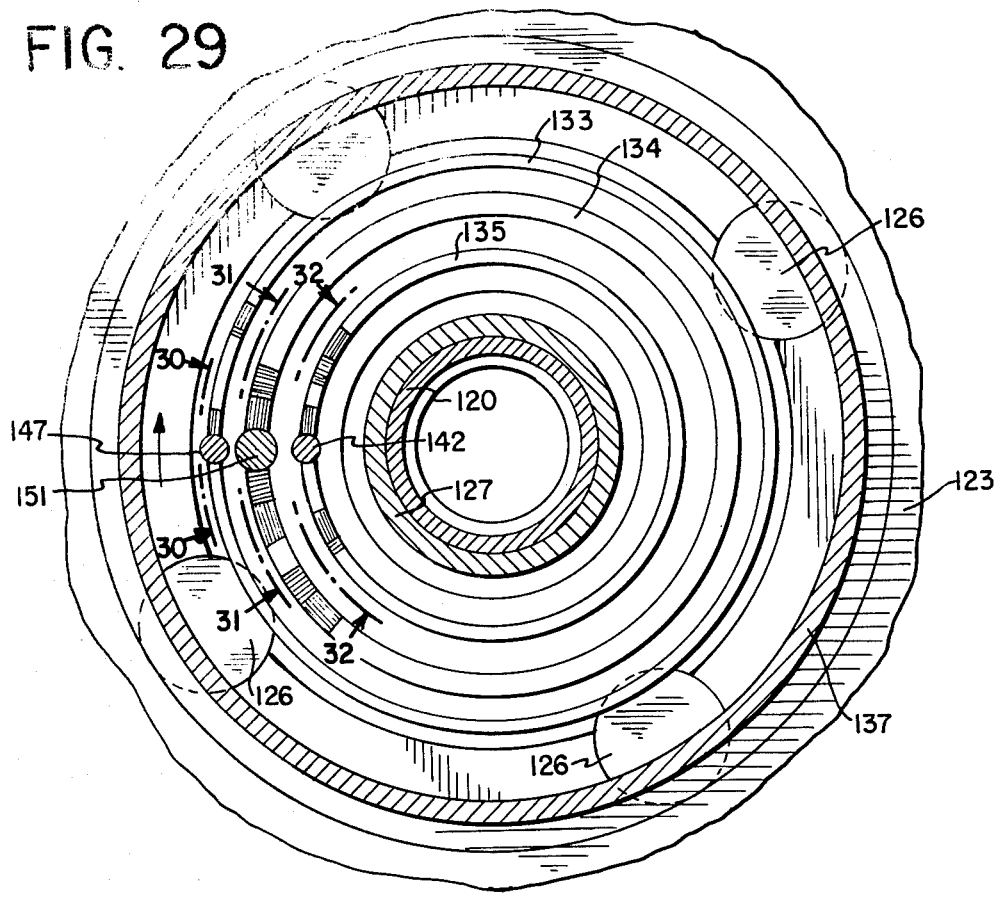
FIG. 29 is a fragmenatry cross sectional view as taken generally on line 29—29 of FIG. 28.
Figure 30:
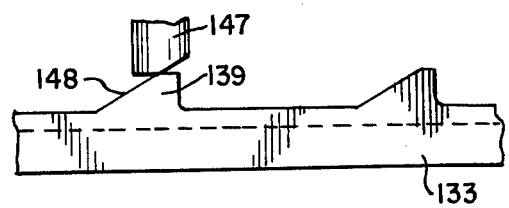
FIGS. 30–32 are enlarged, fragmentary cross sectional views taken generally on lines 30—30, 31—31, and 32—32, respectively, of FIG. 29.
Figure 31:
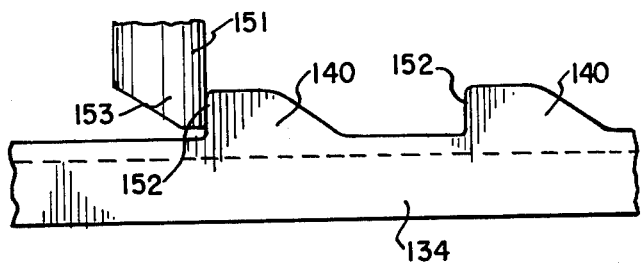
Figure 32:
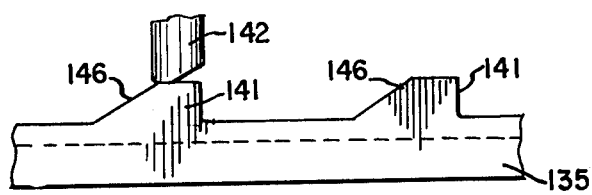
Figures 33, 34:
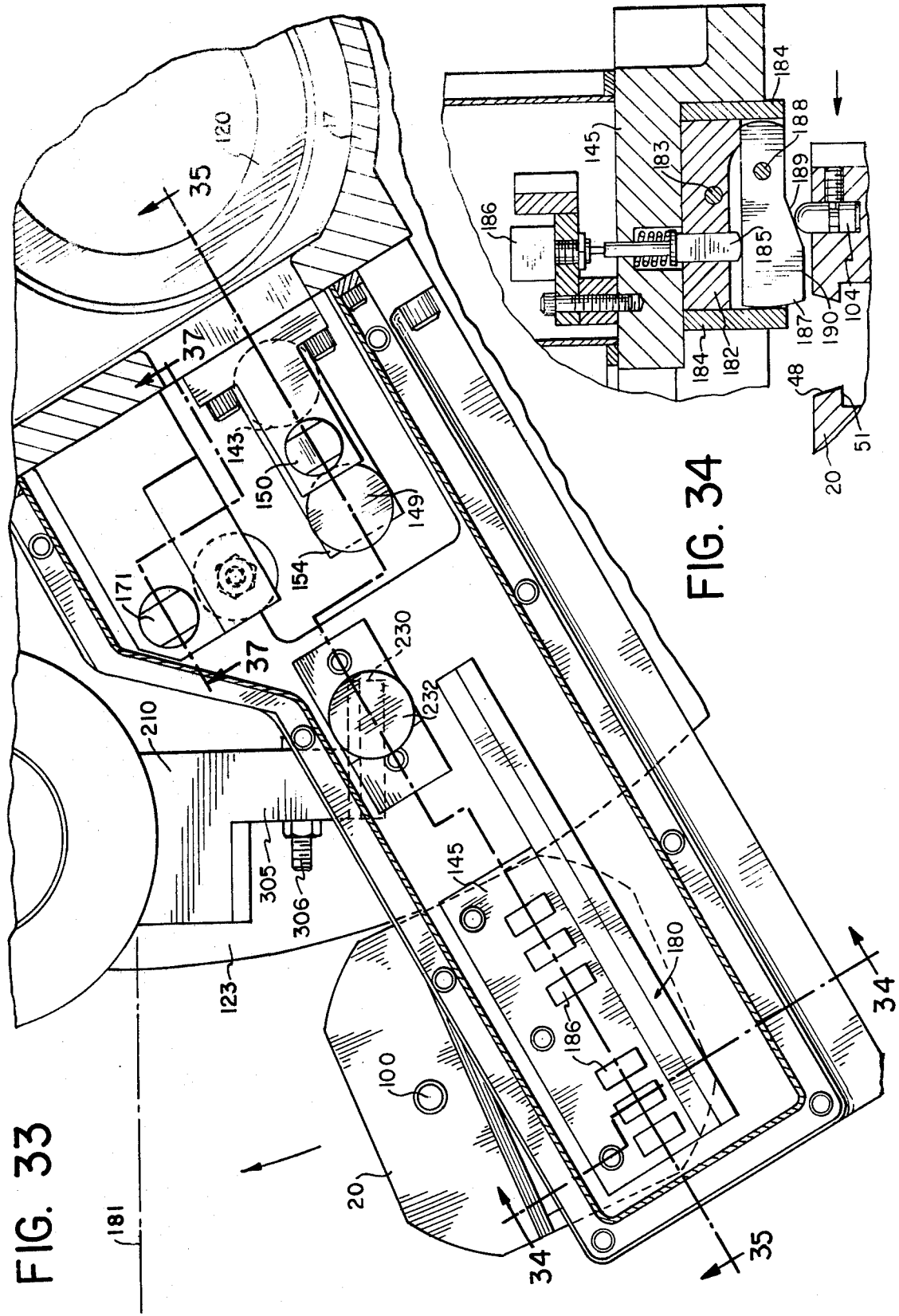
FIG. 33 is an enlarged, cross sectional view as taken generally on line 33—33 of FIG. 28.
FIGS. 34 and 35 are cross sectional views taken generally along lines 34—34 and 35—35, respectively, of FIG. 33.

With reference initially to FIG. 28, the cross rail structure 17 is arranged to support a rigid tubular spindle 120. At the lower end of the spindle 120 there is rigidly mounted, by means of a retaining plate 121, a support housing 122 for a rotatable carrousel turntable 123. The turntable 123 has mounted on it a plurality of radially outwardly extending tool block mounting arms 124, to be described in greater detail, which are arranged to be slideably received within the clamping slots 49 of the tool blocks.

In the illustrated arrangement, the turntable support housing 122 has a hardened bearing plate 125 forming a track for the support of a plurality of bearing wheels 126. A bearing sleeve 127 surrounds the lower portion of the spindle 120 and provides an axial bearing for the turntable. To advantage, the support housing 122 may be provided with an upwardly projecting annular flange 128 near its outer edge, received in a downwardly opening annular recess 129 in the turntable to provide a suitable chip seal.

In the illustrated arrangement, the carrousel turntable 123 is driven to rotate in a clockwise direction, as viewed from above, by a suitable hydraulic motor 130 driving a pinion 131 engaging a ring gear 132 secured to the turntable. For controlling the stopping and starting of the turntable, in response to programmed information supplied to it and calling for a particular tool block to be delivered to a transfer station, the table 123 is provided with a plurality of concentric control rings 133–135, secured to the upper surface of the table and substantially enclosed by means of a cover plate 136 disposed over the inner portion of the table surface and cooperating with an upwardly projecting flange 137 forming a chip seal in combination with a skirt flange 138 on the cover plate. These control rings, details of which are shown in FIGS. 29–32, are provided with indexing projections 139–141 corresponding to each index position of the turntable in which a tool block is presented at the transfer position.

The several indexing projections 139–141 are arranged to cooperate respectively with a switch actuating plunger 147 (controlling a switch 149), a stop bar 151 (controlled by an actuator device 150), and a switch actuating plunger 142 (controlling a switch 143). The switches 143, 149 and their respective actuating plungers 142, 147, are mounted on a bracket 154, which is secured to the stop bar. Thus, when the stop bar actuator 150 is retracted (raised) the switch actuating plungers 142, 147, as well as the stop bar 151, are raised above the level of the indexing projections 139–141.

At such time as the tool block code reading mechanism, to be hereinafter described, detects the approach of the preselected tool block into the loading position, a control signal is provided, energizing the actuator 150 to lower the stop bar 151, along with the switch actuating plungers 142, 147 carried thereby. Upon continued rotation of the turntable, an abutment surface 152 of the next indexing projection 140 will engage a lower portion 153 of the stop bar, causing the turntable to be stopped. To advantage, the hydraulic drive motor 130 for the carrousel turntable remains in its energized condition, although stalled out, thereby retaining the turntable firmly in its indexed position, against the bar 151.

Because of the substantial mass of the loaded turntable, provisions are made for decelerating the turntable before bringing it to an abrupt stop against the rigid stop bar 151. To this end, the index projections 141 are provided with inclined forward surfaces 146 adapted to engage and lift the actuating plunger 142 for the switch 143, somewhat in advance of the stop position. Actuation of the switch 143 causes the drive motor 130 to be decelerated to an appropriate low speed, to minimize impact when the turntable is finally stalled by the stop bar.

In conjunction with the stopping of the turntable by the stop bar 151, the actuating plunger 147, for the control switch 149, is lifted by the inclined forward surface 148 of the index projection 139. This causes the switch 149 to be actuated, providing a control signal reflecting that the turntable is in the proper load-unload position and enabling the tool change program to proceed to the next operation.

Referring now particularly to FIGS. 22–25, the carrousel turntable 123 has bolted or otherwise secured to it a plurality of tool block retaining arms 124, one for each tool block. The retaining arms are of channel-like cross section (see FIG. 24), having upwardly projecting flanges 160 at each side arranged to engage the lower surfaces of the clamping shoulders 50 and thereby to support the tool blocks 20. The block supporting arms 124 are of a configuration to be rather closely received within the clamping slots 49 of the tool blocks, to both accurately position and support the blocks that are not in service.

To prevent untimely dislodgment or displacement of a tool block, each tool supporting arm 124 is provided with a locking rod 161, which extends radially within a channel-like recess 162 in the upper portion of the support arm. At its outer end, the locking rod 161 carries a radially projecting locking lug 163. The arrangement and proportioning of the lug 163 is such that, when it is disposed in a horizontal orientation, it may be received within the confines of the clamping slot 49, permitting placement of a tool block on the arm, or withdrawal of a block therefrom. However, when the lug 163 is in a vertically downward orientation, it projects below the outlines of the clamping slot 49 to prevent removal of the tool block.

In order to release the tool block for removal, as the carrousel turntable brings a selected tool into position in the transfer station, a release rod 165 is mounted in the control housing and has a lower end portion 166 which extends through the stationary cover plate 136 and into an annular recess 167 in the turntable 123. The recess 167 is located adjacent to and is formed in part by the annular flange 137. As reflected particularly in FIG. 37, the radially inner end portion of each of the locking rods 161 extends through the annular flange 137 and mounts a disc-like lever element 168, from which a short release pin 169 projects in a radially inward direction, offset from the axis of the locking rod. When the rod 161 is rotated to a position in which the locking lug 163 is in locking relation to the tool block, the projecting release pin 169 is in the position shown in FIG. 38, somewhat below and on the "trailing" side of the rod 161 in the direction of turntable movement. As a given tool block approaches the transfer position, the release pin 169 enters a recess 170 in the release rod 165 such that, when the turntable stops, the release pin is embraced within the recess 170. At this time, a release actuator 171 is energized, drawing the release rod 165 and pin 169 upward to effect approximately 90° of rotation of the release rod 161. This causes the locking lug 163 to line up in a generally horizontal orientation, to permit removal of a tool block from, or return of a tool block to, the supporting arm 124.

To advantage, the cover plate 136 is provided directly above the area of the release pin 169 with a locking cam 172 of annular form, which overlies the release pins 169 in their lower or locking positions and prevents untimely release. A slot 173 is formed in the locking cam in the immediate vicinity of the release rod 165, permitting the release pin 169 to be raised above the lower surface 174 of the locking cam when in that one position. Subsequently, when the turntable moves on, the upraised release pin 169 is first lowered by energizing the actuator 171 in the opposite direction (or merely de-energizing it if it is a spring return device). In addition, for safety, the cam 172 may be provided with a somewhat sloped surface 175 arranged to engage and force downwardly the pin 169 should it remain in the raised or "release" position as the table advances that particular tool block station out of the transfer position.

To accommodate manual loading and unloading of tool blocks to and from the carrousel turntable, the locking cam 172 may be provided with an additional releasing slot (not specifically shown) adjacent to an operator-accessible segment of the turntable. Whenever a tool block is in such a "manual load" position, the locking rod 161 may be released, either manually with a suitable wrench 176 (see FIG. 28) or by means of an appropriate actuator similar to the actuator 171, to permit manual removal and replacement of tool blocks. The locking cam 172 may be provided with a sloped surface, similar to the surface 175 shown in FIG. 38, to automatically return the locking rod 161 to its locking orientation as the table moves on past the manual load position.

Searching out and identifying the proper tool selected by the machining program is, in general, a well-known procedure. The apparatus of the invention, however, incorporates a somewhat improved mechanism, of a suitably rugged and reliable nature, which provides highly effective control over the searching and identification process. As previously described, each tool block carries a designated number and arrangement of identification pins 104, which typically serve to provide a binary code identification for that tool. When the machining program calls for the tool, by means of a corresponding binary code input to the tool selection system, the carrousel turntable 123 will be rotated until the tool block bearing the desired binary code identification passes a code reading device, generally designated by the numeral 180, which is carried by the control mounting plate 145 of the control housing. As reflected in FIG. 33, the code reading device 180 is angularly displaced somewhat ahead of the axis 181 of the tool block transfer position, so as to read the identification of each tool block as it approaches that station. If the tool block coding agrees with that of the called-for tool an appropriate enabling circuit (not shown) is activated, so that the stop bar 151 is lowered, along with the switch 143, 149, to stop the turntable as the properly identified tool block moves into the transfer position.

In accordance with one aspect of the invention, the code reading device comprises an assembly of spacer blocks 182 arranged side-by-side relation and held in position by means of a suitable through bolt 183 and bolted clamping plates 184. Each of the spacer blocks 182 has an opening to receive a switch actuating plunger 185 associated with a separate identifier switch 186. Underneath each of the actuating plungers 185 is a sensing lever 187, pivoted to the spacer block assembly by a rod 188 and extending in a generally horizontal direction "downstream" from the pivot rod 188 in the direction of travel of a tool block 20 passing under the code reading device. Each of the sensing levers 187 is provided with a gradually sloped cam surface 189 followed by a dwell surface 190 of somewhat greater length than the width of the identification pins and actuating plungers.

As shown in FIG. 35, the sensing levers 187 are aligned directly above each of the recesses 103 provided in tool blocks 20 for the reception of identification pins 104. Thus, when a tool block passes under the code reading device, those ones of the sensing levers 187 which lie above identification pins 104 will be pivoted upward, while those levers which overlie empty recesses 103 will not be affected. The number and combination of the switches 186 which are thus actuated by upward pivoting movement of the sensing levers 187, and consequently upward movement of the associated actuating plungers 185, will reflect the coded identification of the particular tool block.

The interposition of the pivoted sensing levers 187 between the identification pins 104 and the actuating plungers 185 provides several advantages. First, the switch actuating plungers 185 "see" essentially only a vertical movement from the pivoting motion of the sensing levers. The levers, in turn, are better adapted than the plunger 185 to translate the horizontal motion of the identification pins 104 into a vertical sensing movement, because the relatively extended link of the levers accommodates use of a shallow incline on cam surface 189. Also, the pivoted support for the sensing levers 187 effectively isolates any horizontal frictional drag of the identification pins 104 from the vertically movable plungers 185, and thus assures more reliable actuation. As reflected particularly in FIG. 134, the sensing levers 187 may be provided with a dwell surface 190 of somewhat extended length, so that the sensing signal can be held for an appropriate interval.

TOOL TRANSPORT MECHANISM

When a selected tool block 20 is presented to the transfer position of the carrousel, it is, at an appropriate time, picked up by a tool transport mechanism and conveyed over to the ram housing for eventual loading into operating position in the ram itself. To this end, the invention provides for the pick up and transporting of the tool block during the course of machining operations with the previously called-for tool block, such that the next tool block called for by the program is in a ready position, at the ram housing, when the machining cycle next calls for a tool change.

Figure 21:
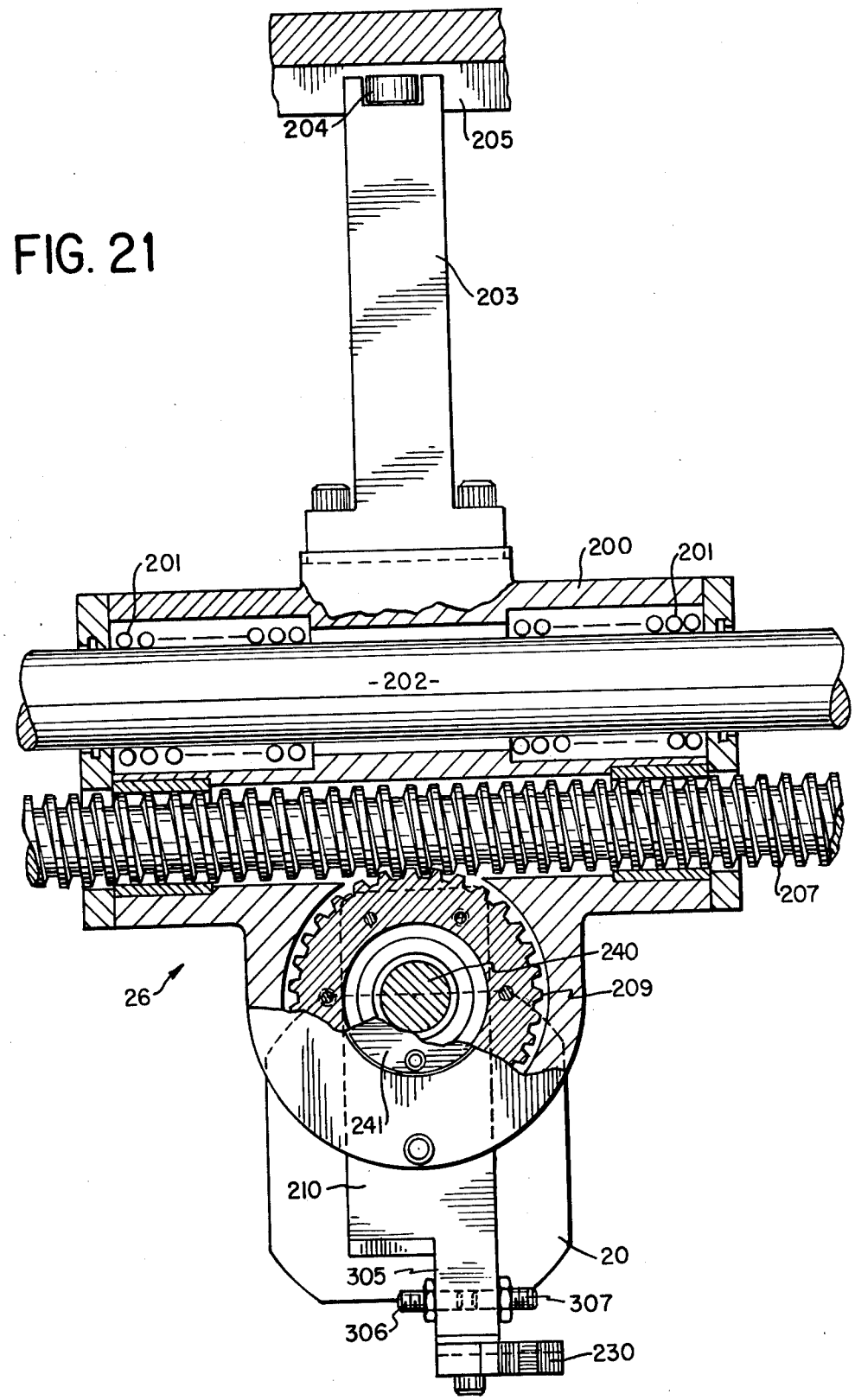
Figure 26:
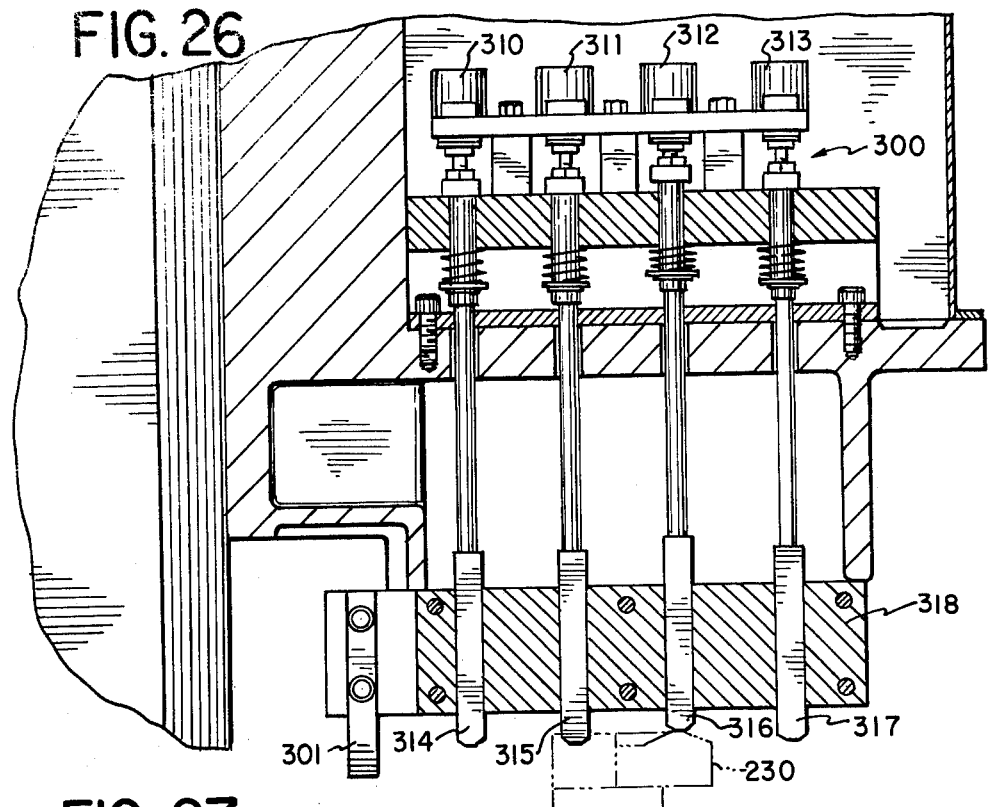
FIGS. 26 and 27 are fragmentary cross sectional views taken generally on lines 26—26 and 27—27, respectively, of FIG. 19.

The tool transport carriage of the invention, is shown in detail in FIGS. 19-25, and is identified by the reference numeral 26 in FIG. 2. With reference initially to FIGS. 19-21, the tool transport carriage 26 comprises a housing 200 containing a pair of spaced linear ball bearings 201, by means of which the housing 20 is supported on a guide rod 202. To advantage, the guide rod 202 may extend across the full width of the cross rail 17, being supported at its ends in the cross rail and at intermediate points by the ram housings 14, 15.

Secured to the carriage housing 200 is a guiding arm 203 which extends in a rearward direction and mounts a pair of roller bearings 204 at its rearward extremity. The roller bearings 204 straddle a guide rail 205 secured to the cross rail 17 by means of bolts 206. The guide rail 205 may extend along the full width of the cross rail and, together with the guide rod 202, provides for the guided transverse movement of the transport carriage.

Controlled transverse movement of the carriage housing 200 is effected by means of a threaded shaft 207 driven by a suitable hydraulic motor or the like (not specifically shown) located in the cross rail extension 24, 25. In this respect, in the double ram machine illustrated in FIGS. 1 and 2, while the guide rod 202 and rail 205 may extend across the full width of the machine, for convenience, separate threaded shafts 207, 208 desirably are provided at each side of the machine for separately controlling movements of the transport carriages for the respective ram housings 14, 15.

In accordance with one aspect of the invention, to be more fully described, the threaded driving shaft 207 is drivingly connected to the transport carriage housing 200 by means of a worm gear 209. The gear 209 is normally nonrotatable, such that, upon rotation of the threaded shaft 207, the housing 20 will be advanced transversely toward or away from the ram housing 14, depending upon the direction of rotation of the shaft.

A tool block support arm 210 is secured to the transport carriage housing 200, by means of bolts 211, and extends somewhat forward of the carriage housing. The support arm includes flanged tool block engaging element 212 arranged to be slideably received within the clamping slot 49 of a tool block 20, with its outwardly extending flanges 213 extending underneath the clamping shoulders 50 of the tool block, so that the weight of the tool block may be supported on the flanges. In this respect, the proportioning and dimensioning of the tool block engaging element 212 is such that it may be received within the clamping slot 49 simultaneously with the radially projecting support arm 124 which is secured to the carrousel turntable. Thus, the overall width of the tool block engaging element 212, as defined by the flanges 213, is slightly less than the internal width of the channel-like arm 124 as defined by its upwardly extending flanges 160 (see FIG. 24). Likewise, the thickness dimension of the flanges 213 is slightly less than the height of the upwardly extending flanges 160. The relationship of the supporting element 212 and the support arm 124, when simultaneously received within the clamping slot 49 of a tool block, is reflected in FIG. 19.

Prior to picking up a tool block, the transport carriage 26 is moved laterally to a retracted position, in line with the transfer axis 181 of the carrousel and between a tool block 20 and the center of the carrousel. This is reflected in FIG. 22 of the drawings. In this position, the carrousel may be rotated without interfering with the transport carriage 26. In this respect, the flanges 160 of the tool block supporting arms 124 are removed or recessed in the areas underneath the pick up position of the carriage 26, so as to avoid interference between the tool block engaging element 212 and the support arm.

When it is desired to engage a tool block and transport it laterally to the ram housing, the threaded shaft 207 is rotated to move the transport carriage to the left, as viewed in FIG. 22. This causes the tool engaging element 212 to be advanced into the clamping slot of the tool block, above the support arm 124, substantially in the manner reflected in FIG. 19. The tool block will, at this time, have been released for transfer movement by rotation of the locking lug 163.

Initial lateral movements of the transport carriage 26 will not result in movement of the tool block 20, as the tool block engaging element 212 merely slides along within the clamping slot. However, when the tool engaging element 212 reaches an appropriate position with respect to the tool block (typically located over its center of gravity) an abutment lug 214, associated with the tool block engaging element 212 contacts one of the locating lugs 100 of the tool block. This provides a positive engagement between the transport carriage 26 and the tool block, so that the tool block is positively conveyed laterally along with the carriage.

To advantage, means are provided for securing the tool block 20 in fixed relation to the transport carriage 26, to prevent any relative movement therebetween at any time during the tool block transport operations. To this end, the tool engaging element 212 is provided with a slot 216 for the reception of a locking slide 215. The slide 215, which is arranged for guided movement in a direction transverse to the movements of the transport carriage 26, is biased toward a normally extended position, by means of a spring 217 acting on a plunger 218 which in turn engages a pin 219. The pin 219 extends vertically upward from the locking slide 215 and is received in an elongated 220 in the support arm 210.

As reflected in FIGS. 22, 23, the locking slide 215 is urged to a retracted position by means of a camming finger 221, which is secured to a fixed port 222 of the carrousel mechanism, by means of bolts 223. The camming finger 221 is arranged to be received in an appropriate recess 224 formed in the support arm 210 and tool block engaging element 212, as the transport carriage 26 moves toward and away from the carrousel. The lower portion of the camming finger 221 forms a ram rail 225 having an inclined end surface 226 arranged to be received within an opening 227 in the locking slide. The opening 227 has an inclined camming surface 227a arranged for cooperative interaction with the inclined surface 226.

As reflected in FIG. 22, when the transport carriage 26 is in its retracted position, prior to pick up of a tool block, the locking slide 215 is held in a fully retracted position by the camming finger 221. Subsequently, as the transport carriage 26 moves to the left, the locking slide will be retained in its retracted position until the slide clears the outer end of the camming finger 221, substantially as reflected in FIG. 23. This releases the slide for projected movement in a rearward direction, serving as to trap the locating lug 100 between the abutment 214, on one side, and a surface 228 of the locking slide, on the other side. The tool block is thus releasably "locked" onto the transport carriage and retained against accidental dislodgement. However, the retaining surface 228, as indicated in FIG. 23, is an inclined camming surface, such that it is possible to forcibly remove the tool block from the transport carriage at desired times, for loading of the tool block onto the machine ram. Likewise, the opposite side of the locking slide has an inclined cam surface 229, permitting the tool block to be forcibly reapplied to the transport carriage at the end of a tool loading cycle, to assure that the tool block is properly retained in position on the transport carriage during its return movement to the carrousel.

During tool return operations, the locking slide 215 reengages the cam rail 225 as the transport carriage approaches the carrousel. Upon continued movement of the carriage toward its retracted position, shown in FIG. 22, the locking slide is cammed open, permitting the transport carriage to be fully retracted from and to thereby release the tool block in the appropriate position on the support arm 124. In this respect, since the tool block itself carries its own identification, there is no need to match up a particular tool block with a particular supporting arm 124.

To facilitate control over the tool change sequence, the tool transport carriage 26 desirably carries a switch actuating cam 230 arranged for cooperation with an actuating plunger 231 and control switch 232 carried by the control mounting plate 145 fixed to the cross rail extension 24, above the carrousel turntable. As reflected in FIG. 35, when the transport carriage 26 reaches its retracted position, the actuator 231 is displaced upwardly by the cam 230, actuating the switch 232 and thereby signaling the presence of the transport carriage in its retracted or home position.

In accordance with one of the specific features of the invention, a novel drive arrangement is provided for the transport carriage 26, which enables the carriage to be driven by the lead screw shaft 207 from the tool pick up position, at the carrousel, over to a ready position adjacent to and in contact with the ram housing 14. Since the position of the ram housing is a variable, and, indeed, it may be varying during the course of machining operations, after the transport carriage 26 has been driven to the ready position, the drive system for the transport carriage includes novel features permitting the transport carriage to move along its guided path, as necessary, to follow the movements of the ram housing 14 and thus maintain the ready position of the transport carriage relative to the ram housing until the tool change is called for. To this end, the transport carriage housing 200 mounts a vertically oriented shaft 240, which is supported at its lower end in the extending arm 210 and at its upper end in a cap 241. The shaft 240 is secured against rotation and has keyed or otherwise secured to it a torque limiting clutch-like mechanism, generally designated by the reference numeral 242. To advantage, the torque limiting mechanism may be the so-called "Autogard" torque limiter, manufactured by Stearns Electric (Division FMC Corporation), Milwaukee, Wisconsin, as described for example in Bulletin No. 1580.00, of Dec. 1, 1971, published by that company.

The torque limiting mechanism 242 includes a pair of driving discs 243, 244, provided with a plurality of recesses 245, 246 in which are received a like plurality of driving balls 247. The balls 247 are held by a retainer plate 248, which accommodates controlled radially outward movement of the balls from their normal positions, received in the sockets or recesses 245, 246.

As reflected in FIG. 19, the upper driving plate 243 is secured in fixed relation to the worm gear 209, which in turn is mounted by ball bearings 249 for free rotation on the fixed shaft 240. The lower driving plate 244 is secured slideably but nonrotatingly to a sleeve 250 which, in turn, is secured to the shaft 240 by a key 251. The lower driving plate 244 is slideable vertically on the sleeve 250, but is urged upwardly thereon by means of a compressed coil spring 252 adjustably set by a compression nut 253.

Within the normal operating torque limits of the torque limiting device 243, the drive plates 243, 244 are effectively locked together by reason of reception of the drive balls 247 in their respective sets of recesses 245, 246. Under these conditions, the worm gear 209 is locked against rotation, and its cooperative relationship with the lead screw shaft 207 is simply that of a conventional nut. Thus, to drive the transport carriage 26 from the pick up position, at the carrousel, over to its ready position of the ram housing 14, the lead screw shaft 207 is driven, typically by a suitable hydraulic motor (not shown) in a direction to cause the transport carriage to advance along the lead screw. When the transport carriage reaches the appropriate position relative to the ram housing (a position determined by means hereafter to be described) the transport carriage engages a fixed abutment surface and is thus prevented from further movement along the lead screw. As the lead screw continues to drive, torque builds up instantly on the worm gear 209 and soon becomes great enough to dislodge the driving balls 247 from their recesses 245, 246 in the driving plates. Once released, the driving balls move radially outward, beyond the annular area including the recesses 245, 246, so that the driving plates are connected only by the relatively freely rotating balls, permitting the worm gear 209 to rotate freely within the housing, without advancing it.

If, after release of the torque limiting mechanism 242, the ram housing moves toward the carrousel, in the course of a mechining operation, it merely pushes the transport carriage along with it, with the worm gear 209 continuing to rotate freely. Upon movement of the ram housing in the opposite direction, the driving balls will temporarily reengage, and the transport carriage 26 will follow along, retaining its proper position alongside the ram housing.

Subsequently, when it is desired to return the transport carriage 26 to the carrousel, at the end of a tool changing operation, the lead screw shaft 207 is reversed in direction, causing the upper drive plate 243 to rotate in the opposite direction. By means of slotted openings 254 in the retainer plate 248 (see FIG. 20) the driving balls 247 are guided back into the recesses 245, 246 to return the drive plates 243, 244 to their "locked" relationship. This once again locks the worm gear 209 in fixed position, in which it functions effectively as a nut, and permits the lead screw shaft 207 to drive the transport carriage in the return direction.

For many purposes it will be adequate and appropriate to utilize, in place of the "Autogard" torque limiter, a more simplified and conventional form of slip clutch, which will enable the worm gear 209 to rotate relative to the housing of the transport carriage. A simple slip friction clutch, for example, will permit the worm gear to be rotated under a relatively constant torque when the transport carriage is against the ram housing. With this arrangement, the transport carriage will be held against the ram housing with a force directly corresponding to the level of slipping torque in the slip friction clutch, as will be understood. Where the continuous loading of the slip friction clutch is not detrimental, in terms of heat generation or otherwise, the slip friction clutch may be advantageous because of its lower cost and overall general simplicity.

By means to be described, the precise spaced relationship of the transport carriage 26 relative to the ram housing 14 is determined by selectively operable abutment stops. When the carriage is in the desired ready position, and the ram has been retracted to the predetermined tool change position, the loader may be actuated to simultaneously engage the new tool block in the ready position and the old tool block in the ram, to effect the final tool change operations.

With reference particularly to FIGS. 12–17, the loader 19 is shown to include a load supporting arm 260, which is secured to a loader slide 261, by means of suitable bolts 262. The loader arm 260 provides a cantilever support for a pair of tool engaging fingers 31, 32.

The loader slide 261 includes a plurality of antifriction rollers 263, which are confined in opposed channel-like guide tracks 264, 265 fixed in the loader housing 27. In the illustrated arrangement, the loader housing 27 is fixed to the ram housing 14. The housing includes pairs of bearing supports 268–270 for splined and threaded control shafts 271 and 272 respectively, and a guide shaft 273, for operating and guiding a loader carriage 274, formed in part by a pair of frame plates 266, 267. The loader carriage is supported and guided principally by the lead screw shaft 272, which it engages by means of a correspondingly threaded nut 275, and by the guide bar 273, which it engages through an antifriction linear rolling bearing assembly 276. A suitable hydraulic motor 277 (FIG. 14) drives the lead screw shaft 272 through a pair of bevel gears 278, 279, to effect the desired lateral transverse movements of the loader carriage.

Figure 15:
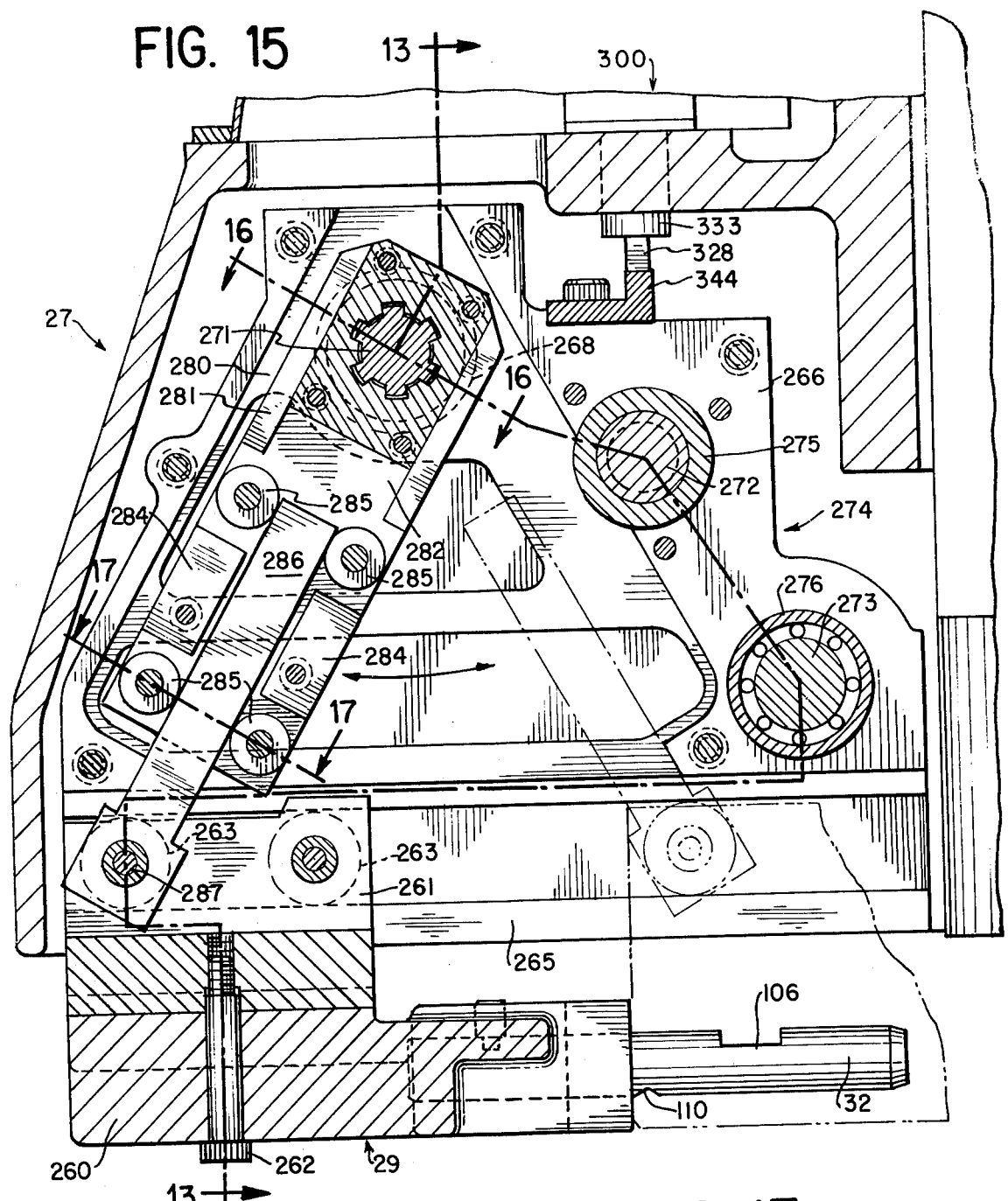
Figure 16:
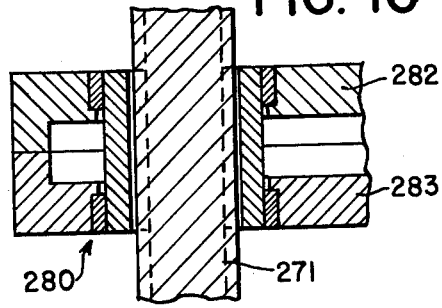
FIGS. 16 and 17 are enlarged, fragmentary cross sectional views as taken generally along lines 16—16 and 17—17, respectively, of FIG. 15.
Figure 17:
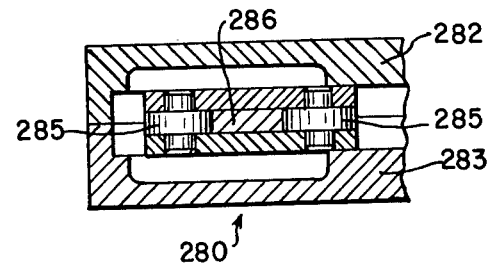

Forward and rearward movements of the loader slide 261 and its tool block engaging fingers 31, 32 is effected by means of a rocker arm assembly 280, which has a slideable but nonrotatable association with the splined control shaft 271, as reflected in FIG. 15. The rocker arm assembly 280 includes a rotatable arm 281, comprising a pair of spaced plates 282, 283 (FIG. 17) separated by spacers 284 and mounting spaced pairs of antifriction rollers 285. An extension arm 286 is closely received between the spaced plates 282, 283 and is supported for extending and retracting movements along the axis of the arm 281, by means of the spaced antifriction rollers 285. At its outer end, the extension arm 286 is pivoted to the loader slide 261, desirably on one of the axle shafts 287 journaling the antifriction rollers 263. Thus, upon rocking movement of the arm assembly 280 from the position shown in full lines in FIG. 15 to the position shown in broken lines, the loader slide 261 may be guided through a horizontal, straight line path while the swingable arm 281 goes through an arcuate path, with the extension arm 286 either extending or retracting as appropriate to accommodate for the variation between the respective straight line and arcuate paths.

In the illustrated apparatus, the splined shaft 271 is provided at one end with a drive gear 288. To advantage, this gear may be driven throughout the necessary arc of rotation by means of an hydraulic actuator 289 (FIG. 14) connected to a rack 290, which is guided in a meshing relationship with the gear 288. Typically, the loader slide 261 will have only two operating positions, the first being fully forward (retracted) and the second being fully rearward (extended). Thus, appropriate fixed abutment stops may be provided to control the motions of the actuator 289 for retracting or extending the loader slide.

For relating the loader operations to the control program, a pair of control switches 291, 292 are provided in the loader housing, arranged to be operated by actuator assemblies 293, 294. These respective actuator assemblies are contacted by an arcuate segment 295 keyed or otherwise secured to the splined shaft 271. Thus, when the splined shaft 271 is rotated to retract the loader carriage, the switch 292 is actuated to signify that condition to the control system, whereas counter-clockwise rotation (as viewed in FIG. 14) of the splined shaft to extend the loader carriage will cause the switch 291 to be actuated.

With reference now to FIGS. 3A–7H, there is illustrated a sequence of operations of the transport carriage 26 and loader 29, as occurs in a tool change sequence for various combinations of left-hand and right-hand tool blocks. The specific control elements provided for properly positioning the transport carriage and motor carriage at various stages of these operations will be described hereinafter.

Figure 3A:
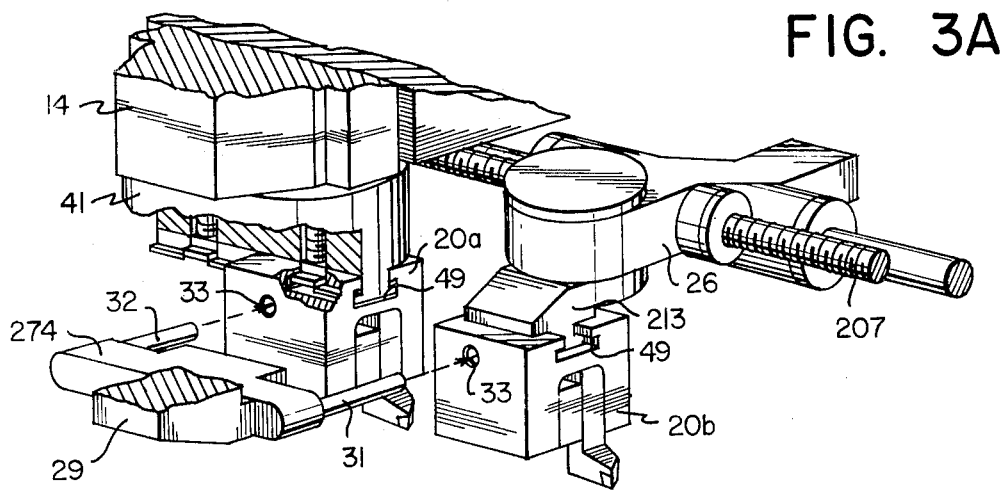
FIGS. 3A–3H are sequential, perspective views illustrating the principles of operation of the tool loading mechanism incorporated in the apparatus of FIGS. 1 and 2, in connection with the removal of a right hand tool block and a replacement of it by a second right hand tool block.

FIG. 3A illustrates a right-hand tool block 20a mounted in the ram 14, and a second right-hand tool block 20b supported in the transport carriage 26 in position to be exchanged for the tool block 20a already mounted in the ram. Since the tool block engaging fingers 31, 32 of the loader 29 are spaced on fixed centers, a first requirement is that the respective tool blocks 20a, 20b be initially spaced apart such that their apertures 33 have the same spacing as the fingers 31, 32. Since the position of the previously used tool block 20a is fixed by the ram, the ready position of the transport carriage 26 is determined by the right-hand or left-hand characteristic of the previously used tool block. In FIG. 3A, the transport carriage 26 is shown to be in a right-hand ready position.

Figure 3B:
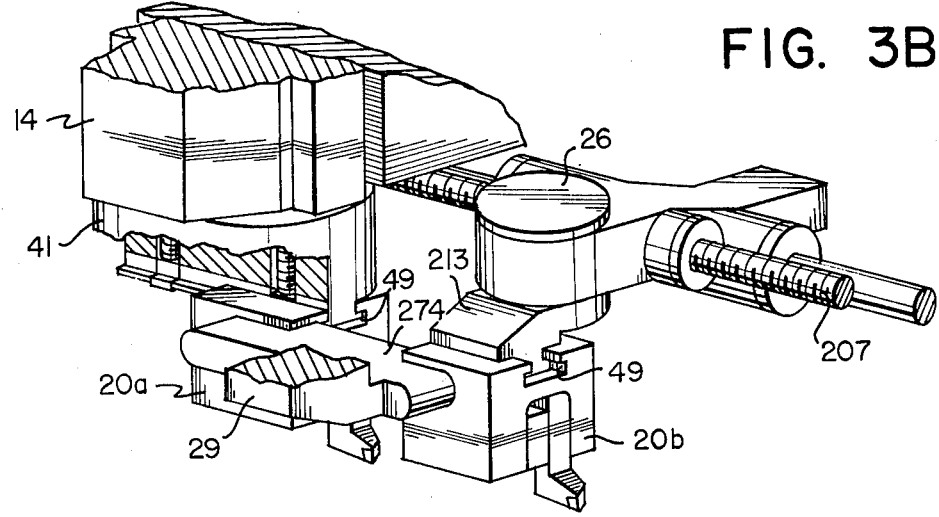
Figure 3C:
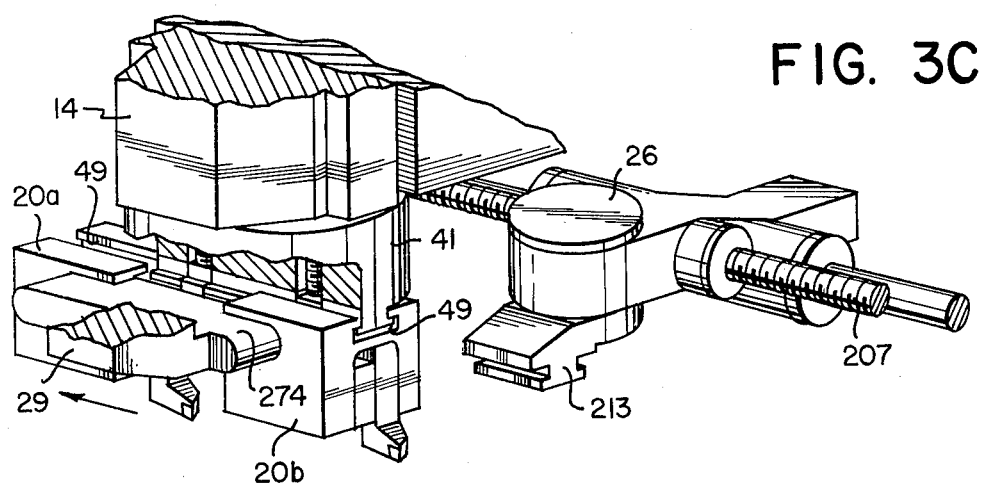
Figure 3D:
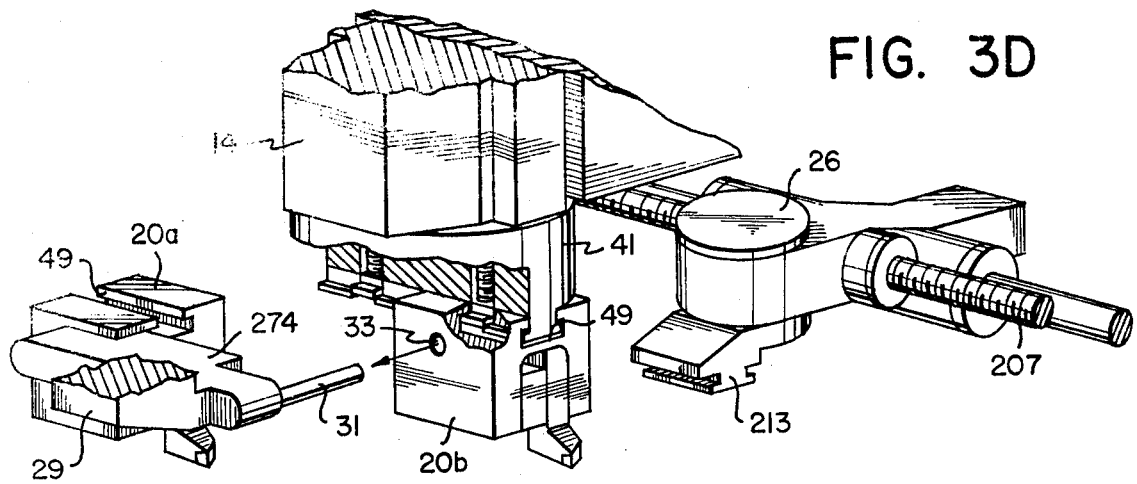

At the commencement of a tool change sequence, the loader 29 is actuated to project the fingers 31, 32 rearward, into the openings 33 in the respective tool blocks. The fingers are inserted to a point at which the detent elements 107 engage the notches 110 in the loading fingers. Thereafter, the loader 29 is actuated to move transversely to the left, simultaneously moving both of the tool blocks 20a, 20b along with it. The previously used tool block 20a will, of course, have been released by the ram clamping mechanism. This sequence is illustrated in FIGS. 3B and 3C.

In the example of FIG. 3, the new tool block 20b is also a right-hand block and thus is intended to be placed and clamped in the right-hand side of the ram 14. To this end, the transverse loading movement of the loader 29 is controlled to stop when the tool block 20b is properly positioned in the right-hand side of the ram 14, as reflected in FIG. 3C.

In accordance with the invention, the spacing between the loading fingers 31, 32 is such that, with the loading fingers in engagement with a pair of tool blocks 20a, 20b, and the new tool block 20b in a right-hand position on the ram, the initial or previously used tool block 20a is clear of the ram on the left-hand side. Thus, after securing of the new tool block 20b in the ram, by actuation of the clamping means heretofore described, the loader 29 is withdrawn in the forward direction, as reflected in FIG. 3D, until the loading finger 31 is clear of the tool block 20b. The previous tool block 20a remains connected to the loader finger 32, by means of the detent 107.

After its forwad or retracting movement, the loader 29, now supporting only the previously used tool block 20a, is traversed to the right, over to a predetermined load return position. As will appear, the loader 29 may have a single load return position for either left or right-hand tool blocks inasmuch as the load return position for a left-hand tool block will also serve for a right-hand tool block.

Figure 3E:
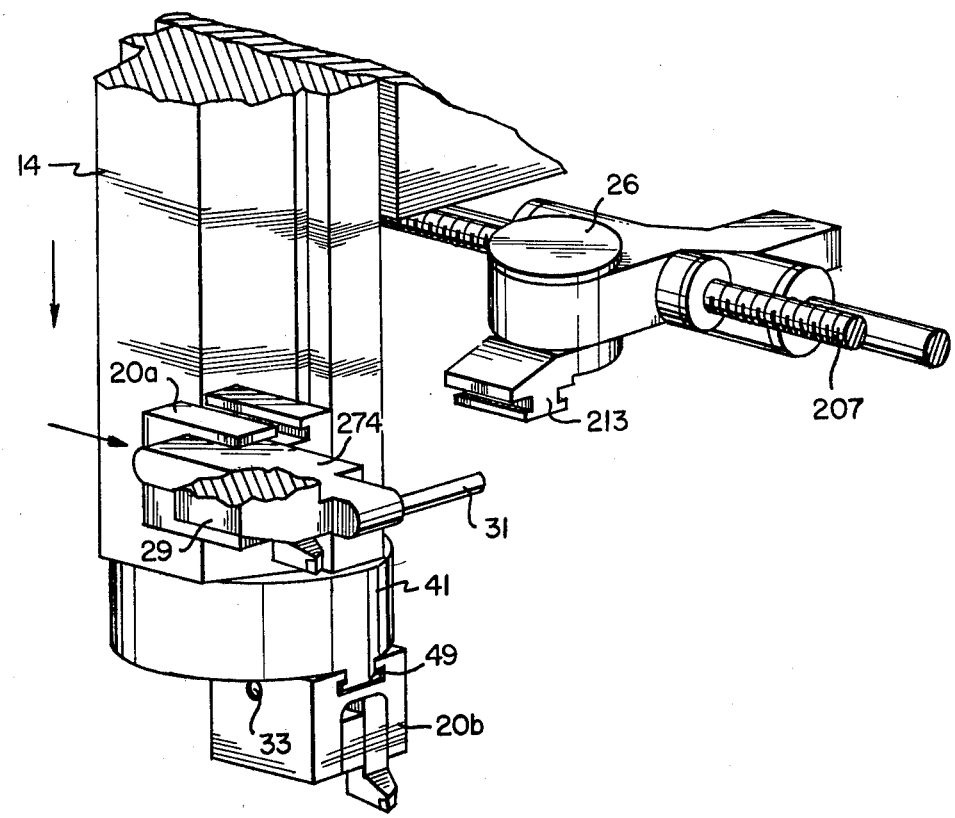

As soon as the loader has withdrawn the previously used block from the ram, the ram can be returned to its working position and machining operations can be resumed while the loader continues its transfer functions (see FIG. 3E).

Figure 3F:
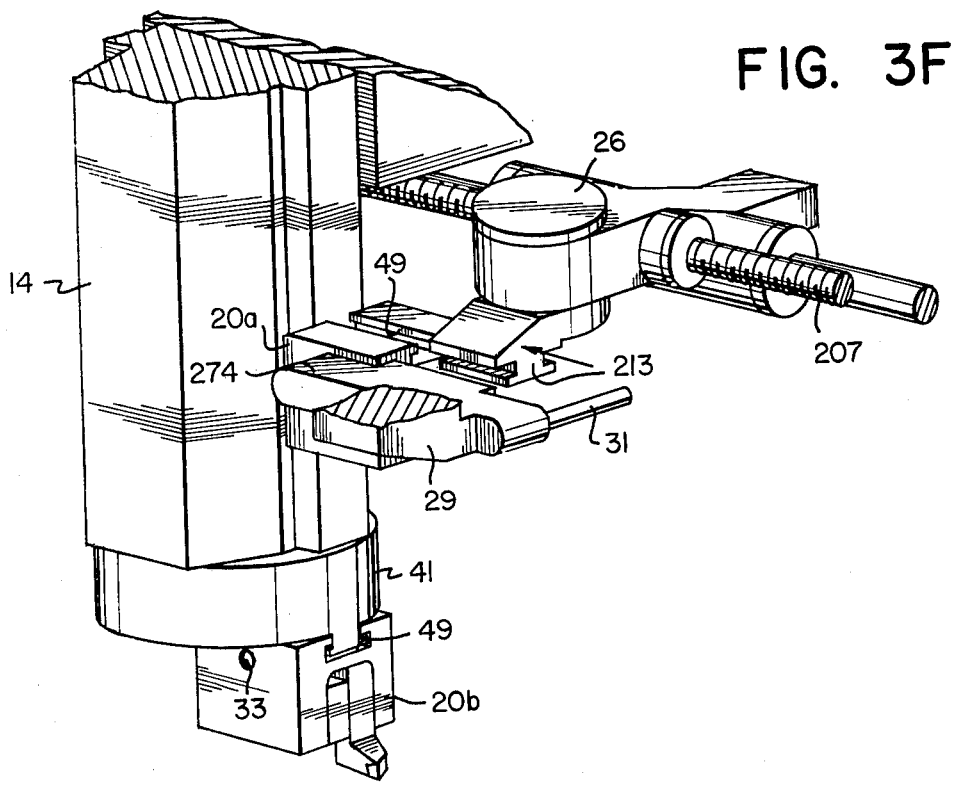
Figure 3G:
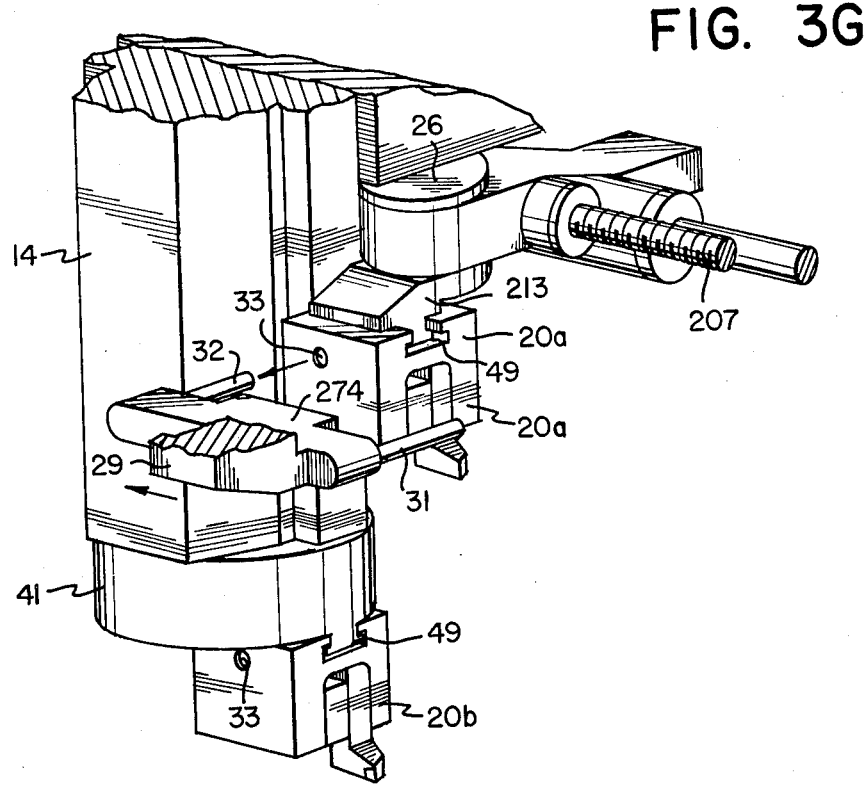
Figure 3H:
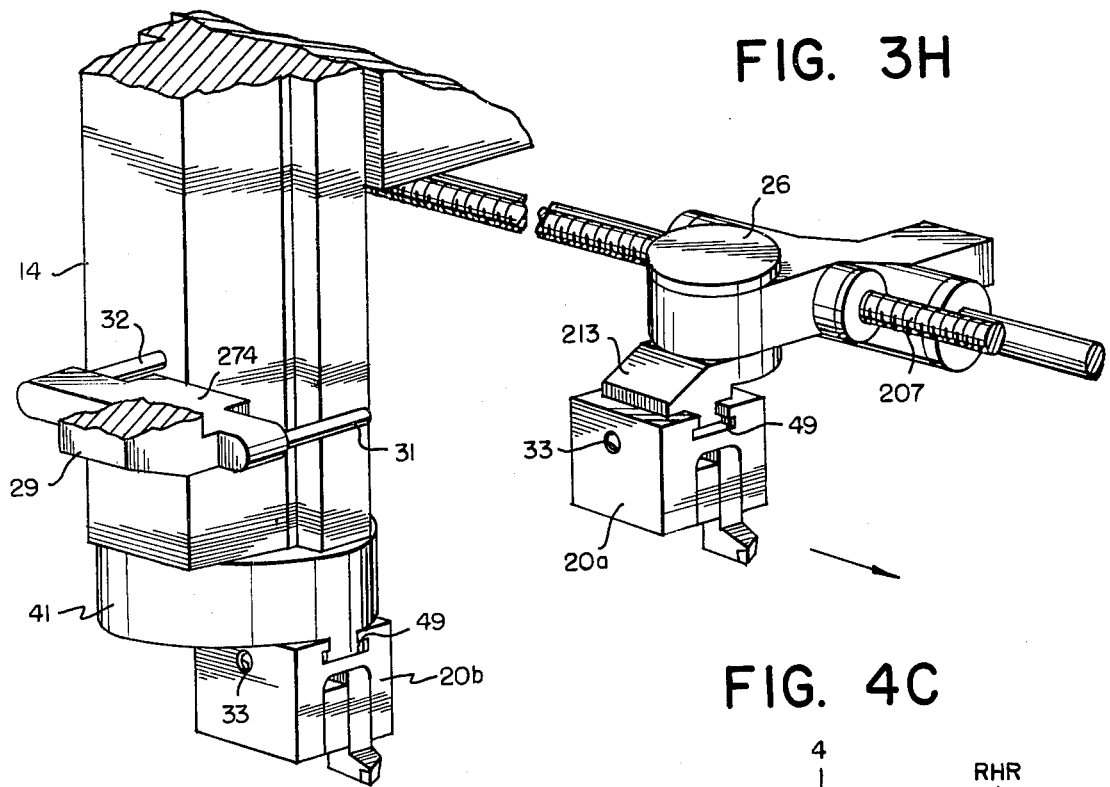

After reaching the load return position, the loader 29 is actuated to its forward or extended position, carrying the tool block 20a into alignment with the transport carriage 26. With the loader in the extended or forward position, in the load return position, as shown in FIG. 3F, the transport carriage 26 is traversed to the left, into alignment with the load return position of the previously used tool block 20a. The tool block engaging element 213 enters the clamping slot 49, as reflected in FIG. 3G. As this occurs, the loader 29 remains in engagement with the tool block 20a, holding it against lateral movement. Thus, as the transport carriage moves to the left to the position shown in FIG. 3G, the inclined cam surface 229 of the locking slide 215 (FIG. 23) engages the tool block locating pin 100, causing the slide to be momentarily displaced. This results in the locating pin 100 being releasably locked to the transport carriage, between the abutment lug 214 and the locking slide 215. Thereafter, the loader carriage may be retracted, withdrawing the finger 32 from the tool block aperture and permitting the transport carriage 26 to be returned to the carrousel, by reverse rotation of the lead screw 207, as reflected in FIG. 3H. The loader 29 is returned to a ready position, in which its left-hand loading finger 32 is properly aligned with respect to the now-loaded tool block, in readiness for the next tool change sequence.

Figure 27:
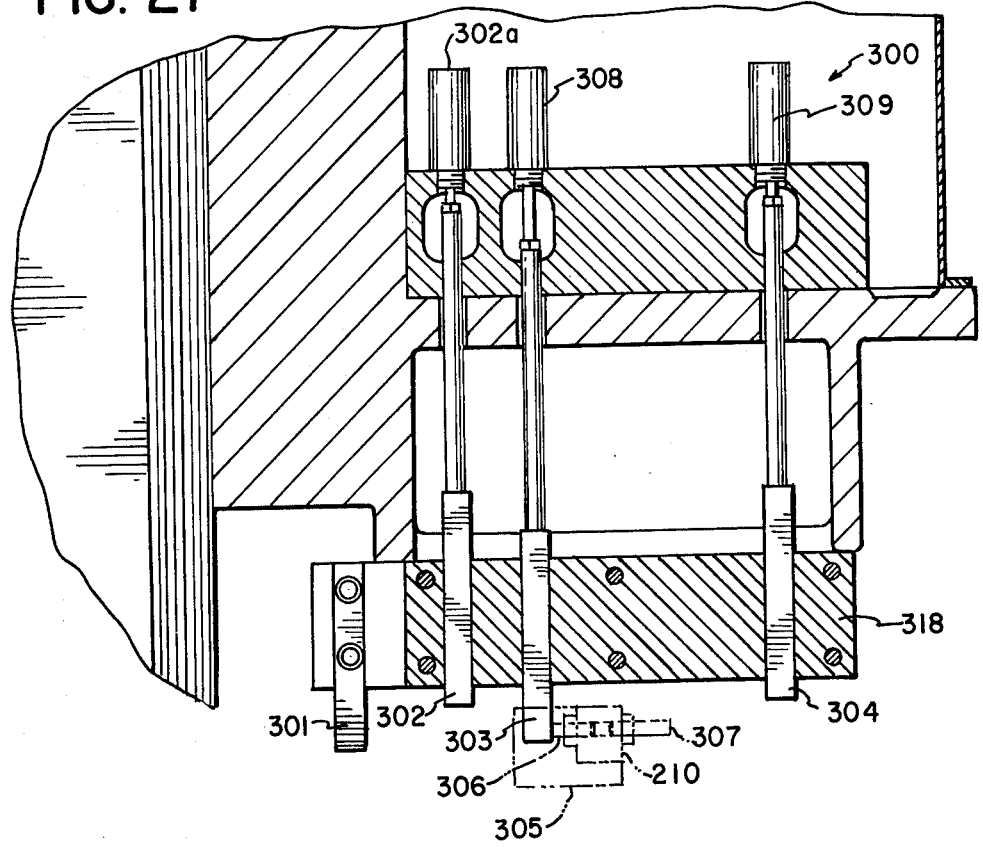

With the various other combinations of left-hand and right-hand tool blocks, the transport carriage and loader carriage are operated to different intermediate positions, determined by the particular combination of tool blocks. All of this information is, of course, reflected in the tool change program, and, in accordance with the invention, selectively operable position stop means are provided for effecting the desired carriage position. Thus, with reference to FIG. 27, there is shown a transport carriage positioning assembly 300, which is suitably secured to the side of the ram housing 14 and includes a fixed abutment stop element 301 and three selectively operable abutment stop elements 302–304. A position control member 305 is carried by the transport carriage 26 and is provided with adjustable abutment stops 306, 307 projecting from opposite sides. The abutment stop 306 is arranged for cooperation with the stop bars 301, 302, 303, and the adjustable stop 307 is arranged for cooperation with the stop bar 304.

In the illustrated arrangement, the stop bars 301, 303 correspond to the left-hand and right-hand ready positions, respectively, such that when the adjustable stop element 306 is in contact with either one, the transport carriage 26 will be held in the desired position. In a normal sequence of operations, the transport carriage will continue to be driven to the left, until contacting the left-hand ready stop 301, unless the tool change program reflects the fact that a right-hand tool is in the ram, in which case the right-hand ready stop 303 will have been moved downward by an actuator 308, causing the transport carriage 26 to be stopped when it reaches the bar 303.

Prior to reloading of the transport carriage with the previously used tool block, the stop bar 304 is lowered, by means of its actuator 309, and the transport carriage 26 is driven laterally to the right, until the stop element 307 engages the bar 304. This positions the transport carriage 26 in a predetermined load return position, for appropriate cooperation with the loader carriage in its load return position. Subsequently, the transport carriage 26 is driven transversely to the left, beyond the then-retracted stop bar 303 and into contact with the stop bar 302, which has been extended by its actuator 302a. In the latter position, the transport carriage 26 has engaged a previously used tool block carried by the loader carriage, in preparation for returning the tool block to the carrousel.

In conjunction with the various stop bars 301–304, the transport carriage positioning assembly 300 includes a series of switches 310–313, having actuating plungers 314–317 respectively, projecting downward toward the transport carriage, adjacent the stop bars, through a common guide bar 318. The various switches are appropriately positioned, relative to the several stop bars such that, when the carriage is in any of the stop positions, a cam device 230 carried by the transport carriage is in position to displace one of the plungers 314–317, sending an appropriate signal to the program control. Thus, when the transport carriage is in position against any of the stops 301, 302, 303, the corresponding switches 310, 311, or 312 will be actuated. When the carriage is backed up against the stop bar 304, the switch 313 is actuated. These switches provide signals to the sequence control means.

Figure 12:
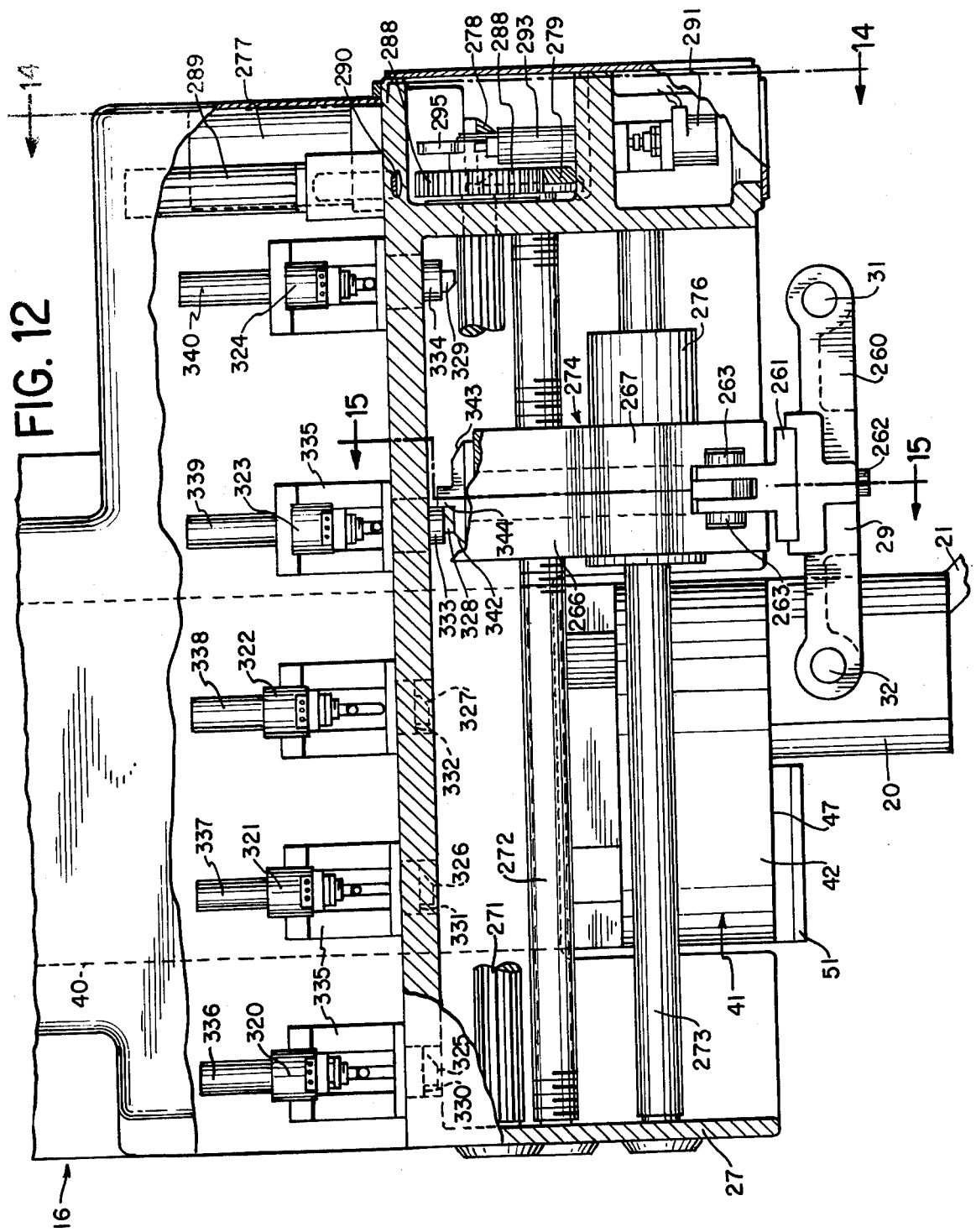
FIG. 12 is a fragmentary view, partly in section, illustrating details of the tool loading mechanism incorporated in the apparatus of FIGS. 1 and 2.
Figure 13:
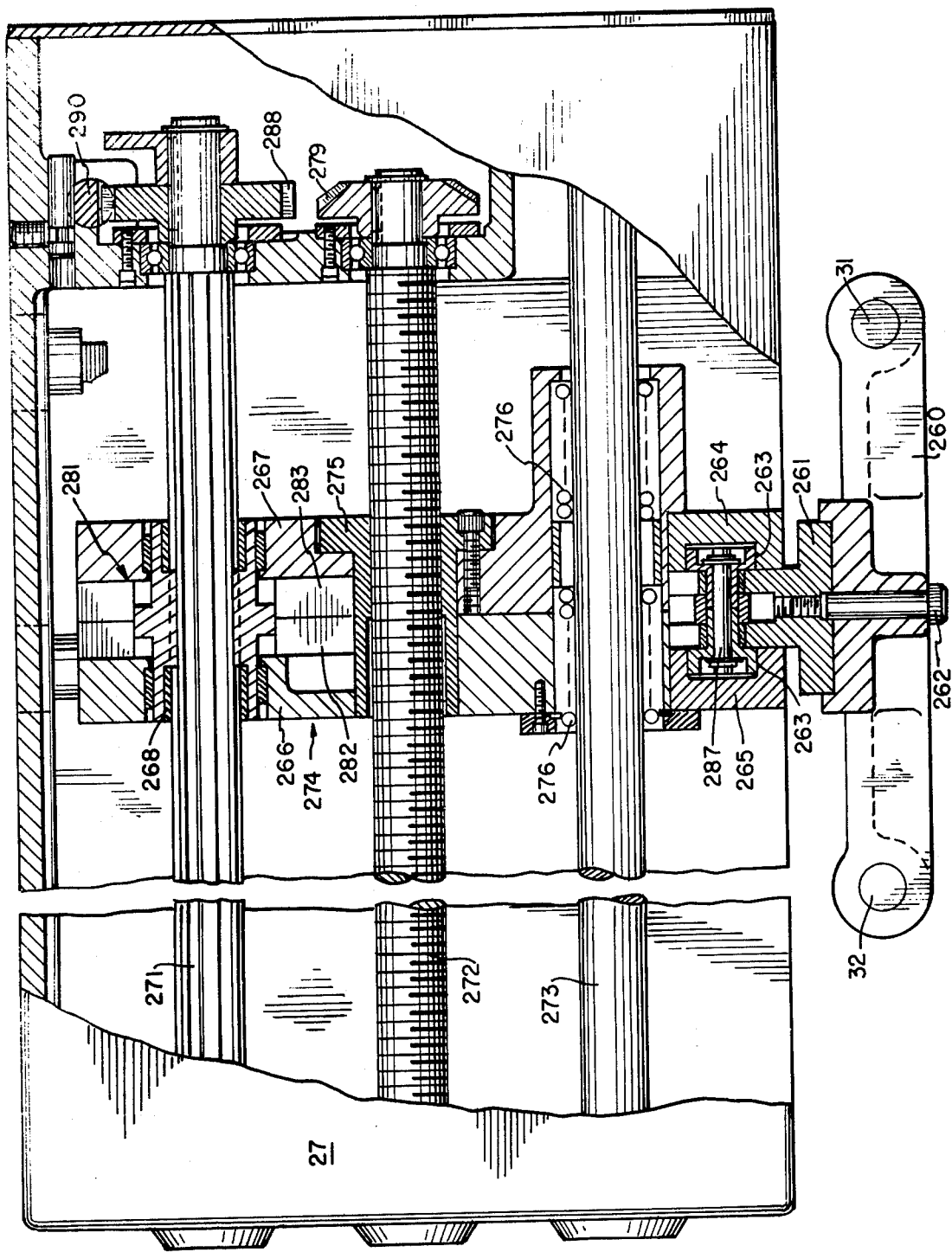
FIG. 13 is a cross sectional view as taken generally on line 13—13 of FIG. 15.

With reference now to FIG. 12, the loader housing 27 mounts a series of five control switches 310–324. Each of these switches is provided with an actuating plunger 325–329 projecting downward through rigid abutment stops 330–334. Each of the switch assemblies comprising a switch, an actuating plunger, and an abutment stop, is mounted by a bracket 335 and is vertically movable by means of an actuator device 336–340. If desired, the actuators 336, 340 at the extreme ends may be omitted, and the corresponding switch assemblies mounted permanently in their lower or projected positions.

A combined switch actuator and stop element 341 is secured to the loader carriage 274 and includes cam surfaces 342, 343 and a stop element 344. As the loader carriage 274 approaches an extended switch assembly, the cam surface 342 or 343 first engages the switch actuating plunger and displaces it upwardly to actuate the corresponding control switch. This provides a desired control signal, to initiate the next step of the programmed sequence. The hydraulic drive motor continues to move the loader carriage through a limited distance, until the stop element 344 comes into contact with the projected abutment associated with the just-displaced switch actuator, stalling the motor.

In the apparatus illustrated in FIG. 12, the switch assembly 324, at the right-hand extremity of the loader housing, is associated with the load return position. This assembly may be permanently projected, and is actuated by movement of the carriage 274 toward the right-hand limit position. All of the other switch assemblies are actuated by leftward movement of the loader carriage.

The switch 323 is associated with the right-hand load position of the loader, while the switch 322 is associated with the left-hand load position. That is, these are the positions into which the loader carriage 274 is moved in preparation for a tool change operation in which the just-used tool block is in the right-hand and left-hand positions, respectively, in the ram. The switches 321, 320, respectively, are associated with the right-hand and left-hand unload positions; these are the positions in which the loader carriage will stop and retract, in order to deposit a new tool block in either the left-hand or right-hand operating positions in the ram. The switches 320–323 actuated and utilized in a given tool exchange sequence is determined by the input program, which will select as between 322 and 323, on the basis of the left-hand or right-hand orientation of the previously used tool, and will select as between the switches 320 and 321, on the basis of the orientation of the tool next to be used. The actuators 337, 338 and 339 of the unused switches are retracted out of the path of the positioning element 341.

Figure 4A:
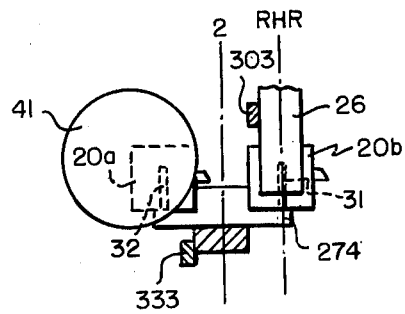
Figure 4C:
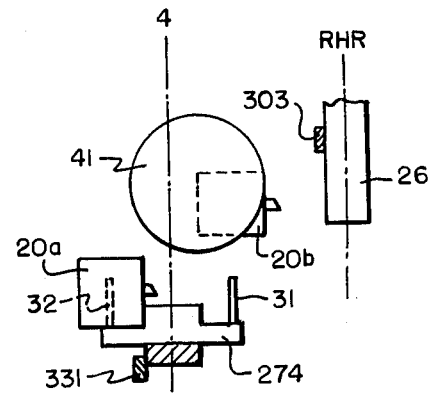
Figure 4B:
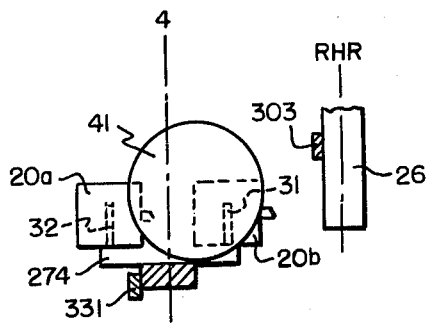
Figure 4D:
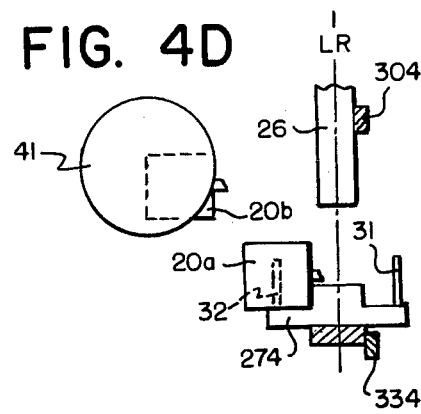
Figure 5G:
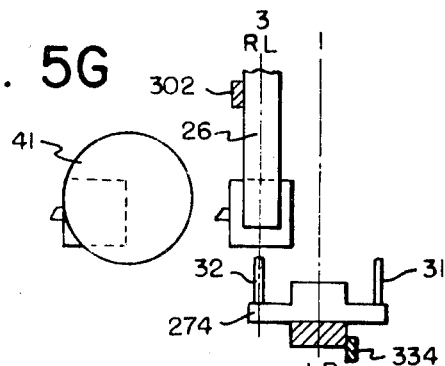
Figure 6D:
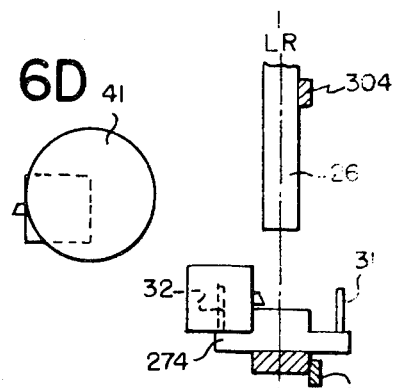
FIGS. 6A–6H illustrate a sequence of operations involved in the removal of a right hand tool and its replacement by a left hand tool.
Figure 5H:
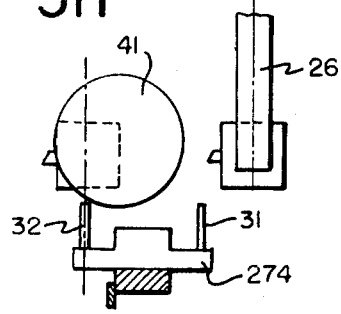
Figure 6E:
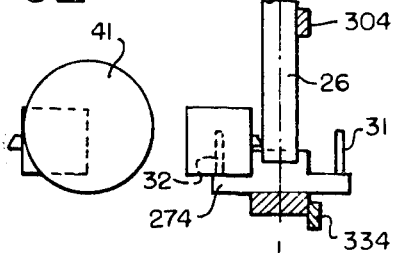
Figure 6A:
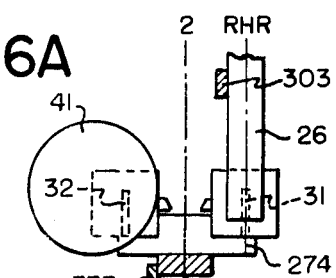
Figure 6F:
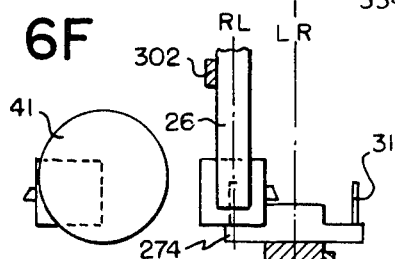
Figure 6B:
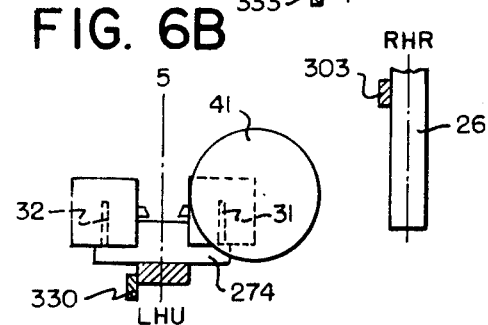
Figure 6G:
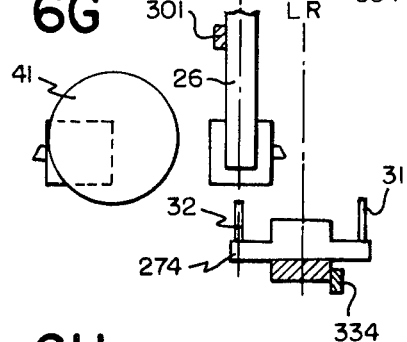
Figure 6C:
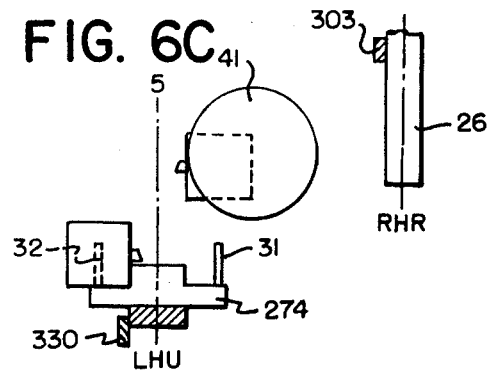
Figure 6H:
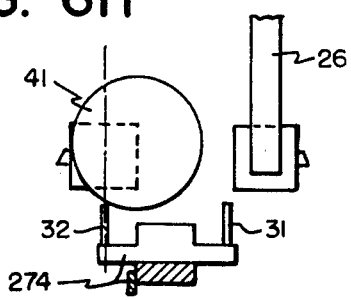

In FIGS. 4A–7H inclusive there is schematically illustrated the relationship of the transport carriage 26 and the loader carriage 274 in relation to the various stop elements described above, as utilized in the loading and unloading of tool blocks of various right-hand — left-hand combinations. In FIG. 4A, at the start of a loading of a right-hand tool in exchange for another right-hand tool, the tool transport carriage 26 is in the right-hand ready (RHR) position as determined by the stop bar 303. The loader carriage 274 is in the right-hand load (RHL) position, as determined by the projected abutment stop 333 and associated switch 323. For the next phase, the abutment stop 333 is retracted, and abutment 331 and its corresponding switch 321 are projected downward, to establish the right-hand unload (RHU) position of the loader carriage 274. When the loader carriage moves to the left, into the right-hand unload (RHU) position, the new tool block is in position to be clamped in the ram, and the old tool block is clear of the ram and ready to be retracted. In FIG. 4C, the loader slide is retracted while still in the RHU position; the transport carriage 26 may still remain in the RHR position. In FIG. 4D, the loader carriage 274 has been moved to the right, into contact with the abutment 334 and associated switch 324, determining the load return (LR) position. Likewise, the transport carriage 26 has been returned to the right into engagement with the stop bar 304, determining its load return (LR) position. In FIG. 4E, the loader slide has been extended to the rear, while the loader cariage 274 and transport carriage 26 remain in their respective LR positions. In FIG. 4G, the transport carriage 26 has been moved to the left, into its reload (RL) position against the stop bar 302, engaging the previously used tool block for return to the carrousel; the loader carriage 274 remains in its LR position. In FIG. 4G, the loader slide 261 has been retracted, disengaging the reloaded tool block and clearing it for return transport to the carrousel. In FIG. 4H, the loader carriage has returned to the (RHL) position against the stop 333, in proper alignment with the just-loaded tool block.

As soon as the loader has cleared with the unloaded tool block (see FIG. 4C), the ram may be returned to machining position and the sequence of machining operations may be resumed. This significantly minimizes the time interval during which machining operations have to be interrupted for the tool change sequence.

In FIGS. 5A–5H, a previously used left-hand tool block is to be replaced by a new left-hand tool block. For this sequence, the transport carriage 26 is advanced to its left-hand ready (LHR) position against the fixed stop 301. The transport carriage 274 is moved transversely to the left from its LR position to its left-hand load (LHL) position in contact with the abutment stop 332. After the loader slide 261 is extended into engagement with the new tool block, the abutment 332 is retracted and the loader carriage 274 is moved to the left, into contact with the abutment 330, establishing the left-hand unload (LHU) position of the loader carriage, as illustrated in 5B. The loader slide is then retracted, while remaining in the LHU position (FIG. 5C) and is then moved transversely to the right to the LR position, established by the abutment 334. The transport carriage 26 likewise has been moved to its LR position, determined by the stop bar 304. In this respect, the movements of the ladder carriage and loader slide and the movements of the transport carriage to the LR and RL positions, and the subsequent disengagement of the loader slide from the reloaded tool block, are the same for all combinations of incoming and outgoing tool blocks. Thus, the movements of the loader carriage, loader slide and transport carriage reflected in FIGS. 5D–5H are the same in terms of final positions as the movements reflected in FIGS. 4D–4H, previously described. The last phase of loader carriage movement, as reflected in FIGS. 4H and 5H differs, however, because the just-loaded tools are of opposite hand, and the loader will, in each case return to a position of alignment with the just-loaded block.

In the illustrations of FIGS. 6A–6H, a previously used right-hand tool is being removed and replaced by a new left-hand tool block. To this end, since the previously used tool is of right-hand orientation, the loader carriage 274 and transport carriage 26 are moved to their respective right-hand load (RHL) and right-hand ready (RHR) positions, in contact with abutment 333 and stop bar 303 respectively. The loader carriage 274 is then moved to the left, to its LHU position, in contact with the abutment element 330, after which the loader slide is retracted (FIG. 6C) leaving the new, left-hand tool block clamped in the ram. The sequence illustrated in FIGS. 6D–6H, reflecting the load return and reload operations, is the same as that previously described in connection with FIGS. 5D–5H inclusive.

Figure 7A:
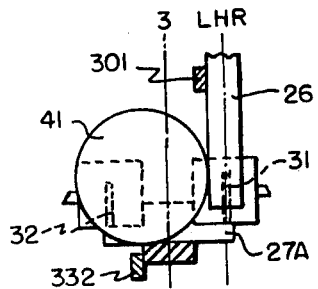
FIGS. 7A–7H illustrate sequentially the removal of a left hand tool and the loading of a right hand tool.
Figure 7B:
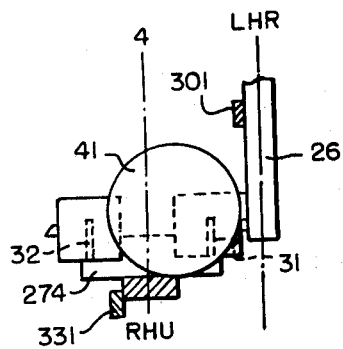
Figure 7C:
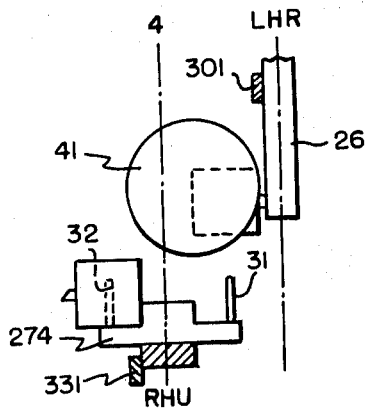
Figure 7D:
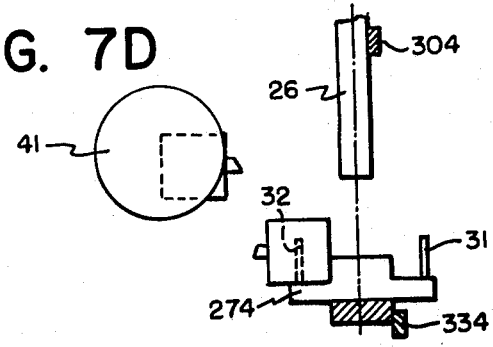
Figure 7E:
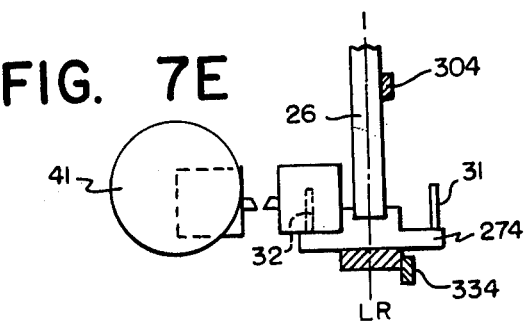
Figure 7F:
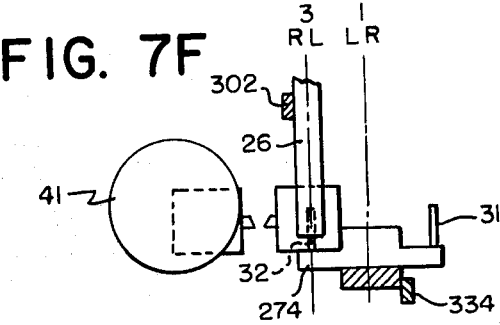
Figure 7G:
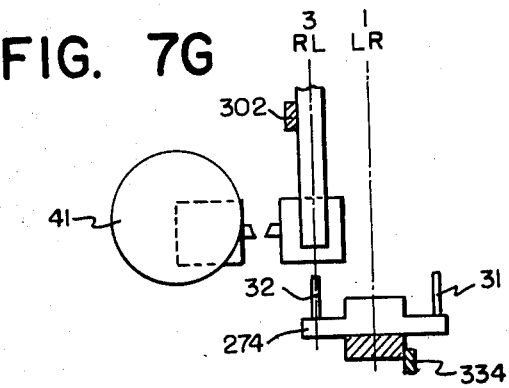
Figure 7H:
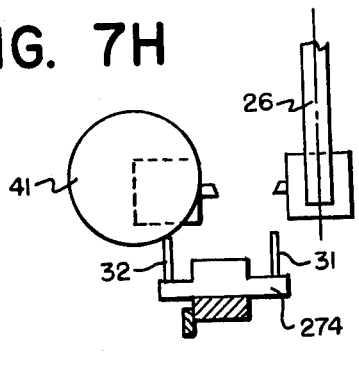

FIGS. 7A–7H illustrate the exchange of a new tool block of right-hand orientation for a previously used tool block of left-hand orientation. Initially, the loader carriage 274 is in its LHL position against the abutment stop 332, while the transport carriage 26 is in its LHR position, against the stop bar 301. After engagement with the respective tool blocks, the loader carriage 274 is actuated to the left, to its RHU position, against the abutment stop 331. In the RHU position of the loader carriage, the new tool block is properly positioned in its right-hand orientation in the ram, while the previously used tool block has been cleared to the left, accommodating retraction of the loader as illustrated in FIG. 7C. The sequence of views in 7D–7H, reflecting the load return and reload movements of the carriages, are the same as those described with respect to FIGS. 4D–4H respectively.

Figure 39:
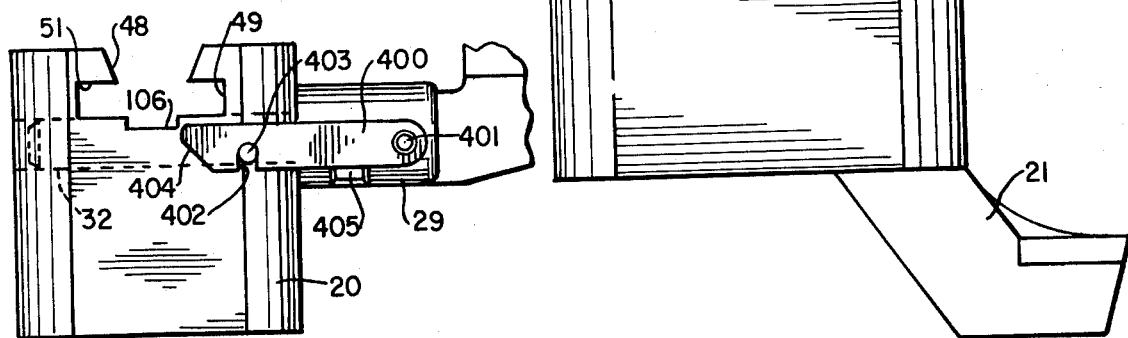
FIG. 39 is a side elevational view of a modified form of tool blocking retaining means for holding large, heavy tool blocks on the loader.

In some cases, the rate of movement of the tool loader mechanism may be such, in relation to the inertia of the tool blocks, that a simple spring detent retention means may not be fully reliable to prevent dislodgement of the unloaded tool block, when the loader is retracted at high speed. In such cases, it is appropriate to utilize a positive locking means, such as is shown in FIG. 39. Thus, the loader 29 is provided, adjacent the loader finger 32, with a latch bar 400, pivoted at 401 on the loader and extending forward generally parallel to the finger 32, so as to be alongside a tool block engaged by the finger. The latch bar 400 has a downwardly opening notch 402 adapted to be received over and lockingly engage with a latch pin 403 provided at the side of the tool block. A cam surface 404, at the leading edge of the latch bar fits the bar over the pin when the loading finger 32 is inserted in the tool block. A stop lug 405 holds the latch bar horizontally at other times.

In order to release the tool block from the latch bar, it is merely necessary to cam upward the latch bar at the unload station.

Figure 40:
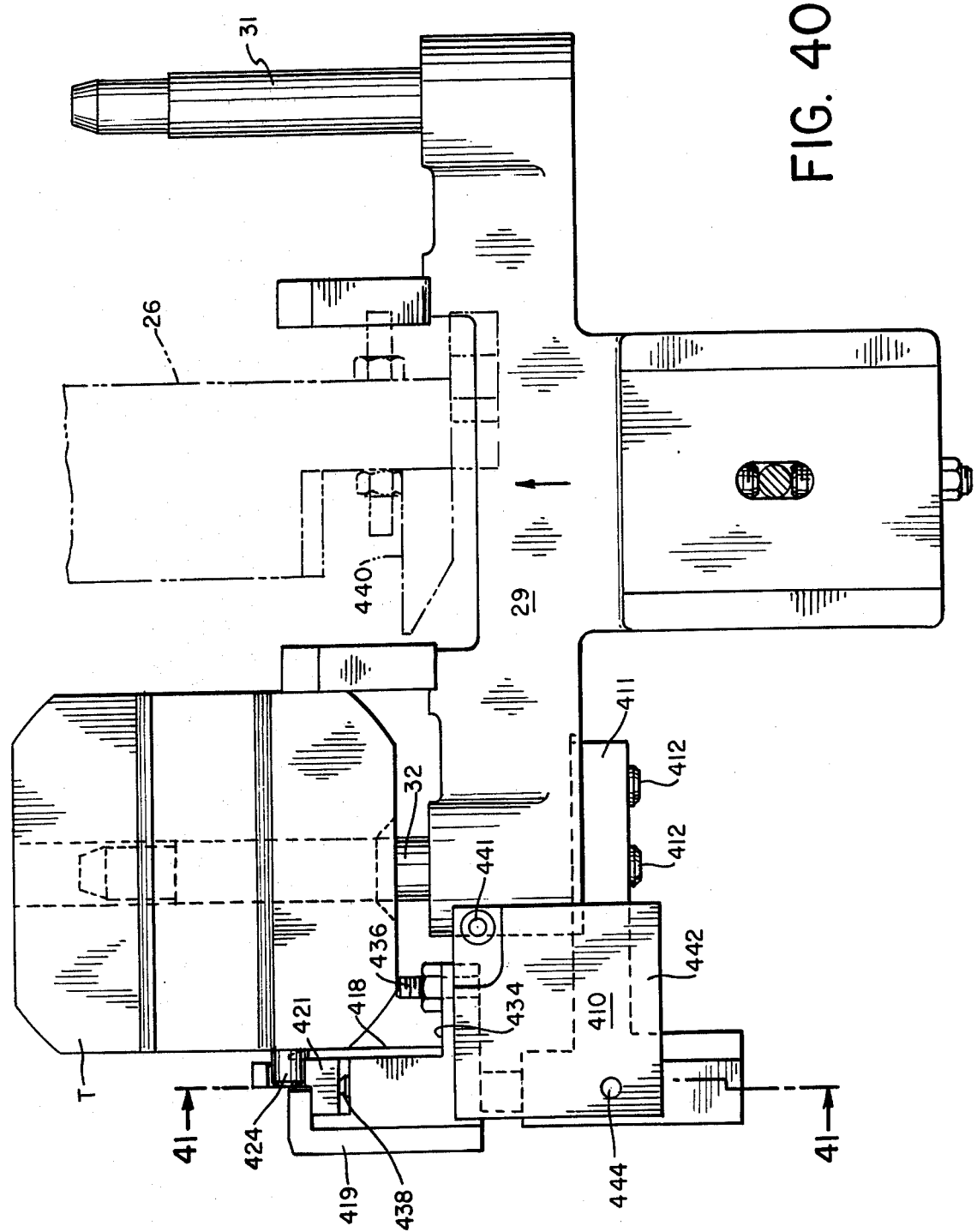
FIG. 40 is a top plan view of a tool loader mechanism according to the invention, incorporating a further modified form of tool block retaining means, which is characterized by positive locking and unlocking action.

Referring now the FIGS. 40–44, there is shown a modified form of automatic latching arrangement for securing tool blocks to the loader 29 against possible dislodgement upon rapid retracting movement of the loader. In this respect, it will be understood that the tool block retaining means is required only in conjunction with the left-hand loading finger 32, as illustrated in FIG. 40, which is the loading finger carrying the unloaded tool block. For a loader stationed at the left-hand side of a ram, the right-hand finger would carry the unloaded block and would utilize to advantage the block retaining mechanism. Since the loader does not execute a rapid retracting movement while carrying a new tool block, the retaining means is not needed on the other loading finger.

The modified form of tool block retainer is designated generally by the reference numeral 410 and includes a mounting bracket 411 secured to the "unload" side of the loader 29 by bolts 412. Secured to and extending in a rearward direction from the mounting bracket 411 is a retangular guide rod 413. The rod 413 is slideably received in a recess 414 provided in a movable actuator block 415. A second guide element 416, this one in the form of a hollow cylindrical tube, is fixed in the upper portion of the bracket 411, above the guide bar 413, and likewise extends in a rearward direction into slideable, telescopic relation with a cylindrical recess 417 in the actuator block 415. As reflected particularly in FIG. 40, the actuator block 415 carries guide plates 418, 419 on opposite sides. These guide plates, in conjunction with a guide recess 420 in the actuator block, serve to confine and guide for vertical movement a hook-like tool-engaging latch bar element 421. The latch element 421 is provided in its lower portion 422 with an upwardly opening recess 423 engageable upon upward movement of the latch element 421 with a latch pin 424 carried by and projecting laterally from the tool block T. Thus, when the latch bar element 421 is in its retracted or lower position, the tool block is free of the retaining mechanism, but when the latching element is raised, the tool block is securely locked to the loader by engagement of the latch bar 421 and pin 424, as reflected in FIG. 42.

Figure 41:
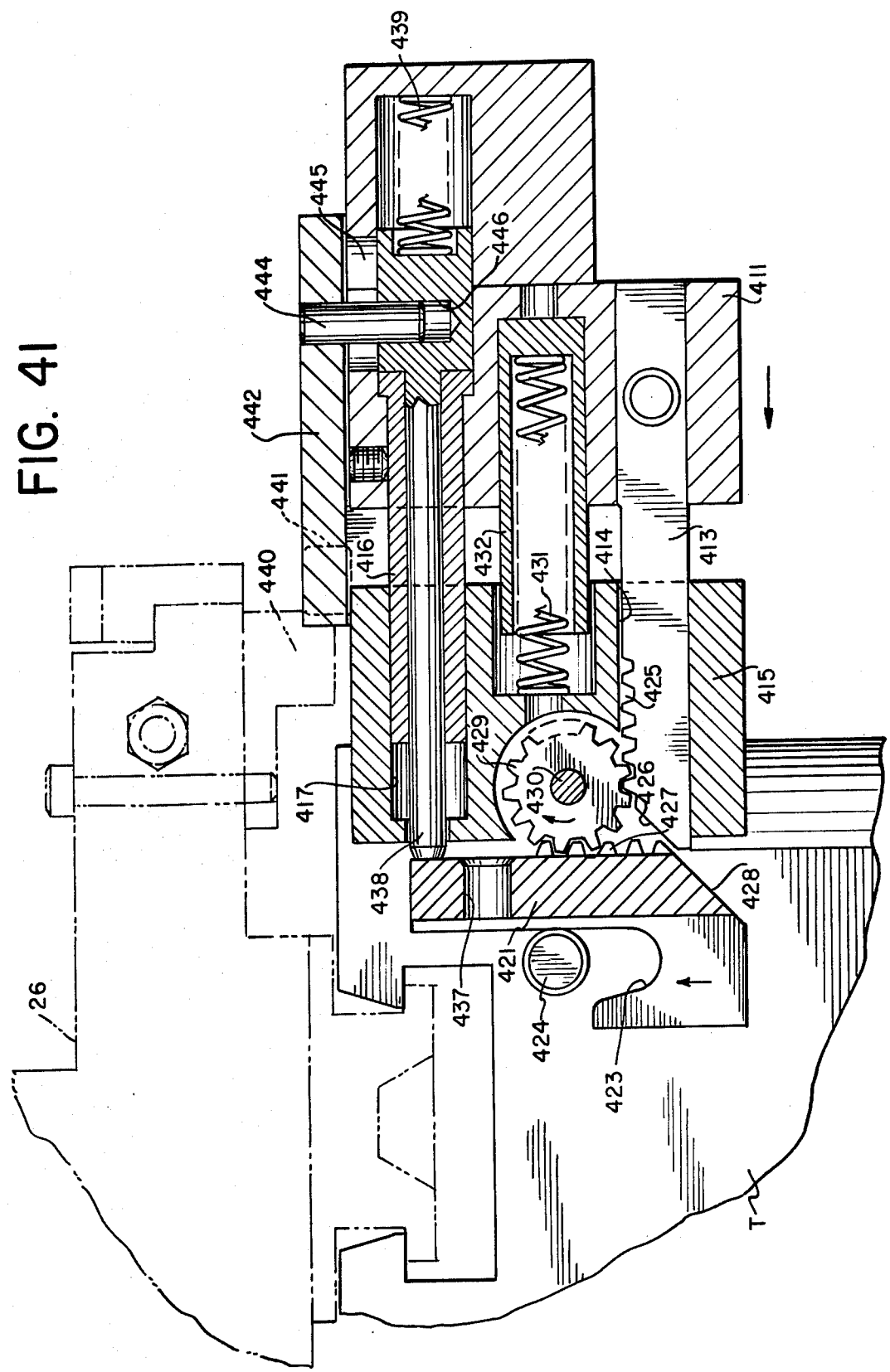
FIG. 41 is a cross sectional view taken generally on line 41—41 of FIG. 40.

Referring now to FIG. 41, the lower guide bar 413 is shown to have on its projecting rearward end portion a rack section 425 and an upwardly facing inclined surface 426. Likewise, the latch bar element 421 is provided with a vertically disposed rack portion 427 on its forwardly facing surface and a downwardly facing inclined surface 428. A pinion 429 is rotatably carried by the actuator block 415, by means of a shaft 430, and is positioned to engage simultaneous the rack portions 425 and 427 just described. The arrangement is such that, upon rearward movement of the guide rod 413 relative to the actuator block 415, the pinion 429 will be rotated in a clockwise direction and will advance the latch bar element 421 upwardly by a corresponding amount. The inclined surfaces 426, 428 normally may have a slight clearance, as reflected in FIG. 42.

Normally, the actuator block 415 is urged rearwardly, relative to the mounting bracket 411, by means of a compression spring 431 housed in a sleeve 432 carried by the mounting bracket. The rearward limit of movement of the actuator block 415 is predetermined by means of an adjustable stop bolt 433 (FIG. 44), which passes slideably through the mounting bracket 411 and adjustably engages a lug 434 (FIGS. 44, 40) carried by the actuator block. The condition of the mechanism as illustrated in FIG. 41 reflects the maximum rearward movement of the actuator block, at which point the head 435 of the stop bolt 433 engages the front surface of the mounting bracket 411, as shown in dotted lines at the right in FIG. 44.

When the tool loader 29 is advanced in a rearward direction, in order to pick up a used tool block with the loading finger 32, an adjustable stop screw 436 (FIGS. 40, 44), carried by the lug 434 of the actuator block, engages the front surface of the used tool block as the loader approaches the end of its tool-engaging rearward movement. This, of course, prevents further movement of the actuator block 415, while the mounting bracket 411, and the rack-forming guide bar 413 carried thereby, continue to move rearwardly for the balance of the loader movement. The relative movement of the rack portion 25 and actuator block 415 causes the pinion 429 to be rotated, raising the latch bar element 421 to its tool block engaging position. By means of the adjustable stop bolt 436, the extent of relative movement of the rack and pinion can be controlled, so that the latch pin 424 is fully received in the recess 423 of the latch bar, when the loader 29 has completed its tool block-engaging movement in the rearward direction. The design of the latch mechanism and the location of the stop screw is such that the actuator block will not be moved except by contact with a tool block. Thus, the mechanism will not be actuated and locked by cycling of the loader without a tool block in the ram.

As reflected in FIGS. 41 and 42, when the latch bar element 421 has been raised to its upper position, an opening 437 in the latch bar element becomes aligned with a spring loaded plunger 438 carried in and guided for axial movement by the cylindrical upper guide element 416. A spring 439 engages the forward end of the plunger and urges it continually in a rearward direction, such that the plunger automatically snaps into the opening 437 when the latter moves into alignment with the plunger. Once the plunger is in its extended or rearward position, as shown in FIG. 42, the latch bar element 41 is locked in its upper position, and the tool block T is positively locked to the loader 29. After latching of the tool block to the retaining mechanism, in the manner just described, the loader 29 is shifted laterally to free the just-used tool block from the machine ram, retracted to clear the tool block forwardly of the ram, and shifted laterally over to a position adjacent the transfer arm 26. The loader and transfer arms are then brought together in the manner heretofore described, and the used tool block is inserted in the transport arm for return to the storage area.

In order to effect withdrawal of the tool loader 29 from the latched tool block T, it is necessary to effect release and retraction of the plunger 438. In the illustrated arrangement, this is achieved by means of a cam element 440 (FIG. 40) carried by the transfer arm 26 and engageable, upon relative lateral movement of the loader 29 and transfer arm 26, to load the tool block onto the transfer arm, to engage a cam follower 441 and displace it in a forward direction. The cam follower 441 is carried by a plate 442, which is slideably carried on the mounting bracket 411 by means of a guide element 443 aligned in the forward-rearward direction parallel to the axis of the plunger 438.

When the cam 440 and cam follower 441 are engaged, the cam follower and its slide plate 442 are displaced in a forward direction, to a position shown in FIG. 41. A connecting pin 444 is secured in the slide plate 442 and extends through an elongated slot 445 in the mounting bracket into a recess 446 in the locking plunger. Thus, when the cam follower and slide plate 441, 442 are displaced forwardly, the plunger 438 is retracted out of the opening 437, to enable a downward movement of the latch bar 421. Thereafter, when the loader 29 is withdrawn in a forward direction, to release the tool block, the actuator block 415 of the retaining mechanism is urged by the spring 431 to its extended position, rotating the pinion 429 in a counterclockwise direction and lowering the latch element 421 to release the tool block.

The tool block retaining mechanism of FIGS. 40–44 is advantageous for use in connection with machines of very large size and/or the machining of workpieces that could sustain considerable damage if a tool block were dropped. The retaining mechanism just described is arranged so that each function of the mechanism requires a positive movement or actuation by the machine parts. Whereas in the simplified form of retaining mechanism illustrated in FIG. 39, the action of gravity is relied upon at least in part, the modified mechanism of FIGS. 40–44 utilizes positive machine movements to effect the primary latching movements, and a spring urged plunger serves to lock the parts in the tool latching position. The modified mechanism is thus more positive and certain in its operation, and is desirable for use where the accidental dropping of a tool block would be considered a relatively catastrophic event in terms of possible injury or damage.

In the modified tool block clamping mechanism shown in FIGS. 45–48, provisions are made for engaging and clamping opposite sides of a tool block 500. To this end, the tool block is provided with clamp receiving recesses 501, 502 on opposite sides engageable with flanges 503, 504 respectively of clamping bars 505, 506. It will be understood, in this respect, that the ram 507 and clamping assembly 508 illustrated in FIGS. 45–48 include means for clamping tool blocks in either the left or right hand side, and so will include right hand and left hand sets of clamping bars 505, 506, as reflected in FIGS. 47, 48.

At their upper ends, the clamping bars 505, 506 are threaded, for engagement with gear collars 509, 509a. All of the gear collars 509, 509a mesh with a common drive gear 510, driven by the primary actuating shaft 511 which extends up through the ram 507. The several clamping bars are slideably mounted in the main housing 508, for vertical movement pursuant to rotation of the gear collars, the clamping bars being suitably keyed or otherwise prevented from rotation within the housing block.

Figure 45:
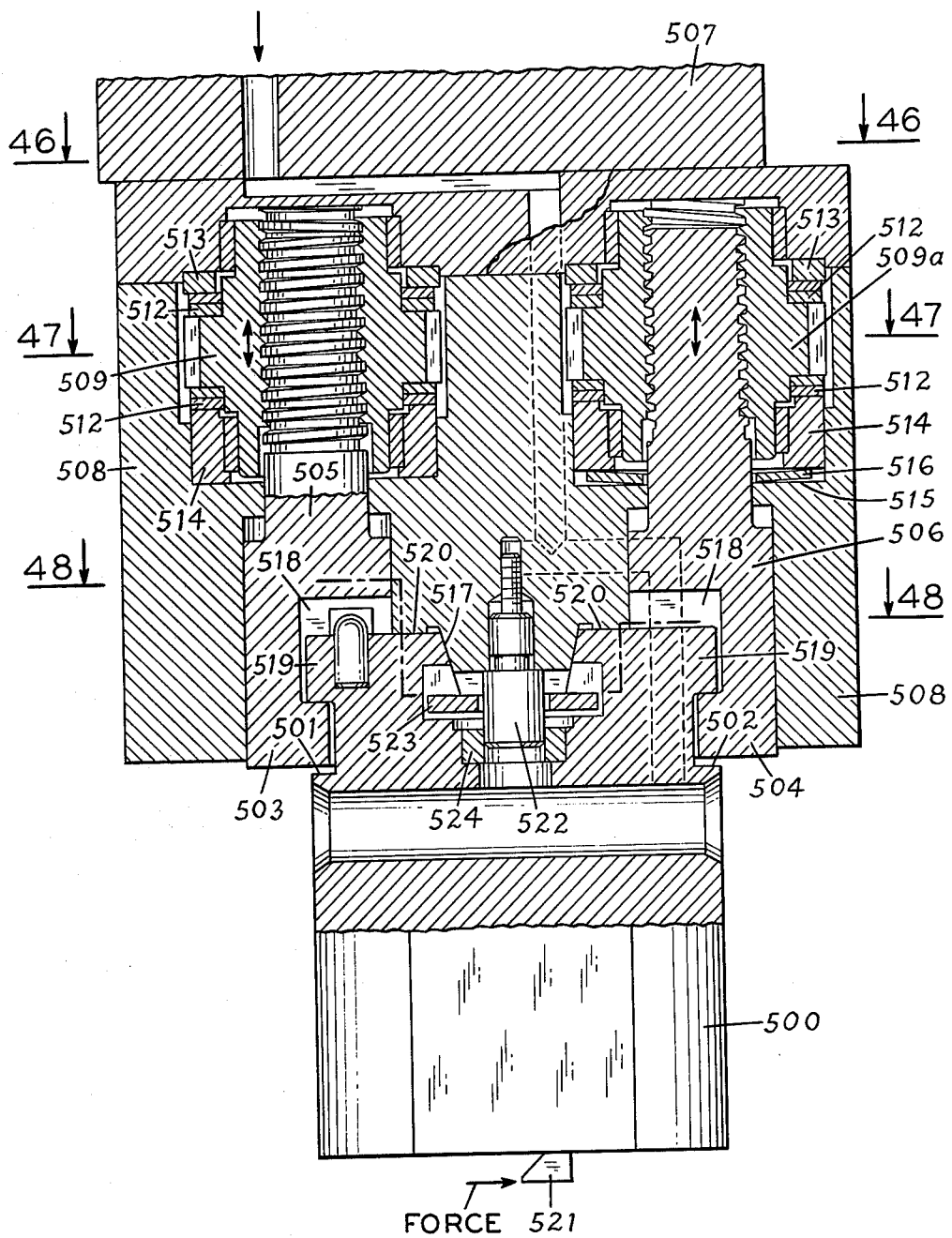
FIG. 45 is a longitudinal cross-sectional view, taken generally on line 45—45 of FIG. 46, showing details of the operating mechanism of a tool block clamping means adapted for engaging opposite sides of the tool block.
Figure 46:
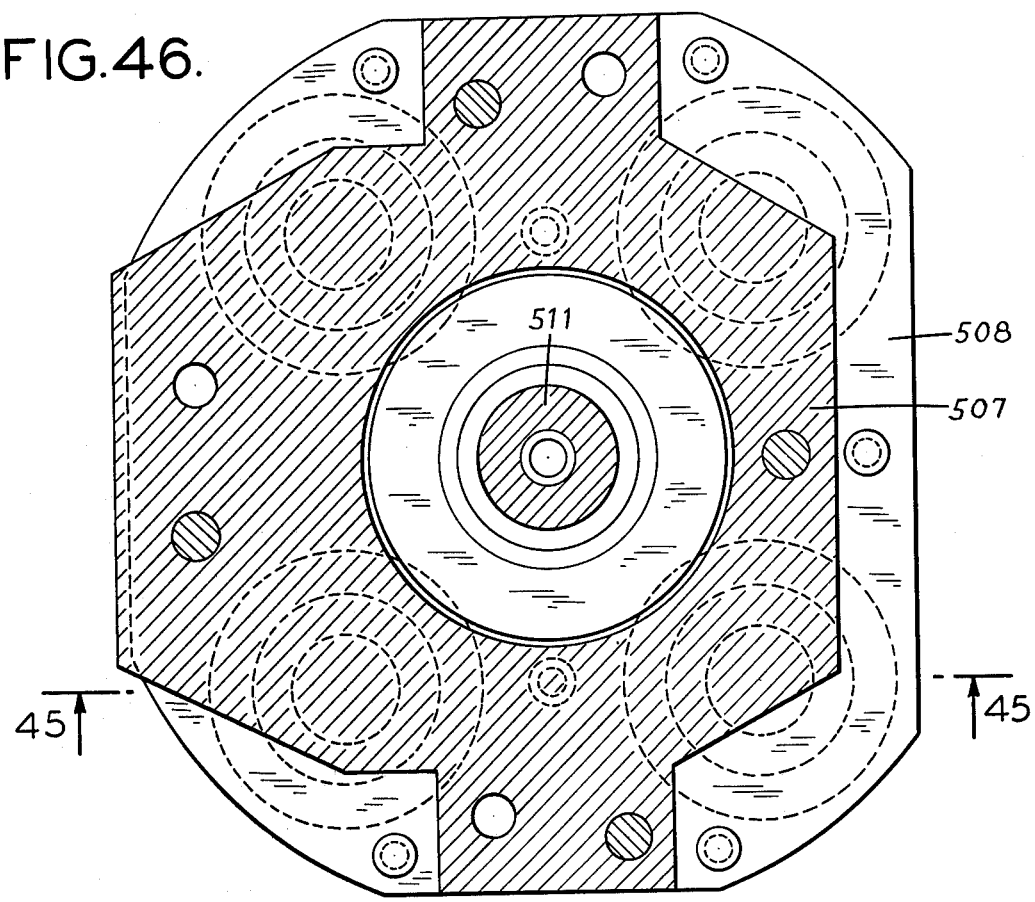
FIGS. 46, 47 and 48 are cross-sectional views taken respectively on lines 46—46, 47—47, and 48—48 respectively of FIG. 45.

As shown in FIG. 45, the gear collar 509, engaging the clamping bar 505, is supported by thrust bearings 512 mounted on solid spacer rings 513, 514, serving to solidify fix the axial position of the clamping bar 505. The gear collar 509a, engaging the cooperating clamping bar 506, is supported on similar thrust bearings 512 and spacer rings 513, 514, but there is interposed underneath the lower spacer ring 514 and a shoulder 515 formed in the main housing 508 a heavy duty spring washer 516. This spring washer 516 may be of an extremely heavy nature, requiring several thousand pounds of force for deflection to a flat condition.

As in the case of the previously described embodiments, tool blocks 500 may be loaded into the mechanism of FIGS. 45-48 by being slid laterally with the described loading mechanism. The center portion of the tool block receives and is guided by a tapered guide rib 517 as previously described, and the now lowered clamping bars 505, 506 are slideably received within the recesses 501, 502 of the tool block. In this respect, it will be noted in FIGS. 45 and 48 that the generally cylindrically contoured lower portions of the clamping bars 505, 506 are recessed at 518 to receive the upper or clamping shoulders 519 of the tool block. Typically, in the region of the recesses 501, 502, the clamping flanges 503, 504 of the clamping bars are generally of semi-circular configuration, as reflected in FIG. 48. In the region of the shoulders 519, the clamping bars may be somewhat less than a semi-circle in cross-sectional configuration.

After the tool block 500 is slid laterally into position by the tool loader, the actuating shaft 511 is rotated, simultaneously rotating all gear collars 509, 509a in a clamping direction and raising both pairs of clamping bars 505, 506. Since even under the most ideal conditions, the dimensions of the tool block shoulders 519, of the clamping flanges 503, 504, and of other elements of the system will not be precisely identical and accurate, provision is made for applying primary clamping force to one of the tool block shoulders and secondary clamping force to the other. Thus, in the arrangement illustrated in FIG. 45, when the tool 500 is drawn up into fully clamped position, the upper surface of the tool block is seated firmly against spaced shoulders 520, on opposite sides of the centering rib 517. When cutting force is applied to the tool 521 in the direction of the force arrow, the displacing moment on the tool block will tend to pivot the block about the right hand surface 520, tending to lift the block slightly off of the corresponding left hand surface, as viewed in FIG. 45. Accordingly, primary clamping pressure is applied through the left hand clamping bar 505, by virtue of the solid thrust bearing support of its gear nut 509. At the right hand side, clamping force applied by the bar 506, while desirably high, need not be as high as on the left hand side, because the deflecting moments applied during cutting operations will actually tend to seat the right hand side of the tool block more firmly in position. Accordingly, by providing a heavy duty resilient thrust support for the gear nut engaging the right side clamping bar 506, it is possible for some axial displacement of the gear collar 509a to occur during the clamping operation. This prevents the possibility of a tool block being clamped primarily on the "wrong" side, by virtue of out of tolerance or worn parts. By providing heavy duty resilient thrust support for the right hand clamping bar 506, it is positively assured that the left hand clamping bar will be brought up solid and tight against the right hand shoulder 519 of the block. Likewise, the left hand shoulder will be positively clamped, but with a lesser force, which is a function of the displacement of the spring washer 516 and may vary slightly from tool block to tool block.

In the arrangement of FIGS. 45-48, precise alignment of the tool block prior to clamping may to advantage be achieved by providing, in addition to the central guide rib 517, a single cylindrical positioning plug 522, arranged to extend downward from the guide rib, through and below the retaining plate 523. A hardened angular ring 524 is seated in the tool block and receives the slightly chamfered lower end of the positioning plug, to accurately locate the tool block in a centered position in the proper side of the clamping mechanism, prior to being drawn up tight by the clamping bars 505, 506.

Figure 51:
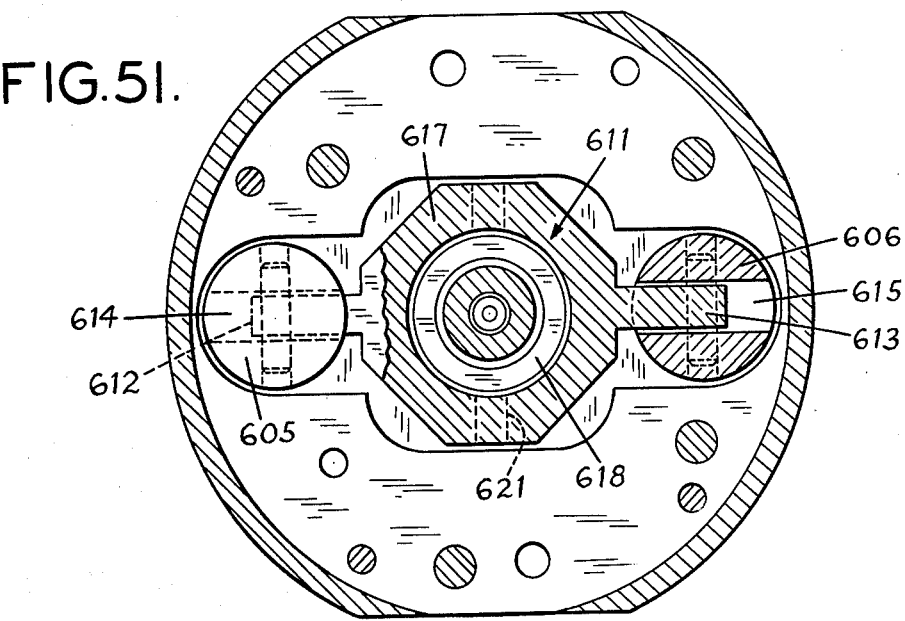
FIGS. 50 and 51 are cross-sectional views taken generally on lines 50—50 and 51—51 resepctively of FIG. 49.
Figure 47:
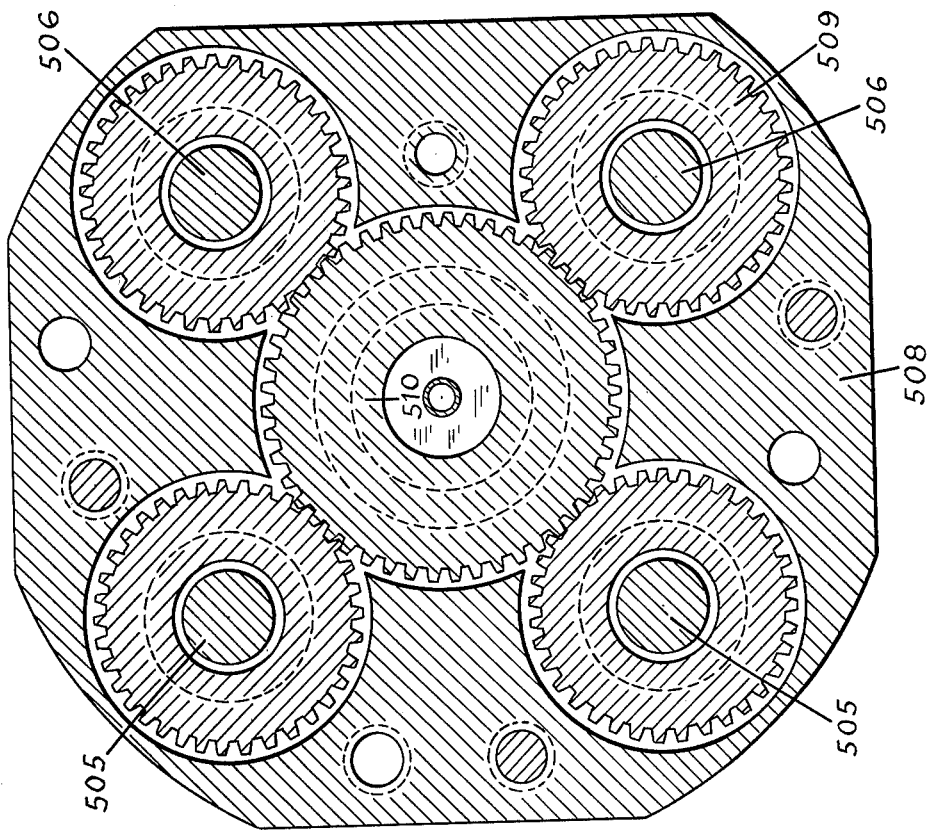
Figure 48:
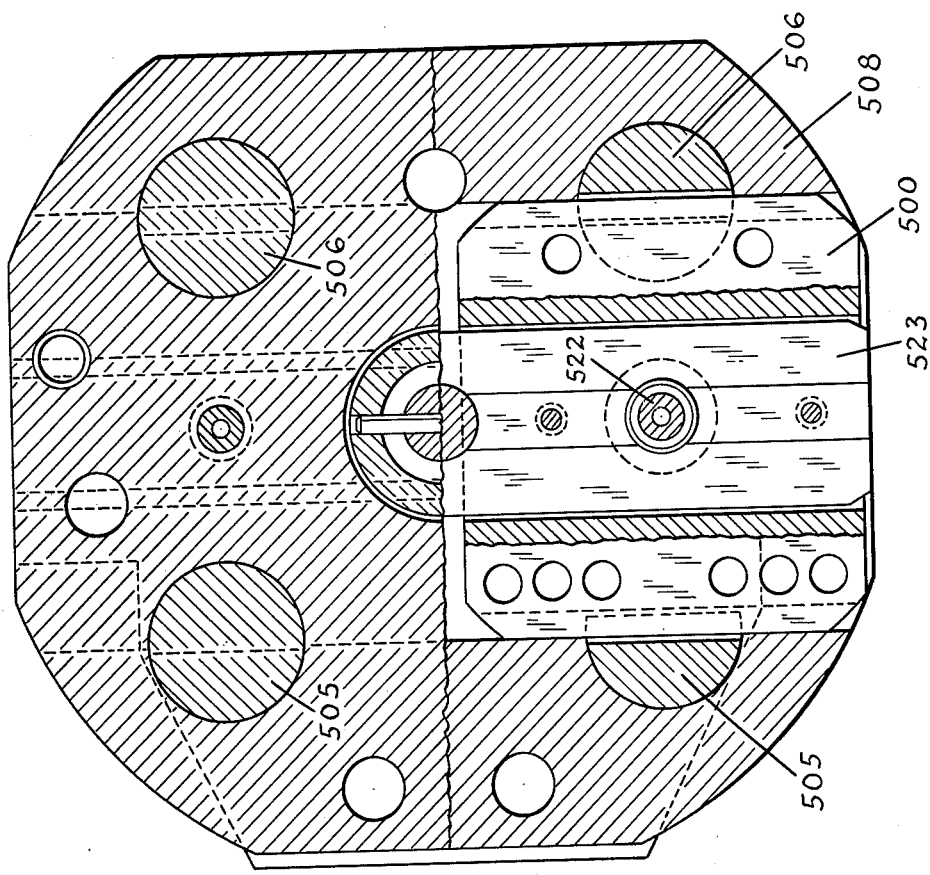
Figure 49:
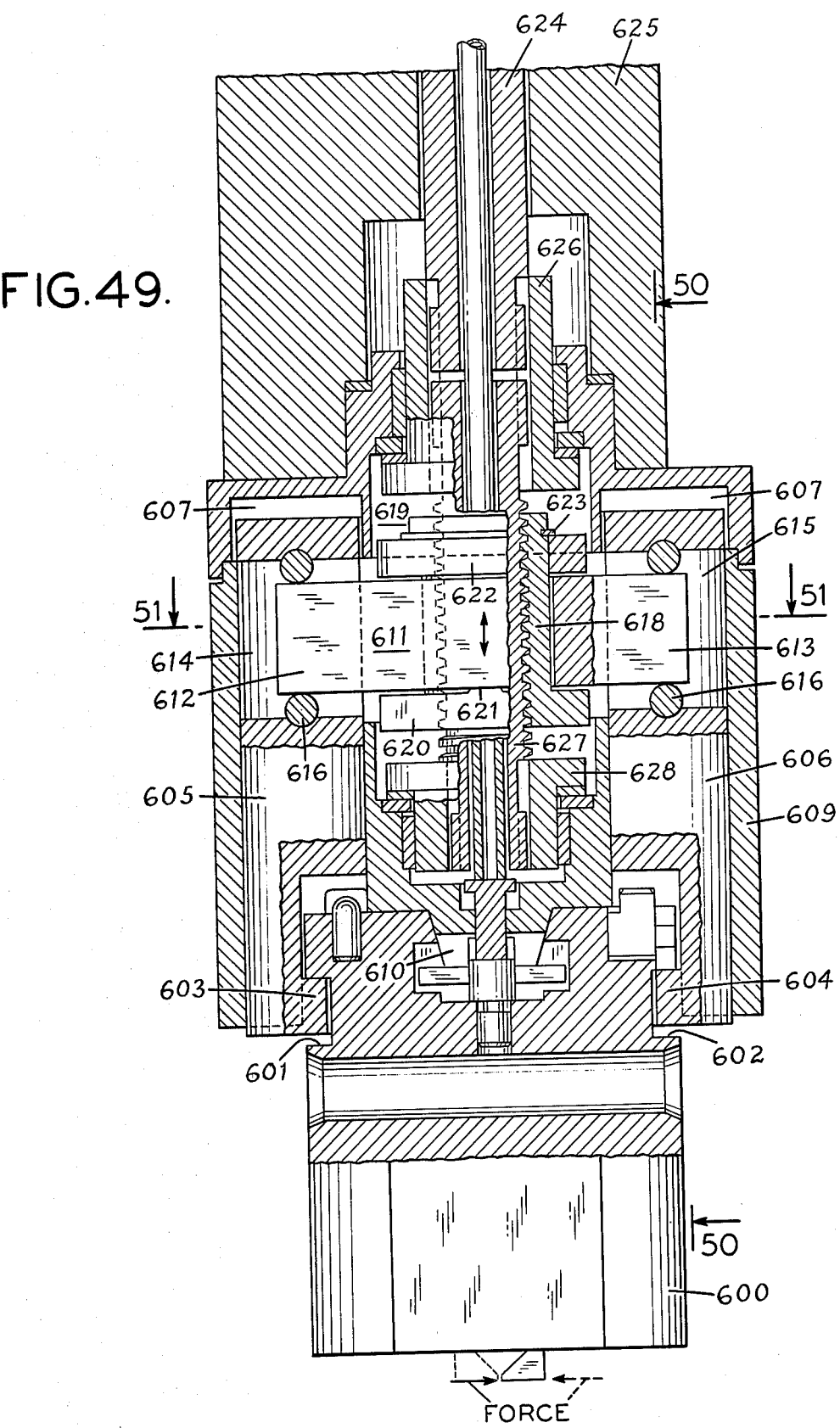
FIG. 49 is a longitudinal cross-sectional view, taken generally on line 49—49 of FIG. 50, illustrating a further modification of the tool block clamping means, for clamping opposite sides of a tool block.
Figure 50:
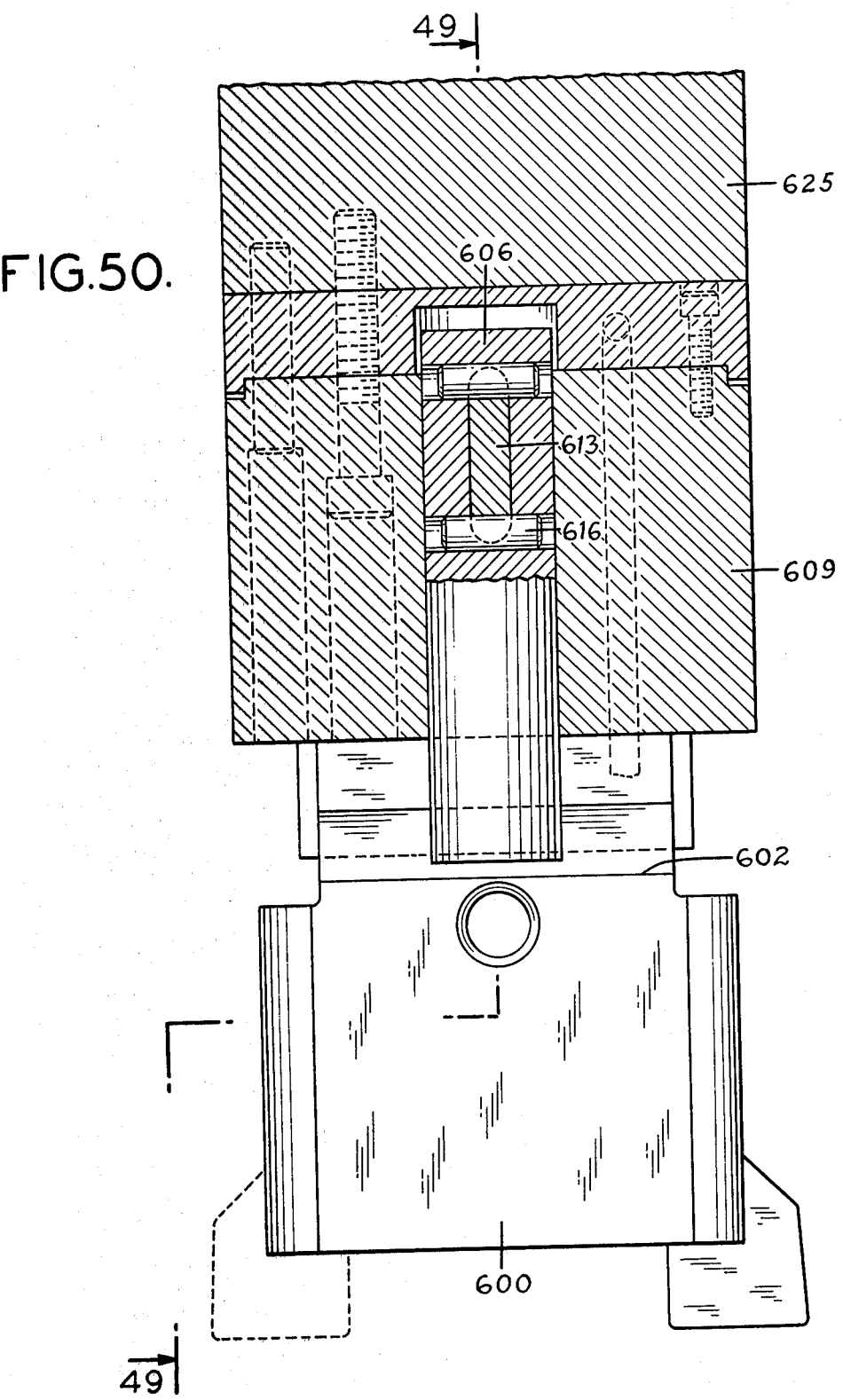

The modified arrangement of FIGS. 49-51 provides an arrangement for force equalization between clamping bars engaging opposite sides of a tool block. The specific mechanism of FIGS. 49-51 is illustrated as for a single block clamping mechanism, although the principles involved will be understood to apply equally well to double clamping arrangements heretofore referred to. In this respect, while the two position clamp heretofore described enables the direction of cutting force always to be predetermined, so that one predetermined clamping bar may be established in advance as the primary clamping element, the single position clamping means of FIGS. 49-51 may involve the application of cutting forces from either sides, and the clamping means thus provides for force equalization in the clamping system without the utilization of a resilient element.

The tool block 600 shown in FIGS. 49 and 50 is similar in principle to the tool block 500 just described, being provided with clamping recesses 601, 602 for the reception of flanges 603, 604 of clamping bars 605, 606. The clamping bars are of generally cylindrical outline and are vertically slideable in appropriate recesses 607 provided in the clamping housing 608.

The manner of loading the tool block 600 and of its engagement by the flanges 603, 604 and positioning by guide rib 610 is the same as with respect to the embodiment of FIGS. 45-48 and need not be repeated.

Actuation of the respective clamping bars 605, 606 is accomplished by means of an equalizing bar 611 having arms 612, 613 extending into apertures 614, 615 provided in the respective clamping bars. The respective arms 612, 613 of the equalizer bar are straddled by contact pins 616, which are secured in appropriate transverse bores in the clamping bars and serve to position the equalizer bar 611 with respect to the clamping bars, while accommodating limited tilting of the equalizer bar as will appear.

As reflected in FIG. 51, the center portion 617 of the equalizer bar surrounds a flanged draw collar 618, which is guided in a recess 619 in the clamp housing for non-rotary axial movement. The lower flange 620 of the draw collar has an opposed pair of fulcrum surfaces 621 which engage and support the equalizer bar 611 for limited rocking movement. The upper flange 622 of the draw collar serves primarily as a retainer, and is secured in place by a snap ring 623.

Controlled axial movement of the draw collar 618 is effected by rotation of the main actuator shaft 624, extending downward through the ram 625. At its lower end, the actuating rod makes a splined connection with a sleeve 626, which in turn makes a splined connection with a threaded shaft section 627. The latter threadedly engages the draw collar 618, as reflected in FIG. 49. The lower end of the threaded shaft section 627 makes splined engagement with a thrust bearing collar 628, which rotatably supports the threaded shaft against axial movement. The splined coupling sleeves 626 likewise forms a thrust bearing at the upper end of the threaded shaft section 618.

In the operation of the mechanism of FIGS. 49-51, a tool block 600 is loaded into position in a manner hereinbefore described, such that the tool block shoulders are in position to be engaged by the clamping bars 605, 606.

The actuating shaft 624 is then rotated in the appropriate direction to lift the draw collar 618, carrying with it the equalizer bar 611 and the respective clamping bars 605, 606. As will be understood, the force arm from the pivot surfaces 621 to the respective sets of positioning pins 616 is equal, so that equal forces are applied to the respective clamping bars. However, if dimensional variations in a given case are such that one of the clamping bars is drawn up tight against its shoulder prior to the other, the momentary inbalance in forces is equalized by slight tilting by the equalizer bar 611. In this respect, it will be understood that the dimensional variations contemplated are extremely small, so that very slight tilting of the equalizer bar 611 is all that is customarily required for the desired force equalization. Accordingly, under any normal circumstances, there is substantial equality of clamping forces on both clamping shoulders of the tool block 600, when the draw collar 618 is drawn up tight. Thus, regardless of the direction of force application to the cutting tool, the tool block will remain firmly seated under anticipated loads.

Typically, the pivot surfaces 621 on th draw collar 618 will have a limited flat area, as distinguished from a sharp point, in order to be able to bear the necessary loads. As a result, the equalizer bar 611 will have a lesser tendency to tilt in response to minor frictional variations in the movement of the respective clamping bars, prior to the eventual application thereon of the clamping forces.

SUMMARY OF OPERATION

In the dual ram machine of FIGS. 1 and 2, the ram housings 14, 15 are supplied with tool blocks from the respective tool libraries or carrousels 22, 23, typically according to a predetermined program according to a numerical control system. The numerical control and program forms no part of the present invention and is well understood in the art.

During the performance of a specified machining operation by a ram, the control program calls for the next tool block by an identification code corresponding to the number and arrangement of identification pins 104 (FIG. 35) on the tool block. At an appropriate time, the carrousel turntable 123 is rotated until the selected tool block is sensed by the control head 144. The turntable stop bar 153 is thereupon lowered into position, effective to stop the turntable when the selected tool reaches the transfer position.

Prior to selection of the tool and stoppage of the carrousel, the tool transport carriage is positioned at the transfer station. As the selected tool block arrives at such station, the retaining lock for the tool block is released, and the transport carriage moves toward the ram housing, picking up and automatically latching itself to the selected tool block.

The transport carriage, now carrying the selected tool block, advances toward the ram housing and moves into a predetermined ready positions against the housing regardless of the instantaneous position of the housing, which may be varying during the course of a machining operation in progress. In this respect, the transport carriage may assume one of two predetermined ready positions relative to the ram housing, depending upon the left-hand or right-hand orientation of the tool block already mounted in the ram. This is accomplished by appropriate selection of positioning stops, under the control of the tool change and machining program.

The tool transport carriage 26 incorporates a novel drive system, including a torque limiting device such as a friction slip clutch or an "Autogard" type of clutch which, when the transport carriage engages the positioning stop at the ram housing, permits the transport carriage drive system to continue to rotate, maintaining a minimum driving torque on the transport carriage, to enable it to follow the transverse movements of the ram housing during the course of the machining operation in progress with the existing tool block.

When the machining operation in progress is complete the ram is fully retracted to its tool change position, which brings the previously used tool block up into alignment with the newly selected tool block held in the ready position by the transport carriage. When the ram is in its loading position, the loader carriage and slide are manipulated to simultaneously coupled with the previously used and newly selected tool blocks, following which the loader moves transversely, in a direction away from the tool-holding carrousel, simultaneously sliding the new block into position in the ram and sliding the previously used block out of the ram on the other side.

The tool holding ram is provided with right and left side clamping means, for tools of right and left-hand orientation, and thus the transverse or lateral movements of the tool loader are controlled, by the use of appropriate abutment stops, to bring the new tool into the desired left-hand or right-hand position. At this point in the tool change cycle, the clamping means in the ram is actuated to secure the new tool, and the loading slide is then withdrawn to disengage from the new tool. The loader then moves back to the transport carriage and, through a series of manipulations of the loader and transport carriage, the old tool block is reloaded onto the transport carriage and returned to the carrousel. The transport carriage returns the old block to the now open support position on the carrousel turntable and releases it. With the tool transport carriage thus back in its "home" position, the program control is signaled to begin the process of selecting the tool block next to be used. The arrangement is such that tool block selection and transport over to the ram housing occurs at an early point in the machining cycle, so that the new tool block is waiting in the ready position, at the side of the ram housing when the program calls for a change of tools. This procedure significantly reduces the amount of "waiting" time of the machine between the end of machining operations with one tool block and the commencement of machining operations with the next tool block.

One of the significant features of the invention involves the use of a torque limiting clutch arrangement in the drive of the tool transport carriage. This enables the carriage to pick up a newly selected tool block and deliver it over to the ram housing, and hold it in position against the housing while the latter may be executing a transverse movement in the course of carrying out machining operations. When the transport carriage comes into its stop position adjacent the ram housing, the torque limiting clutch begins to slip, disengages and allows the drive screw to continue rotating on a low torque basis, keeping the transport carriage properly positioned with respect to the housing, but at the same time permitting the housing to be moved as necessary. Also, by locating the slip clutch on the "downstream" side of the drive screw, the transport arm may also be forced to move in the return direction by motions of the ram itself.

In conjunction with the above, the apparatus of the invention includes a novel arrangement of loader and transport carriage means, including selectively operable positioning stops for both of them, such that left-hand or right-hand tool blocks may be brought into appropriate ready position at the side of the ram housing, and the loading device is automatically actuated to the proper ready position. Further, there are additional selectively operable positioning stops cooperating with the loading mechanism, such that, after engagement of a new tool block from the transport carriage, the loader is actuated automatically to a left-hand or right-hand position with respect to the ram.

Time efficiency in the tool change operation is further increased by providing for a "flow-through" exchange movement of tool blocks, after a pair of blocks are engaged by the loader mechanism. Thus, the loader is adapted simultaneously to engage a tool block brought into the ready position by the transport carriage and a tool block previously mounted in the machine ram. With the tool blocks thus engaged, the loader is actuated to move transversely, bringing the new tool block into a predetermined clamping position in the ram while simultaneously sliding the previously used tool out of engagement with the ram on the opposite side.

The clamping section of the ram includes an advantageous combination of features providing for effective and secure locating of the tool blocks, while at the same time effecting the desired "flow-through" of the tool blocks during the tool change operation. To this end, a tapered guide rib extends along the under side of the clamp housing, arranged to closely fit with outwardly tapering slot-forming walls in the tool blocks. When the tool blocks are drawn upwardly into clamped relation with the bottom of the ram, the tapered guide rib engages with the tapered slot openings in the tool blocks, precisely positioning the tool blocks in the front-rear direction and also as regards rotational orientation. Proper lateral positioning of the tool blocks is assured by means of locating pins on the blocks, which project into and have a close fitting relation with the elongated guide slots in the clamp housing. The guide slots are elongated in the front-to-rear direction but provide accurate positioning in the lateral positioning.

For engaging and manipulating the tool blocks, the loader is provided with a pair of rod-like fingers, which are received in a cylindrical opening of the tool blocks and, releasably secured by the tool blocks by detent means and/or by positively actuated tool retaining means. The positively actuated tool block retaining mechanism, incorporated in the modification of FIGS. 40–45 is particularly advantageous for use in connection with extremely large machines, where the mass of the tool blocks is quite large. When executing rapid retracting movements of the tool loader, in the course of a tool change operation, it is important to have heavy tool blocks positively locked in place, as will be understood. The arrangement is highly simplified, yet fool proof and effective to provide the necessary handling of the tool blocks during the loading and unloading phases.

In the modifications of the invention illustrated in FIGS. 46–51, special tool block clamping means are provided, which are adapted especially for resisting extremely heavy loads on the cutting tool, without causing over-stressing of the clamping system, tilting or "winking" of the tool block, and resulting imperfections. In this respect, it is contemplated that the tool blocks will be oriented in such manner that the primary force of the work against the cutting tool will generally at right angles to the axis of the guide rib on which the tool block is aligned. The modified clamping means includes a pair of individual clamping bars, engaging shoulders of the tool block on opposite sides of the guide rib. When force is applied at right angles to the guide rib, and at a location substantially spaced therefrom, the tendency is for the the tool block to tilt about one side edge. In one form of the modified clamping means, illustrated in FIGS. 46–48, the pairs of clamping bars include one bar which has a heavy duty resilient thrust support, absolutely assuring positive solid clamping engagement of the other clamping bar. The arrangement of the respective clamping bars is such that the resiliently supported bar is on the side about which the block tends to pivot, while the solidly supported bar is on the side which sustains the significant load.

In the further modified form of clamping mechanism shown in FIGS. 49–51, force equalizing means is provided such that, under all conditions, substantially equal loading is applied to the clamping bars engaging opposite sides of the tool block. This modified arrangement is particularly desirable for use with machines having a single clamping position for the tool block, and the loading on different tool blocks may be in opposite directions.

It should be understood, of course, that the illustrated form of the invention is intended to be representative only, as many changes may be made therein without departing from the clear teachings of the disclosure. Accordingly, reference should be made to the following appended claims in determining the full scope of the invention.

I claim:

1. A changeable tool block and clamping means for a machine tool having automatic clamping tool means, which comprises
    a. tool block body mounting a cutting tool,
    b. said body being provided with a guide slot in its upper portion extending from one side to the other and having overlying flanges partially restricting the upper opening of the slot,
    c. clamping means including a clamping element of generally inverted "T"-shaped cross-section,
    d. said guide slot being adapted for the latter slideable reception of said clamping element, and accommodating the entry of said clamping element at one side and its exit at the other side,
    e. said overlying flanges having upwardly diverging alignment surfaces spaced from said clamping means upon the initial reception of said clamping element in said guide slot and operative when said tool block is tightly clamped to mate with said clamping means whereby the tool block is oriented and positioned in said clamping means,
    f. said tool block having a plurality of upwardly extending locating lugs, and
    g. said clamping means having locating recess means for the reception of said lugs for effecting lateral alignment of the tool block.

2. The combination of a tool block and a clamping mechanism therefor, for use in a vertical lathe or the like, which comprises
    a. a tool block mounting a cutting tool adjacent a lower end thereof, b. said tool block having clamp engaging means on opposite sides thereof,
c. a clamp housing,
d. a pair of spaced clamping bars movably mounted in said housing and engageable with the respective clamping means on said tool block,
e. a common actuating means for actuating said clamping bars to clamp said tool block in said housing, and
f. means for effectively distributing the clamping force applied by said actuating means, to provide solid thrust bearing support on the side of the tool block from which work approaches the cutting tool in a cutting operation, and a resilient thrust support for the other side of the tool block.

3. A combination of a tool block and a clamping mechanism therefor, for use in a vertical lathe or the like, which comprises,
 a. a tool block mounting a cutting tool adjacent a lower end thereof,
 b. said tool block having clamp engaging means on opposite sides thereof,
 c. a clamping housing,
 d. a pair of spaced clamping bars movably mounted in said housing and engageable with the respective clamping means on said tool block,
 e. a common actuating means for actuating said clamping bars to clamp said tool block in said housing, and
 f. means for effectively distributing the clamping force applied by said actuating means comprising first means for yieldably connecting said acutating means to one of said clamping bars and second means for non-yieldably connecting said actuating means to the other of said clamping bars,
 g. said other clamping bar being on the side of said tool block from which the work approaches.

4. The combination tool block and clamping mechanism therefor as set forth in claim 3, further characterized by
 a. said clamping bars including threaded portions,
 b. threaded collars engaging the respective clamping bars and driven to rotate in unison by said actuating means,
 c. relatively yieldable thrust bearing means supporting one of said threaded collars, and
 d. relatively non-yieldable thrust bearing means supporting the other of said threaded collars.

5. A combination of a tool block and a clamping mechanism therefor, for use in a vertical lathe or the like, which comprises
 a. a tool block mounting a cutting tool adjacent a lower end thereof,
 b. said tool block having clamp engaging means on opposite sides thereof,
 c. a clamp housing,
 d. a pair of spaced clamping bars movably mounted in said housing and engageable with the respective clamping means on said tool block,
 e. a common actuating means for actuating said clamping bars to clamp said tool block in said housing, and
 f. means for effectively distributing a clamping force applied by said actuating means comprising an equalizer element engaging said clamping bars,
 g. fulcrum means engaging and supporting said equalizer element for limited rocking movement, whereby as said clamping bars are operated by said common actuating means to clamp said tool block in the housing any momentary imbalance in clamping forces is equalized by slight tilting movement of the equalizer element about said fulcrum means thereby achieving clamping force equalization.

6. The combination tool block and clamping mechanism therefor as set forth in claim 5, further characterized by
 a. said clamping bars are formed with openings in upper portions thereof, and
 b. opposite ends of said equalizer element being received in said openings.

7. The combination tool block and clamping mechanism therefor as set forth in claim 5, further characterized by
 a. said actuating means comprising a rotary shaft,
 b. said shaft having a draw collar thereon threadedly engaging said shaft,
 c. said equalizer element having an opening in its center portion receiving said shaft and collar, and
 d. means on said collar forming a fulcrum engaging the center portion of said equalizer element.

* * * * *